(12) United States Patent
Ono

(10) Patent No.: US 8,917,332 B2
(45) Date of Patent: Dec. 23, 2014

(54) IMAGE CAPTURING APPARATUS, IMAGE PROCESSING APPARATUS AND METHOD, AND PROGRAM THEREFOR

(75) Inventor: Toshiki Ono, Tokyo (JP)

(73) Assignee: Sony Corporation, Tokyo (JP)

( * ) Notice: Subject to any disclaimer, the term of this patent is extended or adjusted under 35 U.S.C. 154(b) by 900 days.

(21) Appl. No.: 12/341,264

(22) Filed: Dec. 22, 2008

(65) Prior Publication Data

US 2009/0185055 A1 Jul. 23, 2009

(30) Foreign Application Priority Data

Jan. 22, 2008 (JP) ................................ 2008-011068

(51) Int. Cl.
H04N 9/68 (2006.01)
H04N 5/232 (2006.01)
H04N 5/235 (2006.01)
H04N 5/228 (2006.01)

(52) U.S. Cl.
CPC ......... *H04N 5/2351* (2013.01); *H04N 5/23293* (2013.01); *H04N 5/23245* (2013.01)
USPC ...................................... 348/234; 348/222.1

(58) Field of Classification Search
USPC ..................................... 348/222.1, 234–238
See application file for complete search history.

(56) References Cited

U.S. PATENT DOCUMENTS

| 5,049,997 | A | | 9/1991 | Arai | |
|---|---|---|---|---|---|
| 6,148,097 | A | * | 11/2000 | Nakayama et al. | 382/141 |
| 6,346,937 | B1 | * | 2/2002 | Sasaki et al. | 345/211 |
| 6,690,424 | B1 | | 2/2004 | Hanagata et al. | |
| 6,792,203 | B1 | | 9/2004 | Ide et al. | |
| 2002/0048389 | A1 | * | 4/2002 | Komaki | 382/107 |
| 2002/0071041 | A1 | * | 6/2002 | Pine | 348/222 |
| 2003/0095192 | A1 | * | 5/2003 | Horiuchi | 348/222.1 |
| 2007/0096024 | A1 | * | 5/2007 | Furuya et al. | 250/332 |
| 2008/0297620 | A1 | * | 12/2008 | Goel | 348/223.1 |
| 2010/0003005 | A1 | * | 1/2010 | Sugihara et al. | 386/4 |

FOREIGN PATENT DOCUMENTS

| EP | 1 202 563 A1 | 5/2002 |
|---|---|---|
| JP | 2004-235956 | 8/2004 |

OTHER PUBLICATIONS

European Search Report issued Jul. 24, 2012, in Patent Application No. 09150719.4.
European Office Action issued Jul. 31, 2012, in Patent Application No. 09 150 719.4.
Partial European Search Report issued Apr. 2, 2012, in Patent Application No. 09150719.4.

* cited by examiner

*Primary Examiner* — Christopher K Peterson
(74) *Attorney, Agent, or Firm* — Sony Corporation

(57) ABSTRACT

An image processing apparatus includes an input unit configured to receive an input image to be processed; a brightness-information extracting unit configured to extract, from the image, brightness information indicating brightness of the whole image; a luminance-value-distribution-information extracting unit configured to extract, from the image, luminance-value-distribution information indicating a distribution of luminance values in the image; and a scene determining unit configured to determine a scene of an object included in the image on the basis of the extracted brightness information and the extracted luminance-value-distribution information.

18 Claims, 37 Drawing Sheets

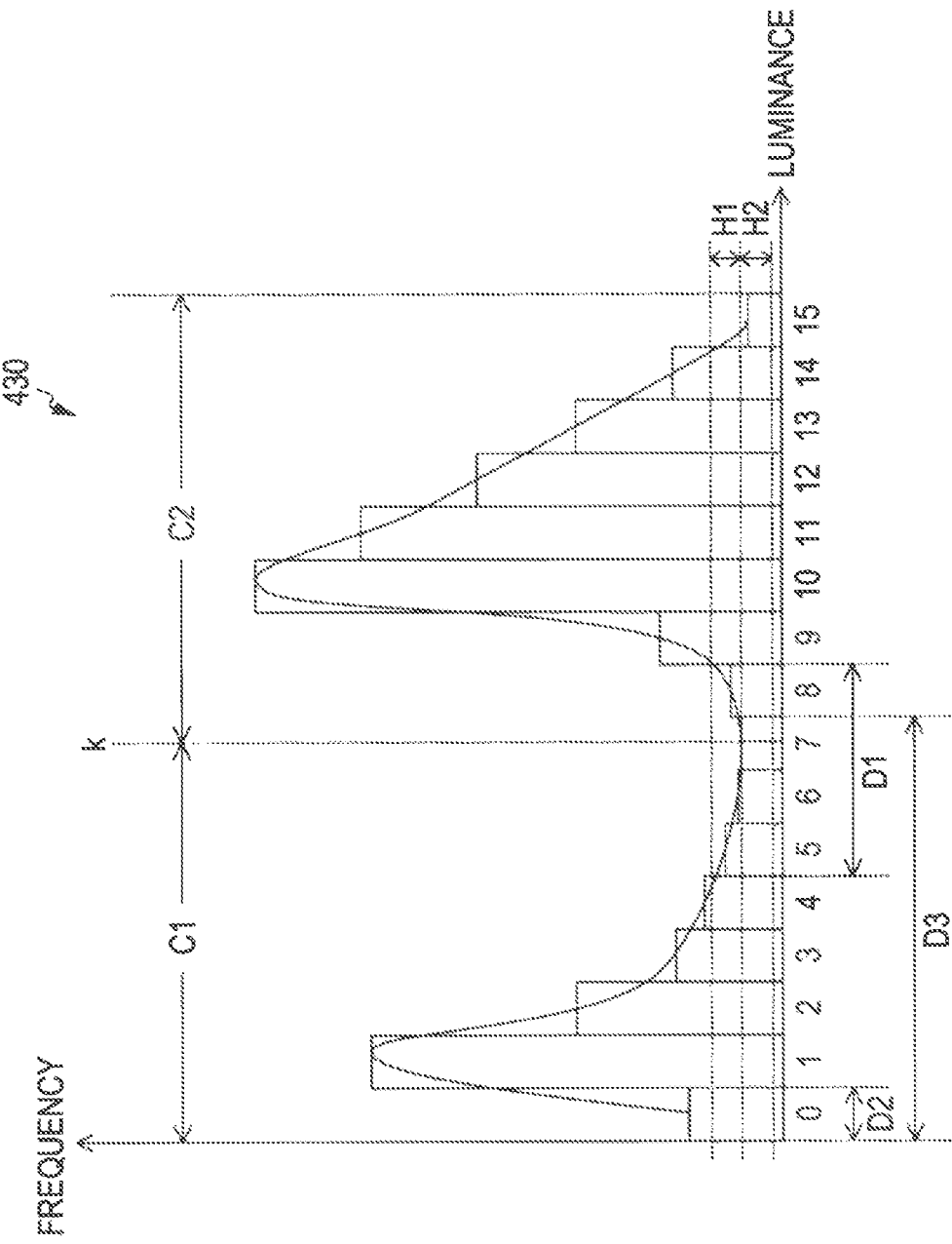

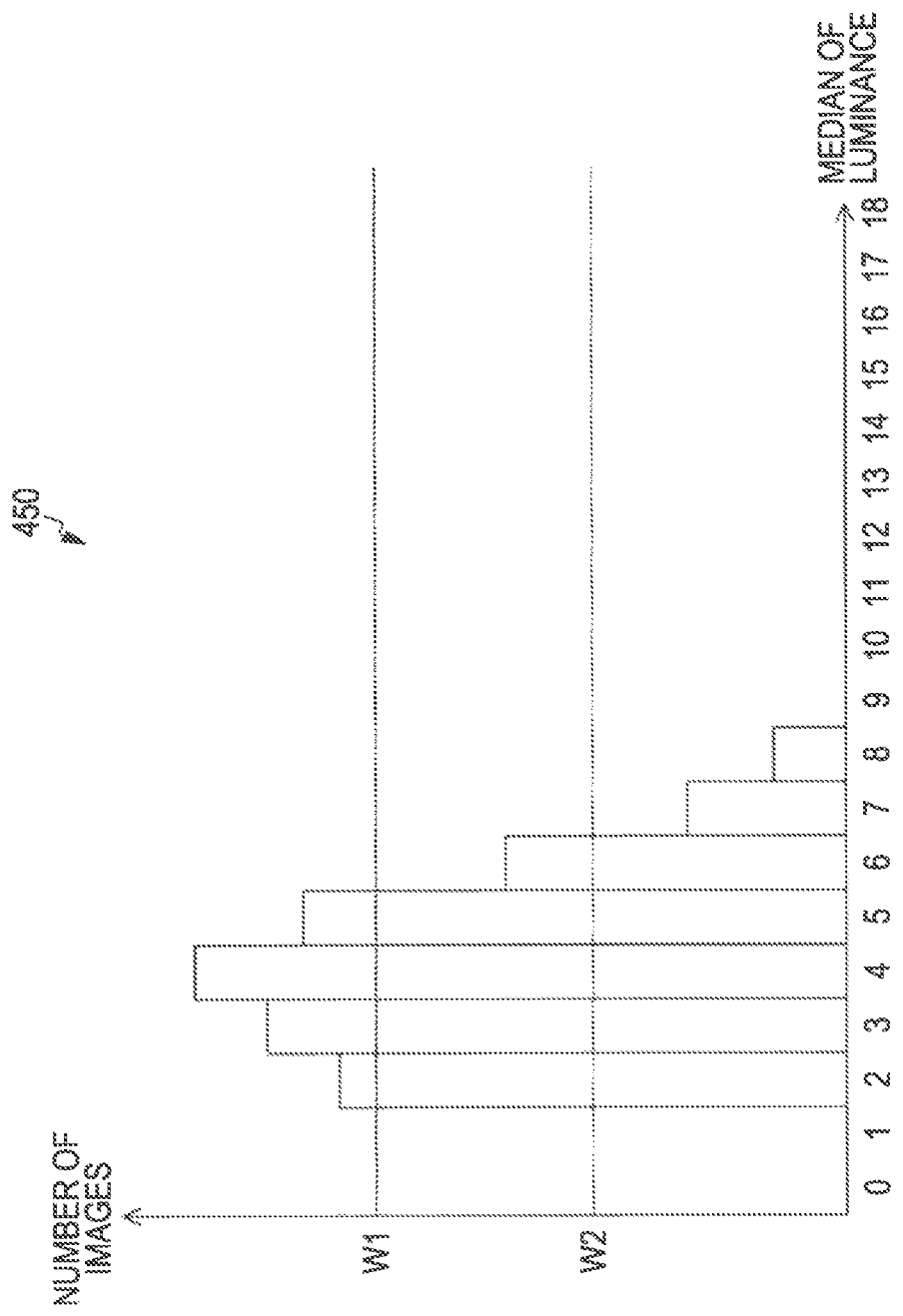

FIG. 13A 321

| MEAN VALUE / SCENE | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| NIGHTTIME SCENE | — | — | HIGH | HIGH | HIGH | HIGH | INTER-MEDIATE | LOW | LOW | — | — | — | — | — | — | — |
| BACKLIT SCENE | — | — | LOW | LOW | LOW | LOW | LOW | INTER-MEDIATE | HIGH | HIGH | HIGH | — | — | — | — | — |
| OUTDOOR SCENE | — | — | LOW | LOW | LOW | LOW | HIGH | HIGH | HIGH | HIGH | HIGH | LOW | LOW | LOW | — | — |
| INDOOR SCENE | LOW | — | LOW | LOW | LOW | INTER-MEDIATE | HIGH | HIGH | HIGH | HIGH | LOW | LOW | LOW | LOW | — | — |

FIG. 13B 322

| PEAK VALUE / SCENE | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| NIGHTTIME SCENE | HIGH | LOW | LOW | — | — | — | — | — | — | — | — | — | — | — | INTER-MEDIATE | HIGH |
| BACKLIT SCENE | HIGH | HIGH | — | — | — | — | — | — | — | — | — | — | — | — | LOW | HIGH |
| OUTDOOR SCENE | HIGH | HIGH | INTER-MEDIATE | INTER-MEDIATE | INTER-MEDIATE | INTER-MEDIATE | INTER-MEDIATE | INTER-MEDIATE | INTER-MEDIATE | LOW | LOW | LOW | LOW | LOW | LOW | LOW |
| INDOOR SCENE | HIGH | HIGH | INTER-MEDIATE | INTER-MEDIATE | INTER-MEDIATE | INTER-MEDIATE | INTER-MEDIATE | INTER-MEDIATE | INTER-MEDIATE | INTER-MEDIATE | LOW | LOW | LOW | LOW | LOW | LOW |

FIG. 14A  323

| BOTTOM WIDTH / SCENE | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| NIGHTTIME SCENE | / | / | / | / | / | / | LOW | LOW | LOW | INTER-MEDIATE | INTER-MEDIATE | HIGH | HIGH | HIGH | HIGH | INTER-MEDIATE |
| BACKLIT SCENE | / | / | / | / | / | HIGH | HIGH | HIGH | HIGH | HIGH | HIGH | LOW | HIGH | HIGH | / | / |
| OUTDOOR SCENE | HIGH | HIGH | HIGH | HIGH | HIGH | HIGH | INTER-MEDIATE | INTER-MEDIATE | LOW | LOW | LOW | LOW | LOW | LOW | LOW | LOW |
| INDOOR SCENE | HIGH | HIGH | HIGH | HIGH | HIGH | HIGH | INTER-MEDIATE | INTER-MEDIATE | LOW | LOW | LOW | LOW | LOW | LOW | LOW | LOW |

FIG. 14B  324

| BINARIZATION THRESHOLD / SCENE | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| NIGHTTIME SCENE | LOW | LOW | LOW | HIGH | HIGH | HIGH | HIGH | LOW | HIGH | / | / | / | / | / | / | / |
| BACKLIT SCENE | / | / | / | HIGH | HIGH | LOW | HIGH | HIGH | HIGH | / | / | / | / | / | / | / |
| OUTDOOR SCENE | LOW | LOW | LOW | LOW | LOW | HIGH | HIGH | HIGH | INTER-MEDIATE | LOW | LOW | LOW | / | / | / | / |
| INDOOR SCENE | LOW | LOW | LOW | LOW | LOW | HIGH | HIGH | HIGH | / | LOW | LOW | / | / | / | / | / |

FIG. 15A  325

| PROPORTION / SCENE | 0 | 5 | 10 | 15 | 20 | 25 | 30 | 35 | 40 | 45 | 50 | 55 | 60 | 65 | 70 | 75 | 80 | 85 | 90 | 95 | 100 |
|---|---|---|---|---|---|---|---|---|---|---|---|---|---|---|---|---|---|---|---|---|---|
| NIGHTTIME SCENE | / | HIGH | HIGH | HIGH | / | / | / | / | / | / | / | / | / | / | HIGH | HIGH | HIGH | HIGH | HIGH | HIGH | INTER-MEDIATE |
| BACKLIT SCENE | HIGH | HIGH | HIGH | HIGH | HIGH | HIGH | HIGH | HIGH | LOW | HIGH | LOW | INTER-MEDIATE | INTER-MEDIATE | INTER-MEDIATE | HIGH | HIGH | HIGH | HIGH | HIGH | HIGH | / |
| OUTDOOR SCENE | HIGH | HIGH | HIGH | HIGH | HIGH | HIGH | INTER-MEDIATE | INTER-MEDIATE | LOW | LOW | LOW | LOW | LOW | LOW | LOW | LOW | / | / | / | / | / |
| INDOOR SCENE | HIGH | HIGH | HIGH | HIGH | INTER-MEDIATE | INTER-MEDIATE | INTER-MEDIATE | INTER-MEDIATE | LOW | LOW | LOW | LOW | LOW | LOW | LOW | LOW | LOW | LOW | LOW | LOW | LOW |

FIG. 15B  326

| PROPORTION / SCENE | 0 | 5 | 10 | 15 | 20 | 25 | 30 | 35 | 40 | 45 | 50 | 55 | 60 | 65 | 70 | 75 | 80 | 85 | 90 | 95 | 100 |
|---|---|---|---|---|---|---|---|---|---|---|---|---|---|---|---|---|---|---|---|---|---|
| NIGHTTIME SCENE | / | / | / | / | / | / | / | / | / | / | / | / | / | / | LOW | LOW | HIGH | HIGH | HIGH | HIGH | HIGH |
| BACKLIT SCENE | / | / | / | / | / | / | HIGH | HIGH | HIGH | HIGH | HIGH | HIGH | HIGH | LOW | LOW | / | / | / | / | / | / |
| OUTDOOR SCENE | LOW | LOW | LOW | LOW | LOW | LOW | LOW | LOW | LOW | INTER-MEDIATE | HIGH | HIGH | HIGH | HIGH | HIGH | HIGH | INTER-MEDIATE | INTER-MEDIATE | LOW | LOW | LOW |
| INDOOR SCENE | LOW | LOW | LOW | LOW | LOW | LOW | LOW | LOW | INTER-MEDIATE | HIGH | INTER-MEDIATE | HIGH | HIGH | HIGH | HIGH | HIGH | INTER-MEDIATE | INTER-MEDIATE | LOW | LOW | LOW |

FIG. 17
(a)
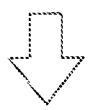
(b)
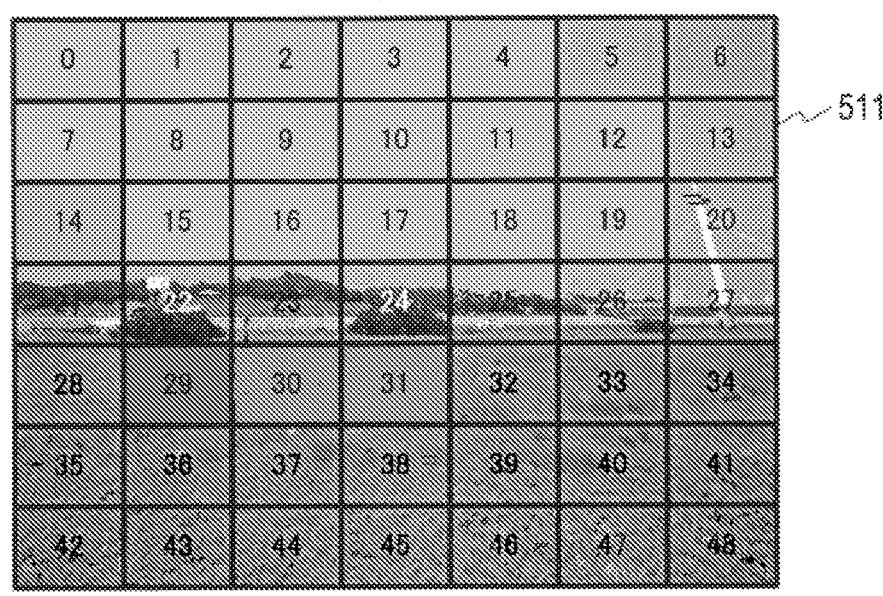

FIG. 20

|   | 0 | 1 | 2 | 3 | 4 | 5 | 6 |
|---|---|---|---|---|---|---|---|
| 0 | 0 | 1 | 2 | 3 | 4 | 5 | 6 |
| 1 | 7 | 8 | 9 | 10 | 11 | 12 | 13 |
| 2 | 14 | 15 | 16 | 17 | 18 | 19 | 20 |
| 3 | 21 | 22 | 23 | 24 | 25 | 26 | 27 |
| 4 | 28 | 29 | 30 | 31 | 32 | 33 | 34 |
| 5 | 35 | 36 | 37 | 38 | 39 | 40 | 41 |
| 6 | 42 | 43 | 44 | 45 | 46 | 47 | 48 |

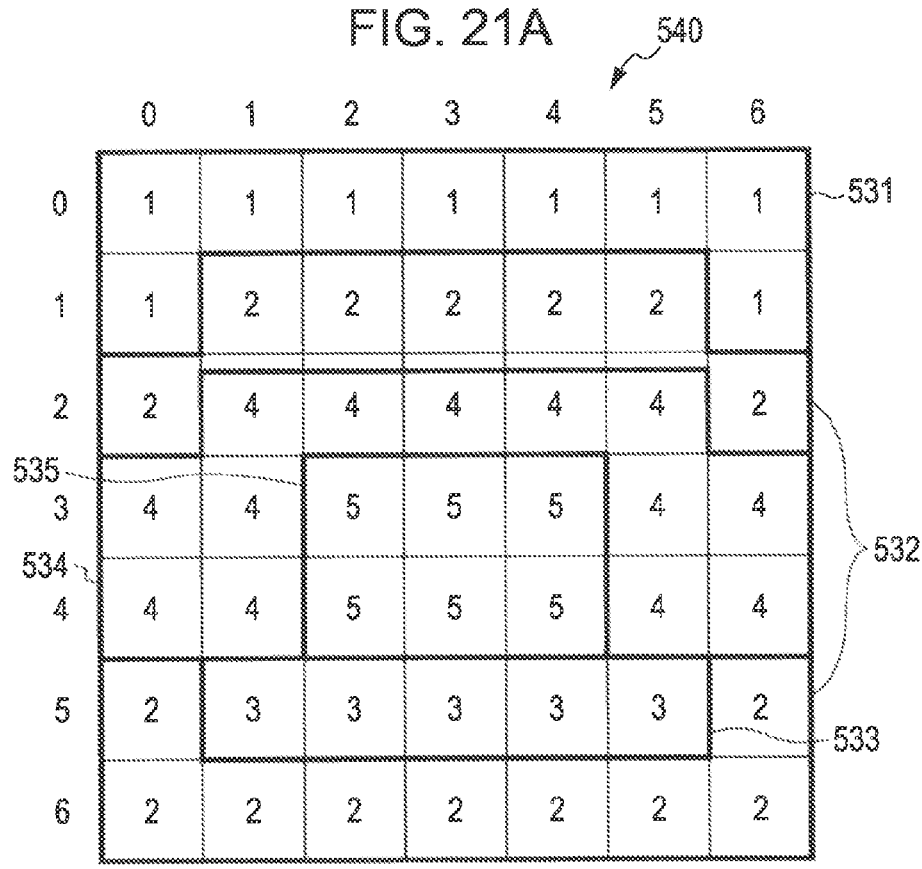

|   | 0 | 1 | 2 | 3 | 4 | 5 | 6 |
|---|---|---|---|---|---|---|---|
| 0 | 1 | 1 | 1 | 1 | 1 | 1 | 1 |
| 1 | 2 | 2 | 2 | 2 | 2 | 2 | 2 |
| 2 | 3 | 3 | 3 | 3 | 3 | 3 | 3 |
| 3 | 4 | 4 | 4 | 4 | 4 | 4 | 4 |
| 4 | 5 | 5 | 6 | 6 | 6 | 5 | 5 |
| 5 | 5 | 5 | 6 | 6 | 6 | 5 | 5 |
| 6 | 5 | 5 | 6 | 6 | 6 | 5 | 5 |

| MEAN VALUE OF LUMINANCE \ GROUP NO. | 1 | 2 | 3 | 4 | 5 | 6 |
|---|---|---|---|---|---|---|
| LESS THAN Y1 | s11 | s21 | s31 | s41 | s51 | s61 |
| GREATER THAN OR EQUAL TO Y1 AND LESS THAN Y2 | s12 | s22 | s32 | s42 | s52 | s62 |
| GREATER THAN OR EQUAL TO Y2 AND LESS THAN Y3 | s13 | s23 | s33 | s43 | s53 | s63 |
| GREATER THAN OR EQUAL TO Y3 AND LESS THAN Y4 | s14 | s24 | s34 | s44 | s54 | s64 |
| GREATER THAN OR EQUAL TO Y4 AND LESS THAN Y5 | s15 | s25 | s35 | s45 | s55 | s65 |
| GREATER THAN OR EQUAL TO Y5 | s16 | s26 | s36 | s46 | s56 | s66 |

FIG. 25A
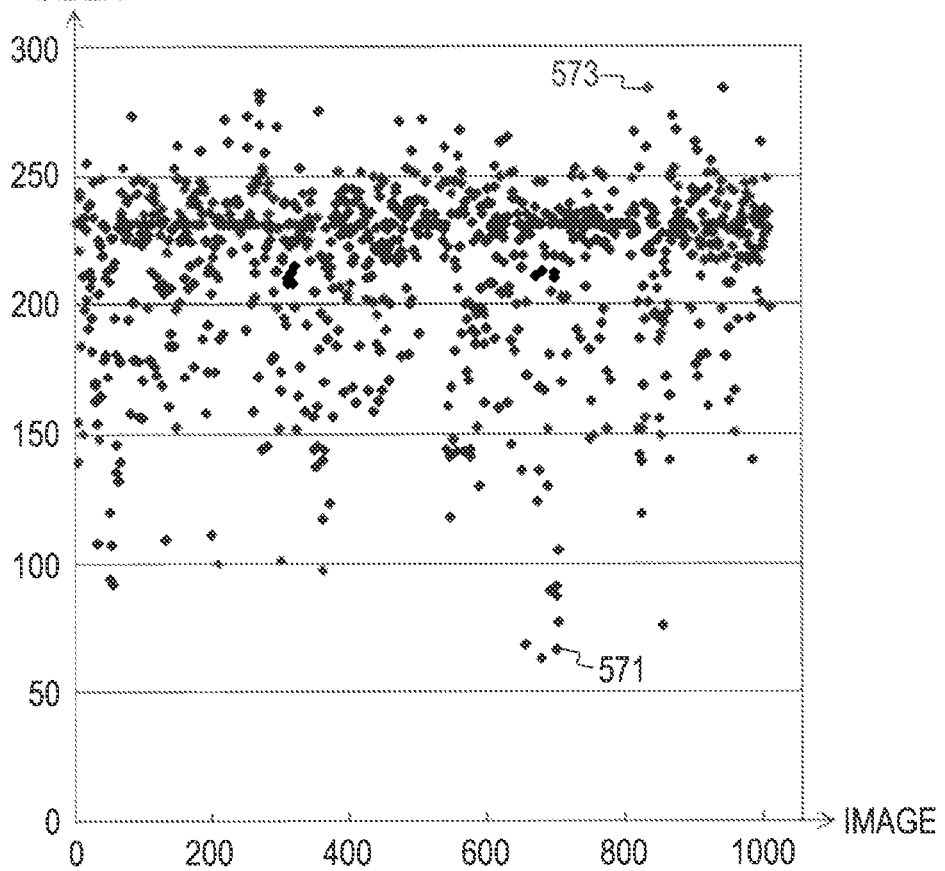
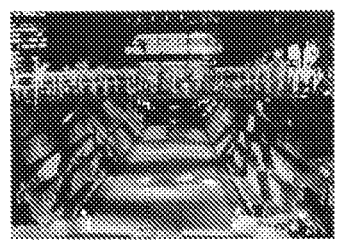
FIG. 25B
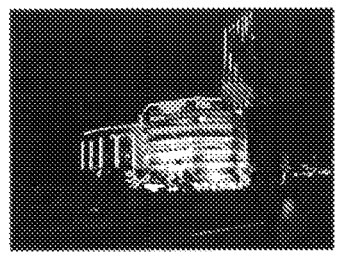
FIG. 25C

| MEAN VALUE OF LUMINANCE \ GROUP NO. | 1 | 2 | 3 | 4 | 5 | 6 |
|---|---|---|---|---|---|---|
| LESS THAN Y1 | s11 | s21 | s31 | s41 | s51 | s61 |
| GREATER THAN OR EQUAL TO Y1 AND LESS THAN Y2 | s12 | s22 | s32 | s42 | s52 | s62 |
| GREATER THAN OR EQUAL TO Y2 AND LESS THAN Y3 | s13 | s23 | s33 | s43 | s53 | s63 |
| GREATER THAN OR EQUAL TO Y3 AND LESS THAN Y4 | s14 | s24 | s34 | s44 | s54 | s64 |
| GREATER THAN OR EQUAL TO Y4 AND LESS THAN Y5 | s15 | s25 | s35 | s45 | s55 | s65 |
| GREATER THAN OR EQUAL TO Y5 | s16 | s26 | s36 | s46 | s56 | s66 |

| IMAGE CAPTURING CONDITION | NIGHTTIME SCENE 601 | BACKLIT SCENE 602 | FACE DETECTION 603 | MAIN-OBJECT DETECTION (PRELIMINARY LIGHT EMISSION) 604 | STATE OF IMAGE CAPTURING APPARATUS 605 |
|---|---|---|---|---|---|
| 611 SLOW SYNCHRONIZATION MODE | OK | ... | YES | ... | STILL |
| 612 STROBE LIGHT EMITTING MODE | | OK | | YES | ... |
| 613 HIGH SENSITIVITY MODE | OK | ... | | YES | MOVING |
| 614 NIGHTTIME MODE | OK | ... | | NO | STILL |
| 615 DAYTIME SYNCHRONIZATION MODE | ... | OK | YES | ... | ... |
| 616 INTENSITY CORRECTION | ... | OK | NO | NO | ... |

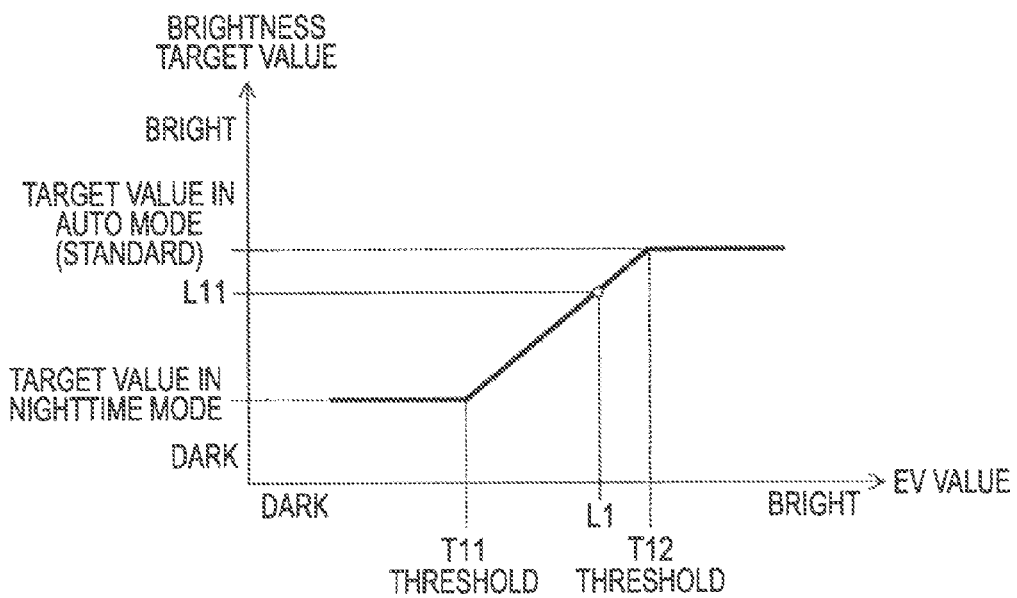
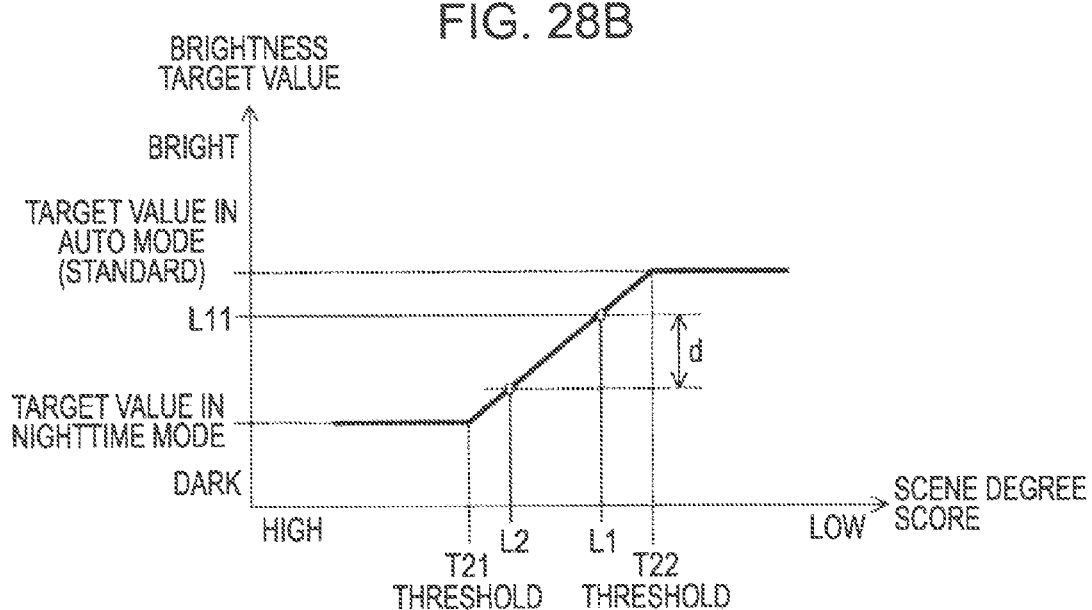

IMAGE CAPTURING APPARATUS, IMAGE PROCESSING APPARATUS AND METHOD, AND PROGRAM THEREFOR

CROSS REFERENCES TO RELATED APPLICATIONS

The present invention contains subject matter related to Japanese Patent Application JP 2008-011068 filed in the Japanese Patent Office on Jan. 22, 2008, the entire contents of which are incorporated herein by reference.

BACKGROUND OF THE INVENTION

1. Field of the Invention

The present invention relates to image capturing apparatuses, and more particularly, to an image capturing apparatus which can capture images using a plurality of image capturing conditions, an image processing apparatus and method, and a program for causing a computer to execute the method.

2. Description of the Related Art

Hitherto, image capturing apparatuses such as digital still cameras which capture images of objects such as persons and landscapes and record the captured images have become available. As one of these image capturing apparatuses, an image capturing apparatus that determines the scene of an object included in a captured image and sets image capturing conditions in accordance with the determined scene has been proposed.

For example, an image capturing apparatus that determines a backlit state of an object included in a captured image and performs backlit correction in accordance with the backlit state of this captured image has been proposed (for example, see Japanese Unexamined Patent Application Publication No. 2004-235956 (FIG. 1)).

SUMMARY OF THE INVENTION

According to the related art described above, backlit correction can be performed in accordance with a backlit state of an object included in a captured image by determining the backlit state. However, depending on, for example, the size or arrangement of an object included in a captured image, a backlit scene may be similar to an indoor scene or an outdoor scene other than a backlit scene, such as a frontlit scene. Therefore, it may be difficult in some cases to distinguish a backlit scene. Even in such a case, by appropriately determining a backlit scene, more appropriate image capturing conditions can be set. It is also important to appropriately distinguish individual scenes other than a backlit scene.

It is desirable to appropriately determine a scene of an object included in a captured image.

According to an embodiment of the present invention, there is provided an image processing apparatus including the following elements: input means for receiving an input image to be processed; brightness-information extracting means for extracting, from the image, brightness information indicating brightness of the whole image; luminance-value-distribution-information extracting means for extracting, from the image, luminance-value-distribution information indicating a distribution of luminance values in the image; and scene determining means for determining a scene of an object included in the image on the basis of the extracted brightness information and the extracted luminance-value-distribution information.

The image processing apparatus may further include the following elements: brightness-information evaluation-value-parameter storage means for storing, on a scene-by-scene basis, a brightness-information evaluation value parameter indicating a distribution of the brightness information according to various scenes; luminance-value-distribution-information evaluation-value-parameter storage means for storing, on a scene-by-scene basis, a luminance-value-distribution-information evaluation value parameter indicating a feature amount corresponding to the luminance-value-distribution information according to the various scenes; and determination-evaluation-value calculating means for calculating, on a scene-by-scene basis, a brightness-information evaluation value using the brightness-information evaluation value parameter corresponding to the extracted brightness information, calculating, on a scene-by-scene basis, a luminance-value-distribution-information evaluation value using the luminance-value-distribution-information evaluation value parameter corresponding to the extracted luminance-value-distribution information, and calculating, on a scene-by-scene basis, a determination evaluation value on the basis of the brightness-information evaluation value and the luminance-value-distribution-information evaluation value calculated on a scene-by-scene basis. The scene determining means may determine the scene of the object included in the image on the basis of the determination evaluation value calculated on a scene-by-scene basis.

The feature amount corresponding to the luminance-value-distribution information may include at least a value indicating a proportion corresponding to a specified category in a histogram indicating a distribution of the luminance values in the image.

The feature amount corresponding to the luminance-value-distribution information may include at least a binarization threshold obtained by performing a discriminant analysis method on a histogram indicating a distribution of the luminance values in the image.

The image processing apparatus may further include luminance-value-region-information extracting means for splitting the image into a plurality of regions and extracting luminance-value region information of each of the regions. The scene determining means may determine the scene of the object included in the image on the basis of the extracted brightness information, the extracted luminance-value-distribution information, and the extracted luminance-value region information.

The image processing apparatus may further include the following elements: brightness-information evaluation-value-parameter storage means for storing, on a scene-by-scene basis, a brightness-information evaluation value parameter indicating a distribution of the brightness information according to various scenes; luminance-value-distribution-information evaluation-value-parameter storage means for storing, on a scene-by-scene basis, a luminance-value-distribution-information evaluation value parameter indicating a feature amount corresponding to the luminance-value-distribution information according to the various scenes; split-region-evaluation-value-converting-information storage means for storing region group information indicating a group of regions of the image, which are classified on the basis of a size of the luminance-value region information according to the various scenes, and an evaluation-value converting table for converting the extracted luminance-value region information into a split-region evaluation value on the basis of the region group information; determination-evaluation-value calculating means for calculating, on a scene-by-scene basis, a brightness-information evaluation value using the brightness-information evaluation value parameter corresponding to the extracted brightness information, calculating, on a scene-by-scene basis, a luminance-value-distributioninformation evaluation value using the luminance-value-distribution-information evaluation value parameter corresponding to the extracted luminance-value-distribution information, and calculating, on a scene-by-scene basis, a determination evaluation value on the basis of the brightness-information evaluation value and the luminance-value-distribution-information evaluation value calculated on a scene-by-scene basis; and split-region-evaluation-value calculating means for calculating, on a scene-by-scene basis, for the extracted luminance-value region information, a split-region evaluation value using the region group information and the evaluation-value converting table. The scene determining means may determine the scene of the object included in the image on the basis of the determination evaluation value and the split-region evaluation value calculated on a scene-by-scene basis.

The split-region-evaluation-value calculating means may perform correction to increase the split-region evaluation value in a case where luminance-value region information extracted from a predetermined region of the image exists within a predetermined range.

The image processing apparatus may further include illuminance correction processing means for performing, in a case where the scene of the object included in the image is determined to be a predetermined scene, an illuminance correction process in accordance with the predetermined scene.

The image processing apparatus may further include image-capturing-condition setting means for setting an image capturing condition in accordance with presence of a face included in the image and presence of light emission in a case where the scene of the object included in the image is determined to be a backlit scene.

The image processing apparatus may further include display control means for displaying, in a case where the scene of the object included in the image has been continuously determined to be the same scene for a predetermined period of time, a mark representing the scene which has been continuously determined for the predetermined period of time.

According to another embodiment of the present invention, there is provided an image processing apparatus including the following elements: split-region-evaluation-value-converting-information storage means for storing region group information indicating a group of regions of a captured image, which are classified on the basis of a size of luminance-value region information in a predetermined region of the captured image according to various scenes, and an evaluation-value converting table for converting the luminance-value region information into a split-region evaluation value on the basis of the region group information; luminance-value-region-information extracting means for splitting the captured image into a plurality of regions and extracting luminance-value region information of each of the regions; split-region-evaluation-value calculating means for calculating, on a scene-by-scene basis, for the extracted luminance-value region information, a split-region evaluation value using the region group information and the evaluation-value converting table; and scene determining means for determining a scene of an object included in the captured image on the basis of the split-region evaluation value calculated on a scene-by-scene basis.

According to another embodiment of the present invention, there is provided an image processing method including the steps of: extracting, from an image, brightness information indicating brightness of the whole image; extracting, from the image, luminance-value-distribution information indicating a distribution of luminance values in the image; and determining a scene of an object included in the image on the basis of the extracted brightness information and the extracted luminance-value-distribution information.

According to another embodiment of the present invention, there is provided a program for causing a computer to execute a process including the steps of: extracting, from an image, brightness information indicating brightness of the whole image; extracting, from the image, luminance-value-distribution information indicating a distribution of luminance values in the image; and determining a scene of an object included in the image on the basis of the extracted brightness information and the extracted luminance-value-distribution information.

According to another embodiment of the present invention, there is provided an image capturing apparatus including the following elements: image capturing means for capturing an image of an object and generating a captured image; brightness-information extracting means for extracting, from the captured image, brightness information indicating brightness of the whole captured image; luminance-value-distribution-information extracting means for extracting, from the captured image, luminance-value-distribution information indicating a distribution of luminance values in the captured image; and scene determining means for determining a scene of the object included in the captured image on the basis of the extracted brightness information and the extracted luminance-value-distribution information.

According to the embodiments of the present invention, there is an excellent advantageous effect that a scene of an object included in a captured image can be appropriately determined.

BRIEF DESCRIPTION OF THE DRAWINGS

FIG. 9 is a diagram showing a histogram representing a distribution of luminance values extracted from an image;

FIG. 12 is a diagram schematically showing a histogram of medians of luminance values extracted from individual images;

FIGS. 13A and 13B are diagrams showing examples of scene-degree-score calculation information storing luminance-value-distribution-information evaluation value parameters generated for each scene;

FIGS. 14A and 14B are diagrams showing examples of scene-degree-score calculation information storing luminance-value-distribution-information evaluation value parameters generated for each scene;

FIGS. 15A and 15B are diagrams showing examples of scene-degree-score calculation information storing luminance-value-distribution-information evaluation value parameters generated for each scene;

FIG. 17 includes diagrams showing the outline of a method of splitting an image into predetermined regions;

FIG. 20 is a diagram showing an example of a scene frequency pattern regarding nighttime images;

FIG. 21A is a diagram showing an example of a nighttime-scene frequency pattern in a case in which the same number is given to regions belonging to the same group;

FIG. 21B is a diagram showing an example of an evaluation-value converting table for determining an evaluation value on a region-by-region basis at the time of calculating a scene index;

FIG. 22A is a diagram showing an example of a scene frequency pattern regarding backlit images;

FIG. 22B is a diagram showing an example of an evaluation-value converting table;

FIG. 25A is a diagram showing a graph representing the relationship between a plurality of captured images and nighttime scene indices calculated for these captured images;

FIGS. 25B and 25C are diagrams showing images captured in relatively dark places;

FIG. 27 is a diagram showing the relationship between image capturing conditions and conditions for setting the image capturing conditions;

FIGS. 28A and 28B are diagrams showing the outline of low illuminance correction according to the embodiment of the present invention;

DESCRIPTION OF THE PREFERRED EMBODIMENTS

An embodiment of the present invention will now be described in detail with reference to the drawings.

Figure 1:
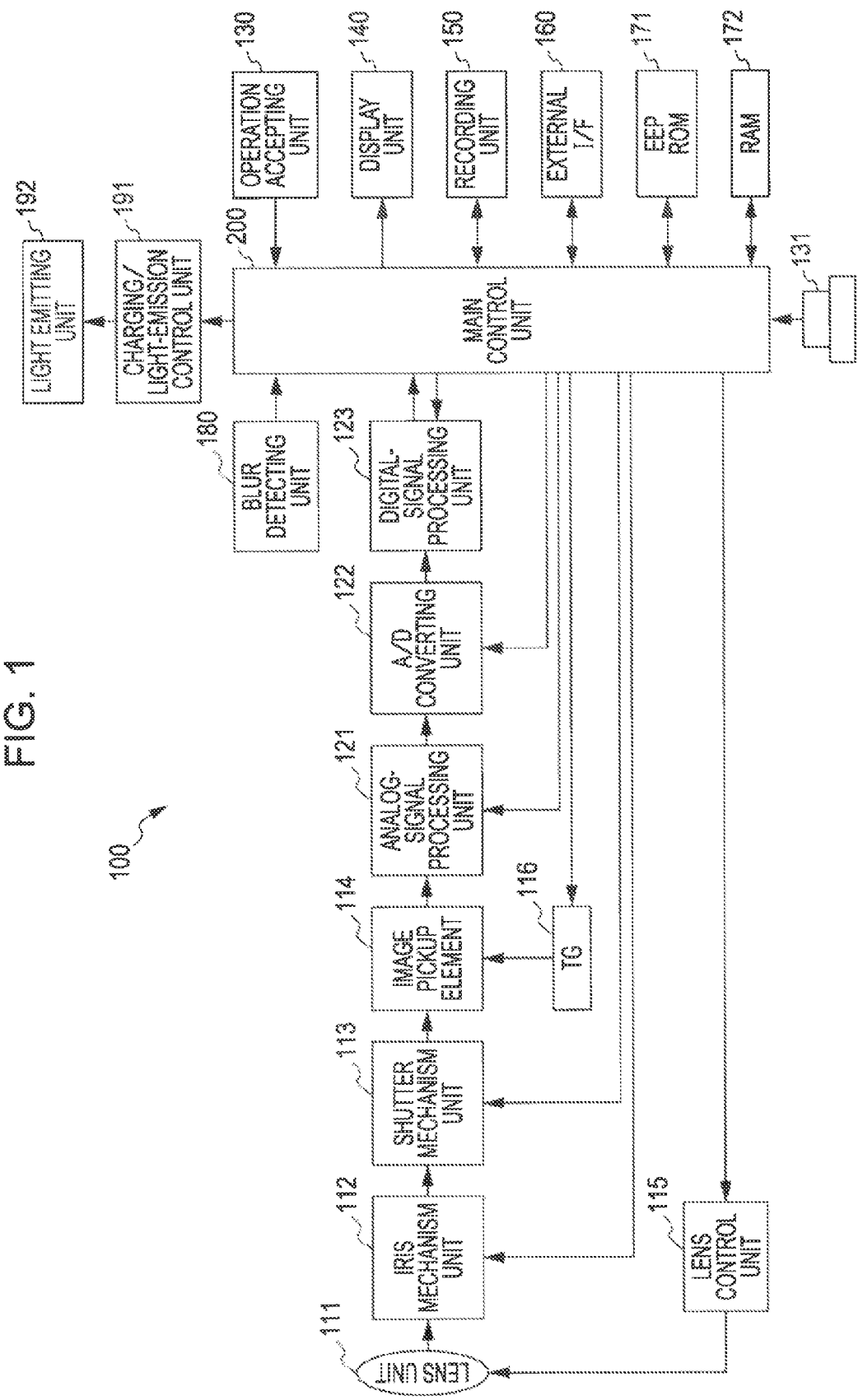
FIG. 1 is a block diagram showing an exemplary functional structure of an image capturing apparatus according to an embodiment of the present invention.

FIG. 1 is a block diagram showing an exemplary functional structure of an image capturing apparatus 100 according to an embodiment of the present invention. The image capturing apparatus 100 includes a lens unit 111, an iris mechanism unit 112, a shutter mechanism unit 113, an image pickup element 114, a lens control unit 115, a timing generator (TG; timing signal generating circuit) 116, an analog-signal processing unit 121, an analog-to-digital (A/D) converting unit 122, a digital-signal processing unit 123, a main control unit 200, an operation accepting unit 130, a shutter release button 131, a display unit 140, a recording unit 150, an external interface (I/F) 160, an electrically erasable and programmable read only memory (EEPROM) 171, a random access memory (RAM) 172, a blur detecting unit 180, a charging/light-emission control unit 191, and a light emitting unit 192. The image capturing apparatus 100 can be realized by using, for example, a digital still camera that can capture an image of an object, generate image data, extract feature amounts by performing image analysis of the image data, and apply various image processes using the extracted feature amounts.

The lens unit 111 includes a plurality of lenses (zoom lens, focus lens, and the like) which collect light reflected from an object. Incident light reflected from the object is passed through these lenses and supplied to the image pickup element 114. These lenses are driven by a zoom control mechanism unit (not shown in the drawings), a focus control mechanism unit (not shown in the drawings), or a motion-blur control mechanism unit (not shown in the drawings). For example, zoom control or focus control is performed by controlling driving of the zoom control mechanism unit or the focus control mechanism unit on the basis of a control signal from the main control unit 200. The main control unit 200 determines a position to which a correction optical system should be moved on the basis of blur information of the image capturing apparatus 100, which is detected by the blur detecting unit 180, and current position information of the correction optical system. On the basis of this determination, the motion-blur control mechanism unit is driven-controlled, thereby performing motion-blur correction control.

The iris mechanism unit 112 controls the size of an aperture through which incident light is to be passed via the lens unit 111 on the basis of a control signal from the main control unit 200. The shutter mechanism unit 113 controls the time (exposure time) during which incident light is to be passed via the lens unit 111 on the basis of a control signal from the main control unit 200. A control signal for controlling the shutter mechanism unit 113 is a control signal generated in response to a pressing operation of the shutter release button 131. The iris mechanism unit 112 and the shutter mechanism unit 113 control the amount of light exposure in this manner.

The image pickup element 114 is a color image pickup element in which a color filter is provided on an image pickup face. The image pickup element 114 operates in accordance with a driving pulse supplied from the TG 116 and forms an image of an object on the image pickup face in accordance with incident light which is reflected from the object and passed through the lens unit 111. The image pickup element 114 generates an analog image signal in accordance with the image of the object, which is formed on the image pickup face, and supplies the generated analog image signal to the analog-signal processing unit 121. As the image pickup element 114, an image pickup element such as a charge-coupled device (CCD) sensor or a complementary metal-oxide semiconductor (CMOS) sensor can be used.

The lens control unit 115 controls the zoom control mechanism unit, the focus control mechanism unit, or the motion-blur control mechanism unit on the basis of a control signal from the main control unit 200.

The TG 116 generates, on the basis of a control signal from the main control unit 200, various driving pulses used by the image pickup element 114 to accumulate and read an image signal for each screen. The TG 116 supplies these various generated driving pulses to the image pickup element 114. That is, these various driving pulses are used as timing signals for an image-signal capturing process and an image-signal outputting process.

The analog-signal processing unit 121 applies analog processing, such as a sampling process (sample-and-hold (S/H)) and an amplifying process (automatic gain control (AGC)), to the image signal supplied from the image pickup element 114. The analog-signal processing unit 121 supplies the analog-processed analog image signal to the A/D converting unit 122.

The A/D converting unit 122 converts the analog image signal supplied from the analog-signal processing unit 121 into a digital image signal by sampling the analog image signal at a predetermined sampling rate. The A/D converting unit 122 supplies the converted digital image signal to the digital-signal processing unit 123.

The digital-signal processing unit 123 generates various signals for performing framing, still-image capturing, auto-focusing, photometry processing, and the like from the digital image signal supplied from the A/D converting unit 122. The digital-signal processing unit 123 outputs the generated various signals to the main control unit 200. For example, at the time of framing, the digital-signal processing unit 123 generates a display image signal from the input image signal and supplies the generated display image signal via the main control unit 200 to the display unit 140. At the time of capturing a still image, the digital-signal processing unit 123 generates a still image signal representing one image from the input image signal, applies compression processing and the like to the generated still image signal, and supplies the processed still image signal via the main control unit 200 to the recording unit 150. At the time of auto-focusing, the digital-signal processing unit 123 detects a high-frequency component in a predetermined region within the screen from the input image signal, generates a parameter indicating the level of the detected high-frequency component, and supplies the generated parameter to the main control unit 200. At the time of photometry processing, the digital-signal processing unit 123 detects a light-amount component (AE signal) in a predetermined region within the screen from the input image signal, generates a parameter indicating the light-amount level of the detected light-amount component, and supplies the generated parameter indicating the light-amount level to the main control unit 200.

The main control unit 200 is a main control unit that controls the units included in the image capturing apparatus 100. The main control unit 200 includes a central processing unit (CPU), a program read-only memory (ROM), a work area RAM, and a microcomputer including various input/output (I/O) ports and interfaces. The main control unit 200 will be described in detail with reference to FIGS. 2 and 3.

The operation accepting unit 130 is an operation accepting unit that accepts details of an operation entered by a user and outputs a signal in accordance with the accepted details of the operation to the main control unit 200. As the operation accepting unit 130, for example, operation members such as the shutter release button 131 and a zoom button 132 (shown in FIG. 29) are provided on the image capturing apparatus 100. The shutter release button 131 is a momentary-type pressing switch operated by the user when recording a captured image. In the embodiment of the present invention, the main control unit 200 determines the pressing state of the shutter release button 131. That is, the main control unit 200 distinguishes three pressing states: a state in which the shutter release button 131 is not pressed at all by the user (off state); a state in which the shutter release button 131 is pressed halfway by the user (halfway state); and a state in which the shutter release button 131 is pressed all the way by the user (fully-pressed state). The zoom button 132 is a button operated to adjust the zoom factor when capturing an image.

The display unit 140 is a display unit that displays an image corresponding to image data supplied from the digital-signal processing unit 123. A captured image (so-called through image) corresponding to an image signal generated by the image pickup element 114 is displayed on the display unit 140. The display unit 140 can be realized by using, for example, a liquid crystal device (LCD). Alternatively, the display unit 140 may be a touch panel displaying various selections buttons. Using the touch panel, operations can be entered by touching regions of these selection buttons with a finger, for example.

The recording unit 150 is a recording device that records image data supplied from the digital-signal processing unit 123. As the recording unit 150, a removable recording medium such as a semiconductor memory including a disk memory card or a digital versatile disc (DVD) can be used. Alternatively, the recording unit 150 may be included in advance in the image capturing apparatus 100 or removably connected to the image capturing apparatus 100.

The external I/F 160 is an external I/F including an input/output terminal such as a universal serial bus (USB).

The EEPROM 171 is a memory that stores, under control of the main control unit 200, data or the like that is necessary to be held even when power of the image capturing apparatus 100 is turned off. The data includes, for example, various items of information set in the image capturing apparatus 100.

The RAM 172 is a memory that temporarily stores a program and data used by the main control unit 200 to perform various processes.

The blur detecting unit 180 detects acceleration, motion, tilt, or the like applied to the image capturing apparatus 100 and outputs a voltage value corresponding to the detected acceleration, motion, tilt, or the like to the main control unit 200. The blur detecting unit 180 obtains, for example, a voltage value corresponding to angular velocity in two directions, a pitch direction and a yaw direction. The main control unit 200 performs a motion-blur correction calculation based on the voltage value output from the blur detecting unit 180, and converts the voltage value into a numeric value corresponding to the voltage value, thereby obtaining information of movement of the image capturing apparatus 100 (blur information) due to shaky hands of the photographer, for example. The blur detecting unit 180 can be realized by using, for example, a gyro sensor.

The charging/light-emission control unit 191 controls charging and light emission of the light emitting unit 192 on the basis of a control signal from the main control unit 200. That is, the light emitting unit 192 is connected via the charging/light-emission control unit 191 to the main control unit 200, and a light emitting timing of the light emitting unit 192 is controlled by the main control unit 200.

The light emitting unit 192 is a light emitting device provided, for example, on a front face or an upper portion of a housing containing the image capturing apparatus 100 so that the light emitting unit 192 emits light in a forward direction of the lens unit 111 (in an optical-axis direction of the lens unit 111). The light emitting unit 192 emits strong light for a very short moment. That is, the light emitting unit 192 emits strong light toward an object serving as an image capturing target. The light emitting unit 192 can be realized by using a discharge device, such as a xenon lamp. The main control unit 200 causes the light emitting unit 192 to perform a preliminary light emitting operation with a predetermined amount of light before performing a full light emitting operation. On the basis of photometric data obtained from this preliminary light emitting operation, the main control unit 200 determines the amount of light to be emitted from the light emitting unit 192. That is, the main control unit 200 detects, as photometric data obtained from a preliminary light emitting operation, a luminance value of the whole screen, which corresponds to the analog image signal output from the image pickup element 114. By comparing the detected luminance value with a target luminance value at which appropriate light exposure can be achieved, the main control unit 200 determines the amount of light to be emitted from the light emitting unit 192. Therefore, the image capturing apparatus 100 has no dimmer sensor.

Figure 2:
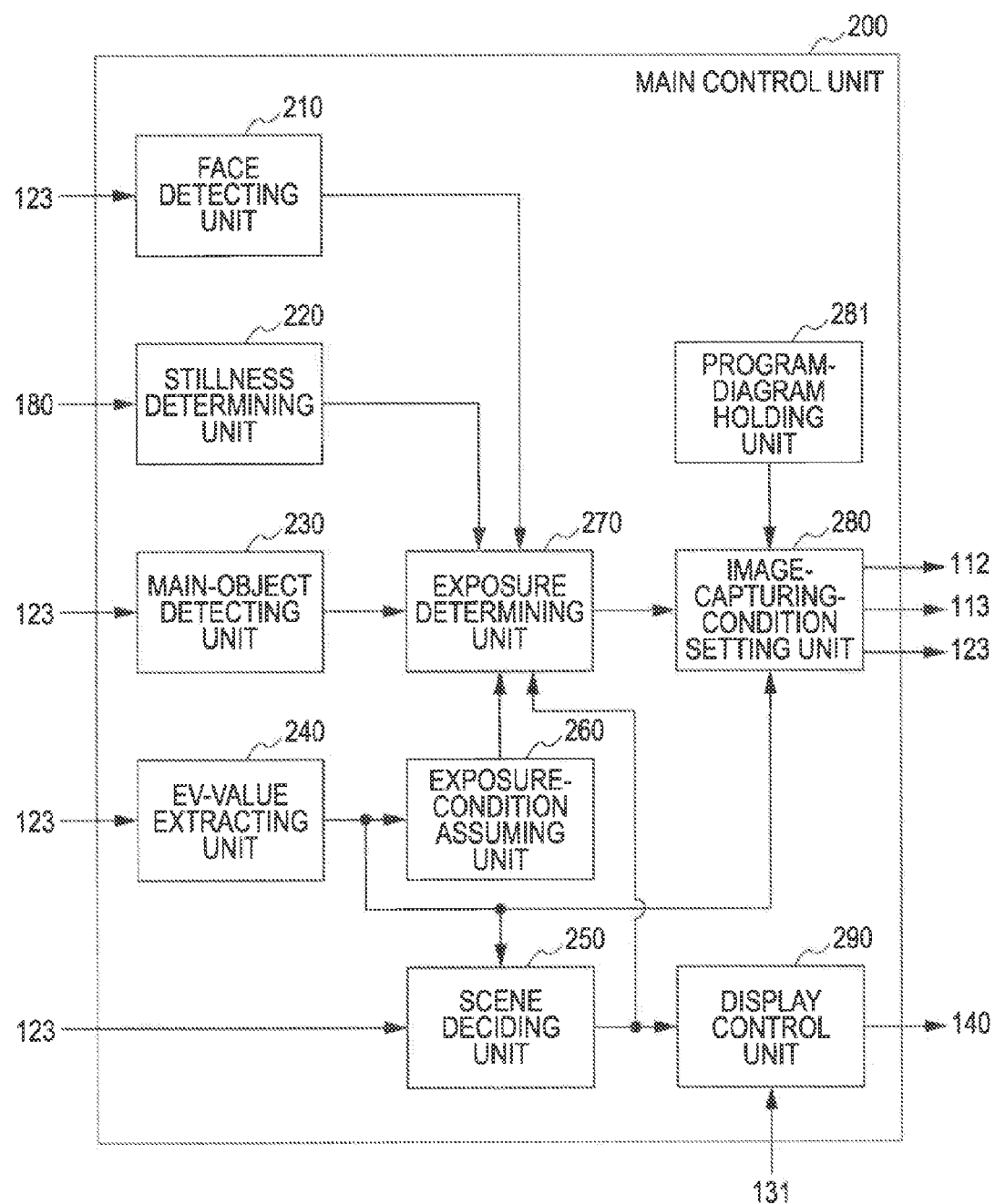
FIG. 2 is a block diagram showing an exemplary functional structure of a main control unit according to the embodiment of the present invention.

FIG. 2 is a block diagram showing an exemplary functional structure of the main control unit 200 according to the embodiment of the present invention. The main control unit 200 includes a face detecting unit 210, a stillness determining unit 220, a main-object detecting unit 230, an exposure value (EV)-value extracting unit 240, a scene deciding unit 250, an exposure-condition assuming unit 260, an exposure determining unit 270, a program-diagram holding unit 281, an image-capturing-condition setting unit 280, and a display control unit 290. FIG. 2 shows, among functional structures in the main control unit 200, only the exemplary functional structure relating to setting of image capturing conditions, and the other functional structures are omitted. The face detecting unit 210, the stillness determining unit 220, the main-object detecting unit 230, and the scene deciding unit 250 are controlled independently of one another. In FIG. 2, the case where the main control unit 200 executes a program recorded in the EEPROM 171 is described by way of example. Alternatively, the functional structure shown in FIG. 2 may be realized by using hardware.

The face detecting unit 210 detects the face of a person included in a captured image corresponding to an image signal output from the digital-signal processing unit 123. The face detecting unit 210 outputs information of the detected face to the exposure determining unit 270. Face detecting methods that can be used here include a face detecting method performed by matching a template having recorded therein information of a distribution of luminance values of a face with a real image, and a face detecting method based on a feature amount of a person's skin portion or face included in a captured image. Information of a face is, for example, information indicating whether a face has been detected in a captured image (whether there is a face).

The stillness determining unit 220 performs a motion-blur correction calculating process based on a voltage value output from the blur detecting unit 180 and calculates a numeric value corresponding to the voltage value (the amount of blur due to the movement of the image capturing apparatus 100). The stillness determining unit 220 compares the calculated amount of blur with the amount of blur at the time the image capturing apparatus 100 is still, determines whether the image capturing apparatus 100 is still on the basis of the comparison result, and outputs the determination result (whether the image capturing apparatus 100 is still) to the exposure determining unit 270. Specifically, the stillness determining unit 220 calculates the amount of deviation by comparing the calculated amount of blur with the amount of blur at the time the image capturing apparatus 100 is still and determines whether the image capturing apparatus 100 is still on the basis of the amount of deviation and the time.

The main-object detecting unit 230 detects a main object included in a captured image corresponding to an image signal output from the digital-signal processing unit 123. The main-object detecting unit 230 outputs information of the detected main object to the exposure determining unit 270. Main-object detecting methods that can be used here include a detection method of detecting whether a captured image includes a main object by comparing a luminance value of the captured image, which is obtained when the light emitting unit 192 performs a preliminary light emitting operation, with a predetermined value. Detection of a main object is performed when, for example, the shutter release button 131 is pressed halfway in the case where the current scene is determined to be a dark scene darker than or equal to a predetermined level, or when the current scene is determined to be a nighttime scene or a backlit scene and no face is detected. Information of a main object is, for example, information indicating whether a main object has been detected in a captured image (whether there is a main object).

The EV-value extracting unit 240 detects an EV value indicating brightness of an object included in a captured image on the basis of an AE signal output from the digital-signal processing unit 123. The EV-value extracting unit 240 outputs the detected EV value to the scene deciding unit 250, the exposure-condition assuming unit 260, and the image-capturing-condition setting unit 280.

The scene deciding unit 250 determines the scene of an object included in a captured image corresponding to an image signal output from the digital-signal processing unit 123 on the basis of the image signal output from the digital-signal processing unit 123 and the EV value output from the EV-value extracting unit 240. The scene deciding unit 250 outputs the determined scene to the exposure determining unit 270 and the display control unit 290. The scene of an object included in a captured image may be, for example, a nighttime scene including the outdoors in the nighttime serving as the object, an indoor scene including the interior of a building serving as the object, or a backlit scene including a target having the sun behind the target, which serves as the object. The scene deciding unit 250 will be described in detail with reference to FIG. 3.

The exposure-condition assuming unit 260 calculates a difference by comparing the EV value output from the EV-value extracting unit 240 with a predetermined threshold and assumes exposure conditions on the basis of the calculated difference. For example, when the EV value output from the EV-value extracting unit 240 is less than the predetermined threshold, exposure may be insufficient. Thus, the exposure-condition assuming unit 260 assumes exposure conditions to reduce the shutter speed and the iris size and to increase the gain in the AGC processing. In contrast, when the EV value output from the EV-value extracting unit 240 is greater than or equal to the predetermined threshold, exposure may be excessive. Thus, the exposure-condition assuming unit 260 assumes exposure conditions to increase the shutter speed and the iris size and to reduce the gain in the AGC processing. In the embodiment of the present invention, among exposure conditions assumed by the exposure-condition assuming unit 260, the iris size is indicated as a reference iris size Ie, the shutter speed is indicated as a reference shutter speed Te, and the gain is indicated as a reference gain Ge.

The exposure determining unit 270 determines whether the reference iris size Ie, the reference shutter speed Te, and the reference gain Ge assumed as exposure conditions by the exposure-condition assuming unit 260 are appropriate on the basis of the scene of the object included in the captured image, which is output from the scene deciding unit 250, information indicating whether there is a face, which is output from the face detecting unit 210, information indicating whether the image capturing apparatus 100 is still, which is output from the stillness determining unit 220, and information indicating whether the captured image includes a main object, which is output from the main-object detecting unit 230. The exposure determining unit 270 selects a program diagram on the basis of the determination result and outputs information indicating the selected program diagram and the items of information on which the determination has been made to the image-capturing-condition setting unit 280.

The program-diagram holding unit 281 holds a plurality of program diagrams corresponding to individual image capturing modes that can be set. The program-diagram holding unit 281 supplies the held program diagrams to the image-capturing-condition setting unit 280. In this example, the example in which the program diagrams are held in the program-diagram holding unit 281 in the main control unit 200 will be described. Alternatively, for example, the program diagrams may be held in the EEPROM 171, and the program diagrams held in the EEPROM 171 may be supplied to the image-capturing-condition setting unit 280.

The image-capturing-condition setting unit 280 changes a program diagram corresponding to an image capturing mode designated by the user to the program diagram selected by the exposure determining unit 270 and determines exposure conditions on the basis of the EV value output from the EV-value extracting unit 240. On the basis of the determined exposure conditions, the image-capturing-condition setting unit 280 outputs control signals for controlling the iris mechanism unit 112 and the shutter mechanism unit 113 to the iris mechanism unit 112 and the shutter mechanism unit 113, respectively. In addition, the image-capturing-condition setting unit 280 controls image capturing mode setting and low illuminance correction in accordance with image capturing conditions. Further, when the shutter release button 131 is pressed (fully-pressed state), if the scene of an object included in a captured image is determined to be a specific scene, such as a nighttime scene or a backlit scene, the image-capturing-condition setting unit 280 performs control to record captured images using at least two different image capturing/recording parameters. When the shutter release button 131 is pressed halfway, at least two different image capturing/recording parameters are established. The two different image capturing/recording parameters include, for example, an image capturing/recording parameter designated by the user and an image capturing/recording parameter according to the determined scene.

The display control unit 290 displays a scene recognition icon corresponding to the scene of an object included in a captured image, which is output from the scene deciding unit 250, on the display unit 140. Display examples of the scene recognition icon displayed on the display unit 140 will be described in detail with reference to FIGS. 29A to 30B.

Figure 3:
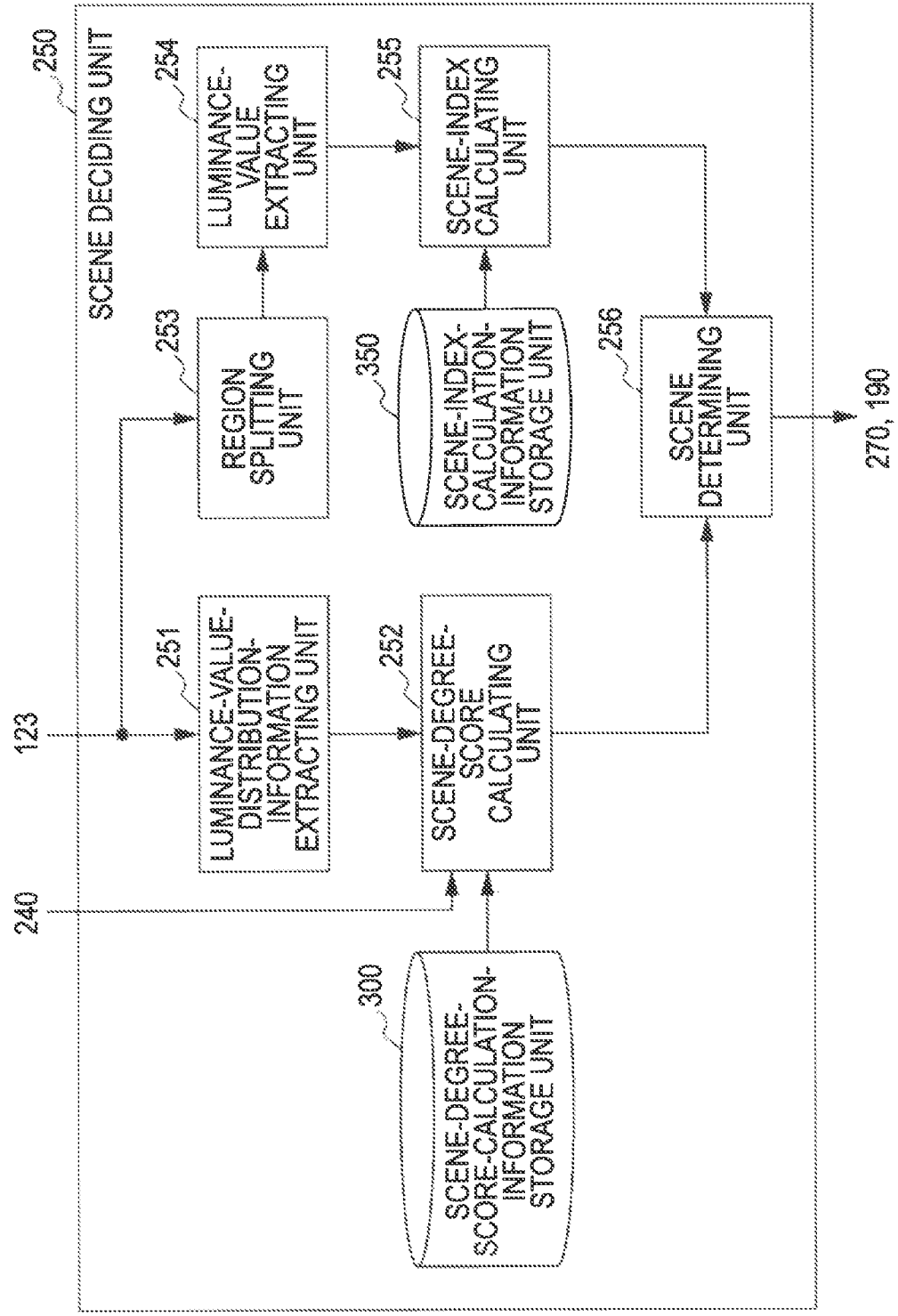
FIG. 3 is a block diagram showing an exemplary functional structure of a scene determining unit according to the embodiment of the present invention.

FIG. 3 is a block diagram showing an exemplary functional structure of the scene deciding unit 250 according to the embodiment of the present invention. The scene deciding unit 250 includes a luminance-value-distribution-information extracting unit 251, a scene-degree-score-calculation-information storage unit 300, a scene-degree-score calculating unit 252, a region splitting unit 253, a luminance-value extracting unit 254, a scene-index-calculation-information storage unit 350, a scene-index calculating unit 255, and a scene determining unit 256.

The luminance-value-distribution-information extracting unit 251 extracts a histogram indicating a distribution of luminance values in a captured image corresponding to an image signal output from the digital-signal processing unit 123. The luminance-value-distribution-information extracting unit 251 outputs the extracted histogram to the scene-degree-score calculating unit 252.

The scene-degree-score-calculation-information storage unit 300 stores scene-degree-score calculation information used by the scene-degree-score calculating unit 252 when calculating a scene degree score. The scene-degree-score-calculation-information storage unit 300 supplies the stored scene-degree-score calculation information to the scene-degree-score calculating unit 252. The scene-degree-score calculation information stored in the scene-degree-score-calculation-information storage unit 300 will be described in detail with reference to FIG. 4.

The scene-degree-score calculating unit 252 calculates a scene degree score using the scene-degree-score calculation information stored in the scene-degree-score-calculation-information storage unit 300 on the basis of the EV value output from the EV-value extracting unit 240 and the histogram output from the luminance-value-distribution-information extracting unit 251. The scene-degree-score calculating unit 252 outputs the calculated scene degree score to the scene determining unit 256. The scene degree score is a score for determining the scene of an object included in a captured image corresponding to an image signal output from the digital-signal processing unit 123. Calculation of a scene degree score will be described in detail with reference to FIG. 13A to FIG. 15B.

The region splitting unit 253 splits a captured image corresponding to an image signal output from the digital-signal processing unit 123 into a plurality of regions. The region splitting unit 253 outputs the captured image and information of the split regions to the luminance-value extracting unit 254.

The luminance-value extracting unit 254 extracts luminance values in each region split from the captured image using the region splitting unit 253 and outputs the extracted luminance values to the scene-index calculating unit 255 on a region-by-region basis.

The scene-index-calculation-information storage unit 350 stores scene-index calculation information used by the scene-index calculating unit 255 when calculating a scene index. The scene-index-calculation-information storage unit 350 supplies the stored scene-index calculation information to the scene-index calculating unit 255. The scene-index calculation information stored in the scene-index-calculation-information storage unit 350 will be described in detail with reference to FIG. 5.

The scene-index calculating unit 255 calculates a scene index using the scene-index calculation information stored in the scene-index-calculation-information storage unit 350 on the basis of the luminance values in each region, which are output from the luminance-value extracting unit 254. The scene-index calculating unit 255 outputs the calculated scene index to the scene determining unit 256. The scene index is an index for determining the scene of an object included in a captured image corresponding to an image signal output from the digital-signal processing unit 123. Calculation of a scene index will be described in detail with reference to FIG. 21A to FIG. 26B.

The scene determining unit 256 determines the scene of an object included in a captured image corresponding to an image signal output from the digital-signal processing unit 123 using at least one of the scene degree score output from the scene-degree-score calculating unit 252 and the scene index output from the scene-index calculating unit 255. The scene determining unit 256 outputs the determined scene to the exposure determining unit 270 and the display control unit 290.

Figure 4:
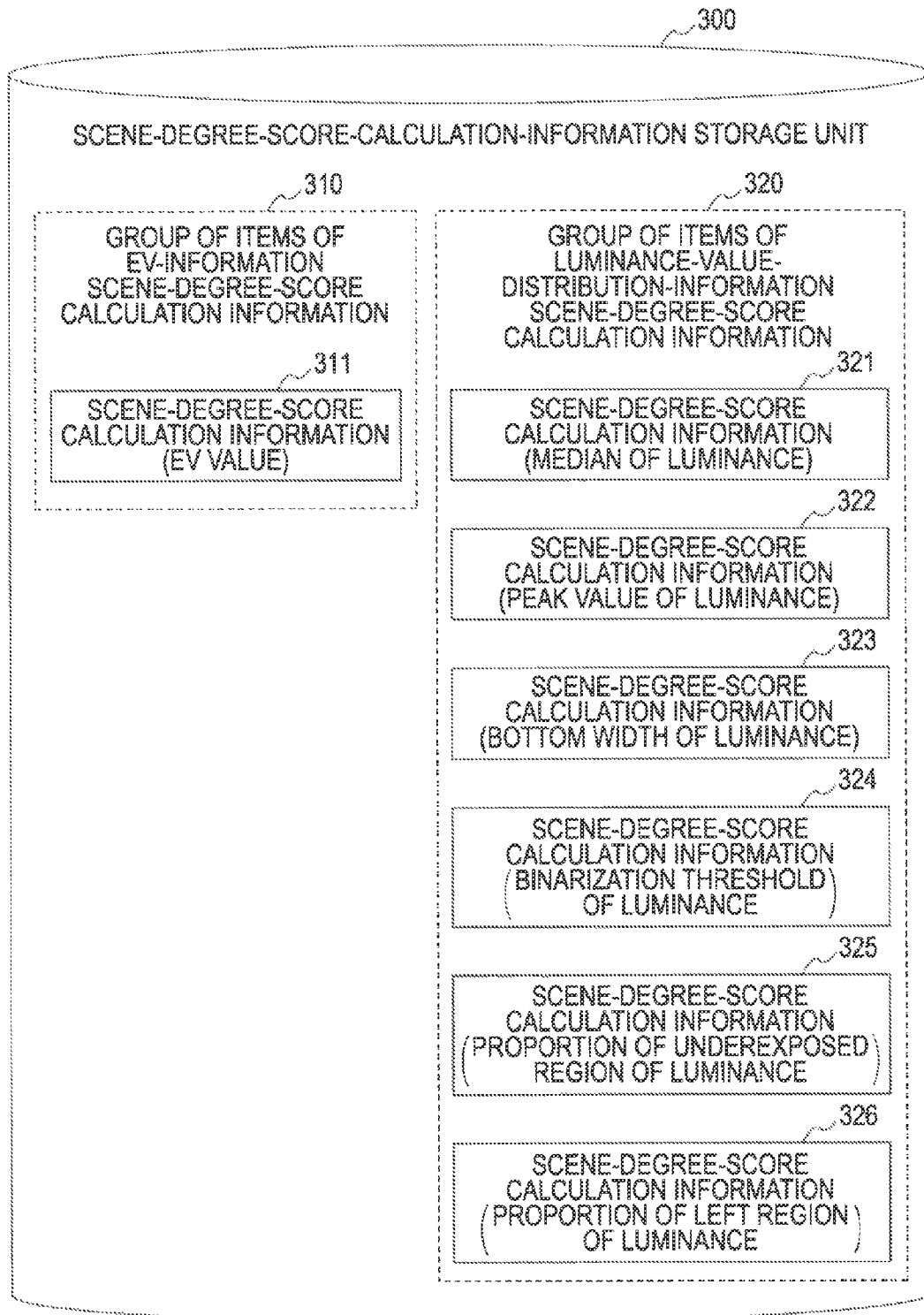
FIG. 4 is a diagram schematically showing scene-degree-score calculation information stored in a scene-degree-score-calculation-information storage unit according to the embodiment of the present invention.

FIG. 4 is a diagram schematically showing scene-degree-score calculation information stored in the scene-degree-score-calculation-information storage unit 300 according to the embodiment of the present invention. The scene-degree-score-calculation-information score-calculation-information storage unit 300 stores scene-degree-score calculation information (EV value) 311, scene-score-calculation-information degree-score calculation information (median of luminance) 321, scene-degree-score calculation information (peak value of luminance) 322, scene-degree-score calculation information (bottom width of luminance) 323, scene-degree-score calculation information (binarization threshold of luminance) 324, scene-degree-score calculation information (proportion of an underexposed region of luminance) 325, and scene-degree-score calculation information (proportion of a left region of luminance) 326. In FIG. 4, scene-degree-score calculation information generated on the basis of an EV value extracted from an image is indicated in a group of items of EV-information scene-degree-score calculation information 310, and scene-degree-score calculation information generated on the basis of a histogram extracted from an image is indicated in a group of items of luminance-value-distribution-information scene-degree-score calculation information 320.

In the embodiment of the present invention, a scene degree score of each scene of a captured image is calculated using these items of scene-degree-score calculation information. A scene corresponding to the highest scene degree score among calculated scene degree scores is determined to be the scene of an object included in the captured image. These items of scene-degree-score calculation information will be described in detail with reference to FIG. 13A to FIG. 15B.

Figure 5:
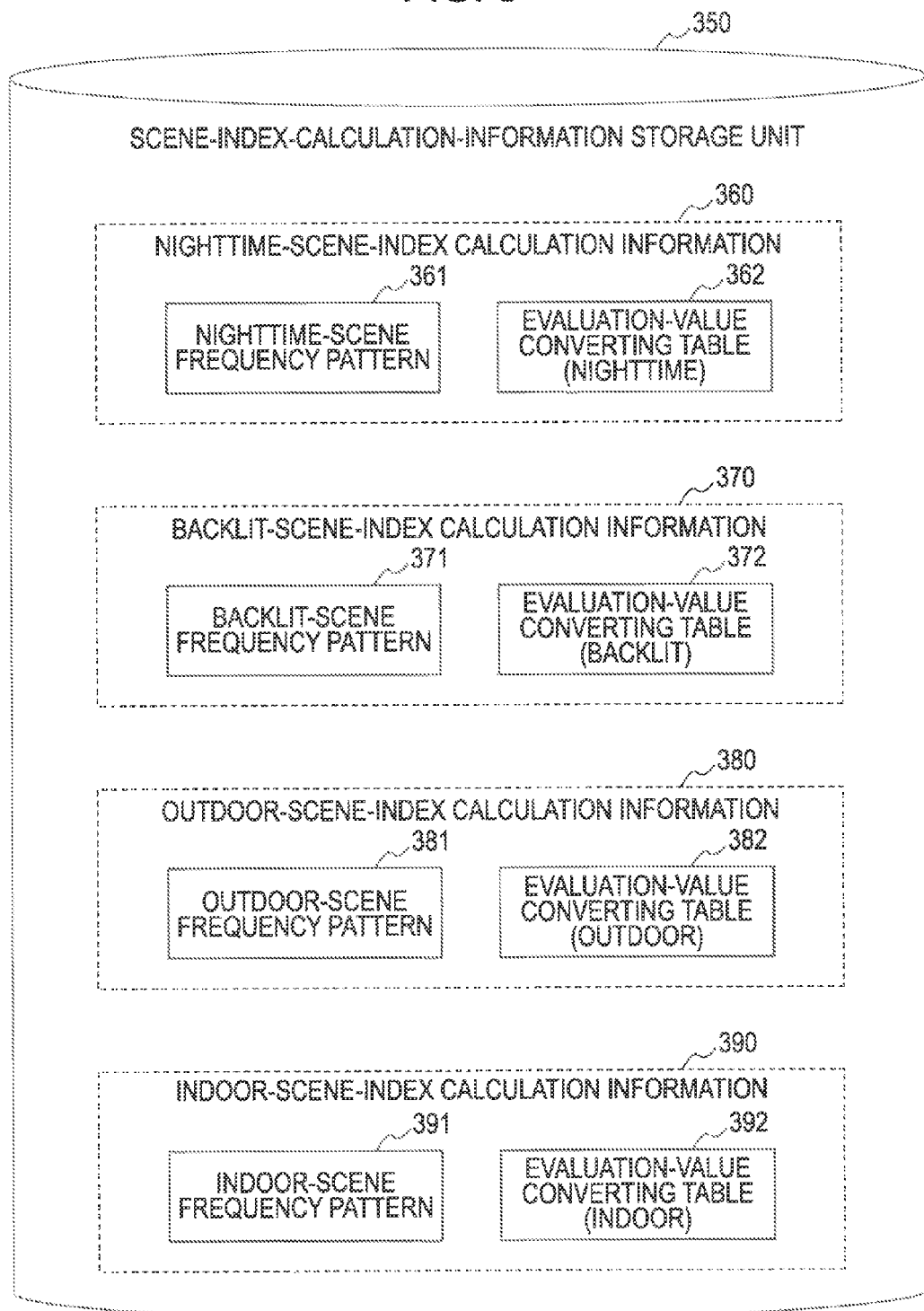
FIG. 5 is a diagram schematically showing scene-index calculation information stored in a scene-index-calculation-information storage unit according to the embodiment of the present invention.

FIG. 5 is a diagram schematically showing scene-index calculation information stored in the scene-index-calculation-information storage unit 350 according to the embodiment of the present invention. The scene-index-calculation-information storage unit 350 stores nighttime-scene-index calculation information 360, backlit-scene-index calculation information 370, outdoor-scene-index calculation information 380, and indoor-scene-index calculation information 390. The items of scene-index calculation information store scene frequency patterns 361, 371, 381, and 391 and evaluation-value converting tables 362, 372, 382, and 392, respectively. The scene frequency patterns 361, 371, 381, and 391 are patterns for classifying predetermined regions split from a captured image on the basis of tendency of the luminance mean value according to each scene. The evaluation-value converting tables 362, 372, 382, and 392 are used in obtaining an evaluation value for calculating a scene index on the basis of the mean value of luminance values extracted from each of predetermined regions split from a captured image and the individual regions classified according to the scene frequency patterns.

In the embodiment of the present invention, a scene index of each scene of a captured image is calculated using these items of scene-index calculation information. A scene corresponding to a calculated scene index greater than or equal to a threshold is determined to be the scene of an object included in the captured image. If there is a plurality of scene indices greater than or equal to the threshold, a scene corresponding to the highest scene index among these scene indices is determined to be the scene of the object included in the captured image. Alternatively, a scene determining condition may be a condition that a scene determined on the basis of a scene degree score calculated for each scene of the captured image is equivalent to a scene determined on the basis of a scene index calculated for each scene of the captured image.

Next, scene determination performed by the scene deciding unit 250 will be described in detail with reference to the drawings. In the embodiment of the present invention, an example where which scene, a nighttime scene, an indoor scene, an outdoor scene, and a backlit scene, is the scene of an object included in a captured image is determined will be described. First, a method of generating scene-degree-score calculation information, which is used to calculate a scene degree score, will be described. Each captured image shown in the embodiment of the present invention is assumed to be a color image.

Figure 6:
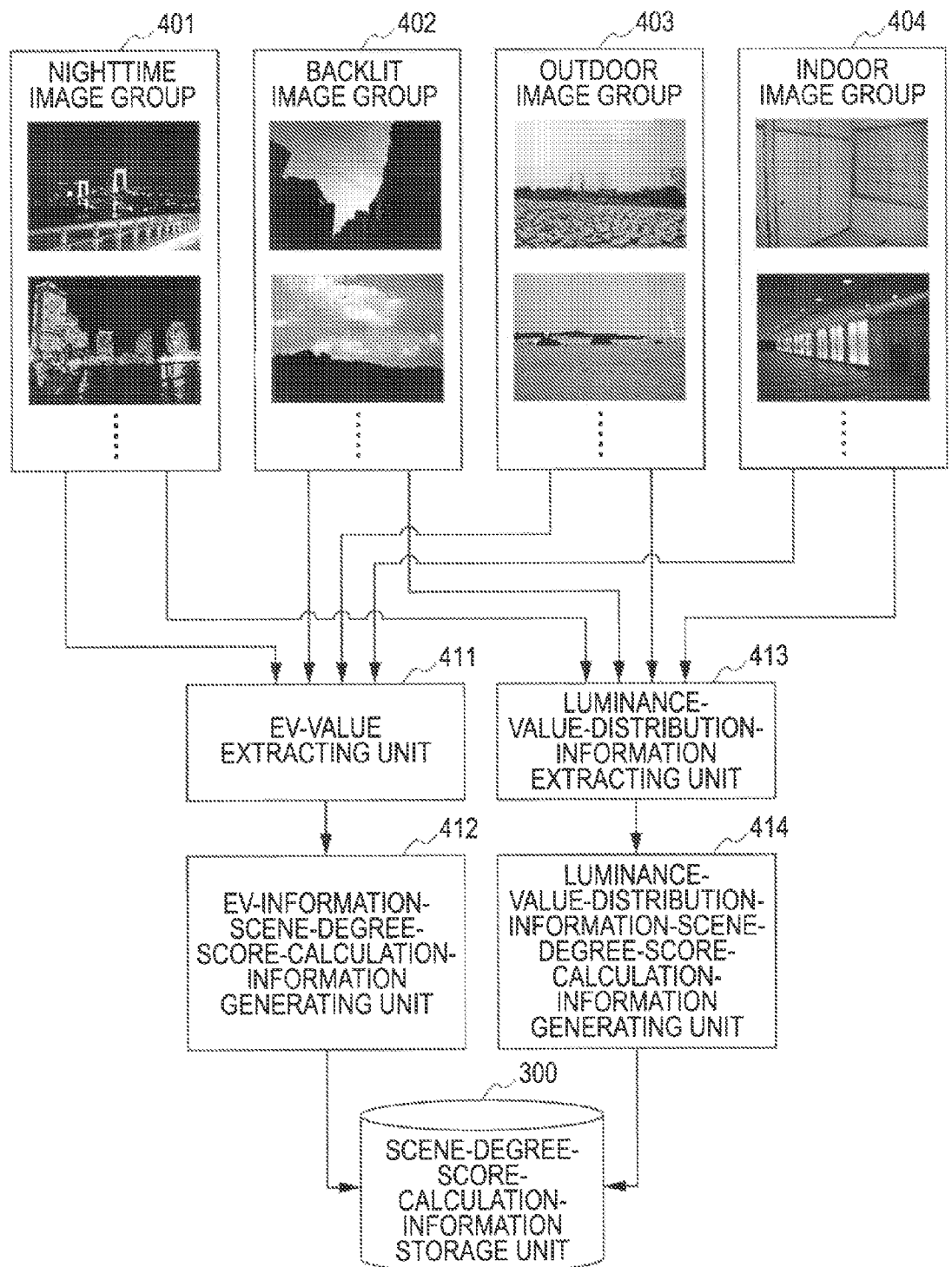
FIG. 6 is a diagram showing the outline of a method of generating scene-degree-score calculation information according to the embodiment of the present invention.

FIG. 6 is a diagram showing the outline of a method of generating scene-degree-score calculation information according to the embodiment of the present invention. In FIG. 6, an example in which scene-degree-score calculation information regarding nighttime scenes, indoor scenes, outdoor scenes, and backlit scenes is generated will be described. Referring to FIG. 6, an EV-value extracting unit 411 and an EV-information-scene-degree-score-calculation-information generating unit 412 generate EV-information scene-degree-score calculation information of each scene on the basis of captured images included in a plurality of groups of images 401 to 404, e.g., a nighttime image group 401, a backlit image group 402, an outdoor image group 403, and an indoor image group 404. A luminance-value-distribution-information extracting unit 413 and a luminance-value-distribution-information-scene-degree-score-calculation-information generating unit 414 luminance-value-distribution-information scene-degree-score calculation information of each scene on the basis of the captured images included in the plurality of groups of images 401 to 404. The generated items of scene-degree-score calculation information are stored in the scene-degree-score-calculation-information storage unit 300.

Alternatively, generation of such items of scene-degree-score calculation information may be performed by the image capturing apparatus 100 using captured images recorded in the recording unit 150, or by an image processing apparatus such as a personal computer using captured images recorded using the image capturing apparatus 100 or another image capturing apparatus. When scene-degree-score calculation information is generated by an image processing apparatus different from the image capturing apparatus 100, the generated scene-degree-score calculation information is input to the image capturing apparatus 100 and stored in the scene-degree-score-calculation-information storage unit 300.

The nighttime image group 401 is a set of images each of which is obtained by capturing an image of a nighttime scene (such as a bridge across the sea or the appearance of a building) serving as an object. The backlit image group 402 is a set of images each of which is obtained by capturing an image of backlit outdoors (such as a mountain or the appearance of a building) serving as an object. The outdoor image group 403 is a set of images each of which is obtained by capturing an image of outdoors (such as a grass field or a park field) serving as an object. The indoor image group 404 is a set of images each of which is obtained by capturing an image of the interior of a building (such as the interior of various buildings) serving as an object. Classification of these scenes may be performed by the user or the developer. Alternatively, classification of these scenes may be performed using a learning device based on a machine learning algorithm such as Ada-Boost.

The EV-value extracting unit 411 extracts EV values from the images included in the nighttime image group 401, the backlit image group 402, the outdoor image group 403, and the indoor image group 404. The EV-value extracting unit 411 outputs the extracted EV values to the EV-information-scene-degree-score-calculation-information generating unit 412.

The EV-information-scene-degree-score-calculation-information generating unit 412 accumulates the EV values output from the EV-value extracting unit 411 on an image-group-by-image-group basis, calculates an evaluation value parameter regarding the EV information on an image-group-by-image-group basis on the basis of the accumulation result for each image group, and generates EV-information scene-degree-score calculation information on the basis of the evaluation value parameter. The generated items of EV-information scene-degree-score calculation information are stored in the scene-degree-score-calculation-information storage unit 300. These items of EV-information scene-degree-score calculation information will be described in detail with reference to FIG. 8.

The luminance-value-distribution-information extracting unit 413 extracts a histogram indicating a distribution of luminance values in each of the images included in the nighttime image group 401, the backlit image group 402, the outdoor image group 403, and the indoor image group 404. The luminance-value-distribution-information extracting unit 413 outputs the extracted histograms to the luminance-value-distribution-information-scene-degree-score-calculation-information generating unit 414.

The luminance-value-distribution-information-scene-degree-score-calculation-information generating unit 414 accumulates luminance-value-distribution information output from the luminance-value-distribution-information extracting unit 413 on an image-group-by-image-group basis, calculates an evaluation value parameter regarding the luminance-value-distribution information on an image-group-by-image-group basis on the basis of the accumulation result for each image group, and generates luminance-value-distribution-information scene-degree-score calculation information on the basis of the evaluation value parameter. The generated items of luminance-value-distribution-information scene-degree-score calculation information are stored in the scene-degree-score-calculation-information storage unit 300. These items of luminance-value-distribution-information scene-degree-score calculation information will be described in detail with reference to FIG. 13A to FIG. 15B.

As has been described above, items of scene-degree-score calculation information can be obtained by performing statistical learning using a plurality of captured images that have already been recorded. Since large-capacity storage devices such as large-capacity hard disk drives (HDDs) can be purchased at low prices in recent years, many and various images such as images captured using a digital still camera or the like can be managed as image data. A large number of images in various patterns are stored in a large-capacity storage device. By performing statistical learning using these images in various patterns, scene-degree-score calculation information is generated. By using the scene-degree-score calculation information, multiple scenes can be distinguished with high accuracy. When the user of the image capturing apparatus 100 performs classification of scenes, scene-degree-score calculation information for performing scene determination in accordance with the user's preferences can be generated.

Figure 7:
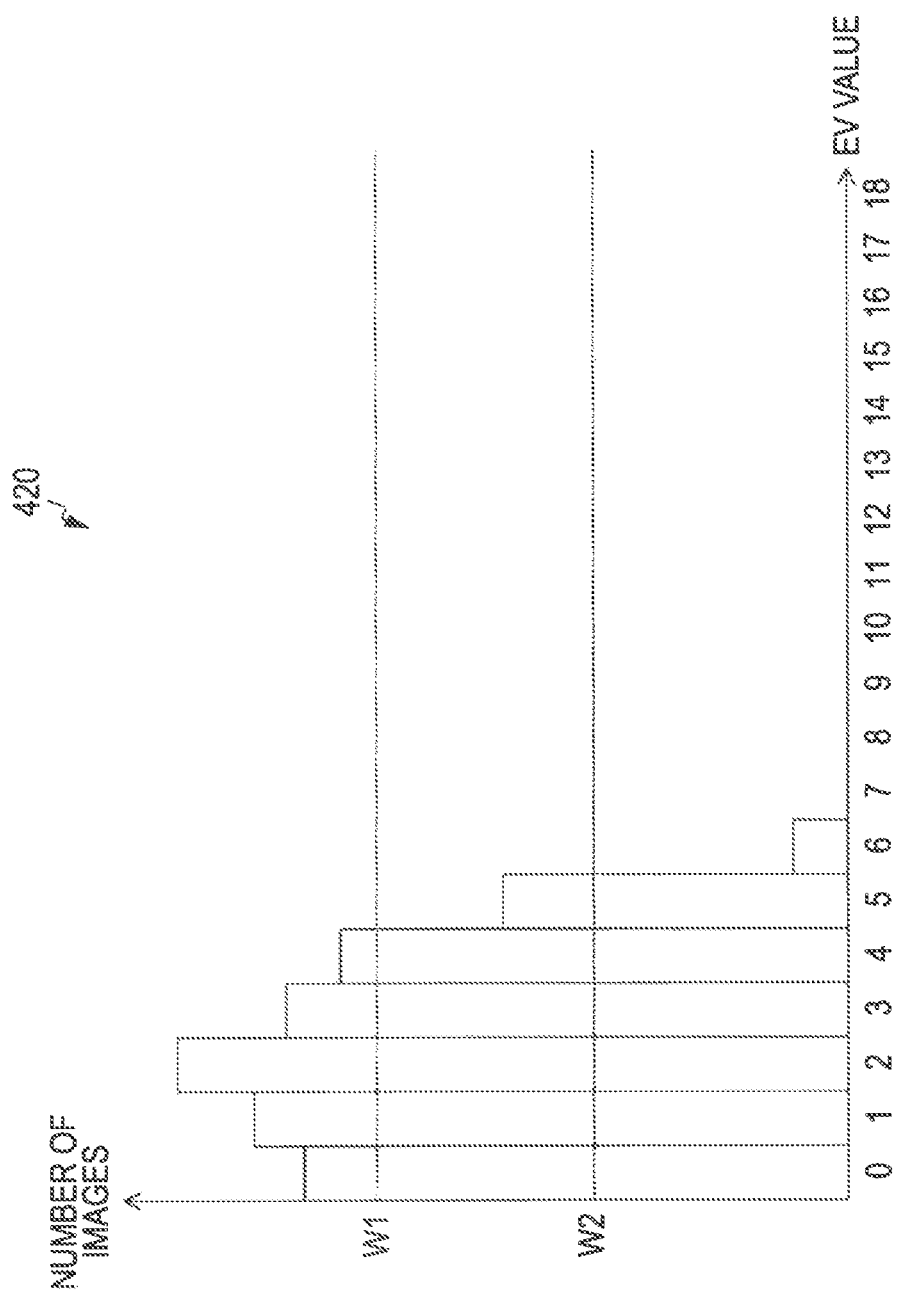
FIG. 7 is a diagram schematically showing a histogram of EV values extracted by an EV-value extracting unit according to the embodiment of the present invention.

FIG. 7 is a diagram schematically showing a histogram of EV values extracted by the EV-value extracting unit 411 according to the embodiment of the present invention. FIG. 7 shows an EV information histogram 420 obtained by classifying EV values extracted from images included in the nighttime image group 401 into 19 levels and accumulating the classified EV values. In the EV information histogram 420, the EV values classified into 19 levels are plotted in the abscissa, and the frequency (the number of captured images) is plotted in the ordinate. A histogram of each scene often has a characteristic distribution according to each scene. For example, since the images included in the nighttime image group 401 are images of nighttime scenes, many of the images are relatively dark images and have relatively low EV values. Therefore, the frequencies of levels having low EV values are higher in the EV information histogram 420. In this manner, EV-information evaluation value parameters are generated using a characteristic distribution according to each scene.

For example, thresholds W1 and W2 (W2<W1) are set in the EV information histogram 420. The EV values are classified into a group of regions whose frequencies in the EV information histogram 420 are greater than or equal to the threshold W1, a group of regions whose frequencies are greater than or equal to the threshold W2 and less than the threshold W1, a group of regions whose frequencies are less than the threshold W2, and a group of regions whose frequencies are "0". In FIG. 7, the frequencies of EV values=0 to 4 are greater than or equal to the threshold W1. The frequency of EV value=5 is greater than or equal to the threshold W2 and less than the threshold W1. The frequency of EV value=6 is less than the threshold W2. The frequencies of EV values=7 to 18 are "0". On the basis of the groups of the classified regions, as shown in FIG. 8, EV-information scene-degree-score calculation information can be calculated.

Figure 8:
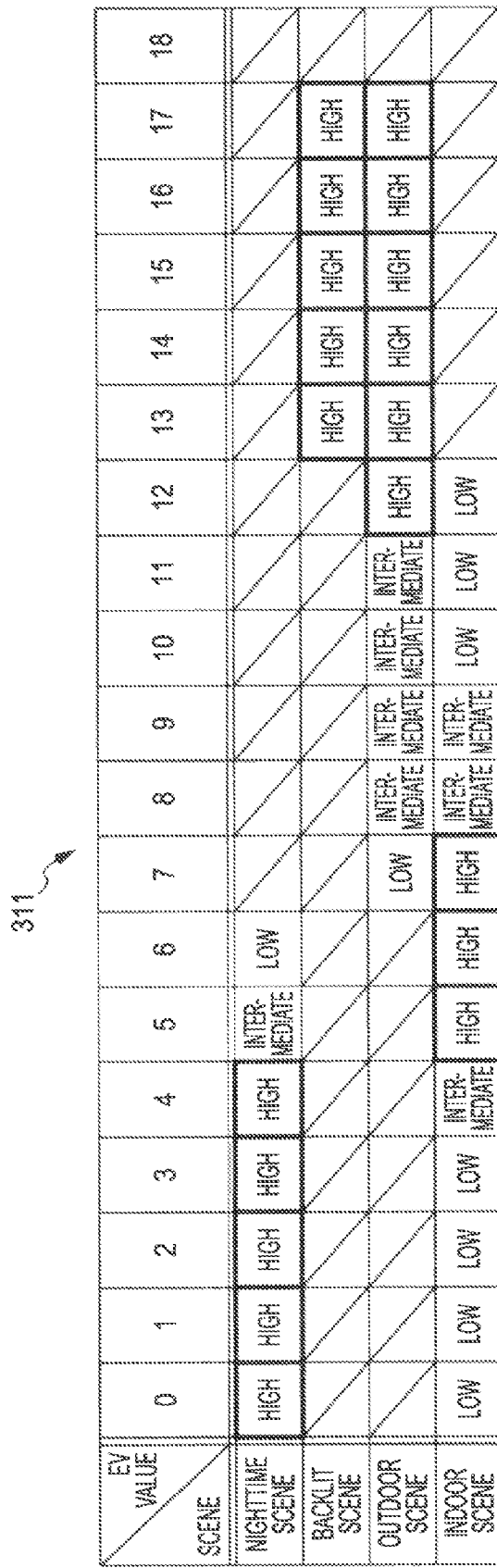
FIG. 8 is a diagram showing scene-degree-score calculation information (EV value) which is an example of scene-degree-score calculation information storing EV-information evaluation value parameters generated for each scene.

FIG. 8 is a diagram showing the scene-degree-score calculation information (EV value) 311 which is an example of scene-degree-score calculation information storing EV-information evaluation value parameters generated for each scene. As has been described above, an EV-information evaluation value parameter is determined for each of the four groups of the classified regions in the EV information histogram corresponding to each scene. In FIG. 8, regions whose frequencies in individual EV information histograms are greater than or equal to the threshold W1 are indicated as "high"; regions whose frequencies are greater than or equal to the threshold W2 and less than the threshold W1 are indicated as "intermediate"; regions whose frequencies are less than the threshold W2 are indicated as "low"; and regions whose frequencies are "0" are indicated by slanted lines. In FIG. 8, the frame of a region whose frequency in a corresponding EV information histogram is greater than or equal to the threshold W1 ("high" region) is shown in bold. As indicated by the "high" regions in the scene-degree-score calculation information (EV value) 311, captured images can be roughly grouped into outdoor/backlit scenes and indoor/nighttime scenes using the EV values. That is, many of images corresponding to outdoor/backlit scenes are relatively bright images. Therefore, the "high" regions in the scene-degree-score calculation information (EV value) 311 are often concentrated on the relatively right side. In contrast, many of images corresponding to indoor/nighttime scenes are relatively dark images. Therefore, the "high" regions in the scene-degree-score calculation information (EV value) 311 are often concentrated on the relatively left side.

Similarly, it may be conceivable to group the scenes into roughly determined scenes using the EV values. For example, when the EV value is 16, the scene is determined to be a "sunny scene". When the EV value is 11, the scene is determined to be a "cloudy scene". When the EV value is 6, the scene is determined to be a "dark indoor scene". When the EV value is 3, the scene is determined to be a "nighttime scene". However, for example, when there is a dark scene, it is often difficult to distinguish between a nighttime scene and an indoor scene. Similarly, it is difficult in many cases to distinguish other scenes. Therefore, it is important to increase the accuracy of distinguishing these scenes from one another. In the embodiment of the present invention, scene determination using EV information and luminance-value-distribution information is performed. Accordingly, the accuracy of determining each scene can be improved.

Next, a method of generating luminance-value-distribution-information scene-degree-score calculation information will be described in detail with reference to the drawings.

FIG. 9 is a diagram showing a histogram representing a distribution of luminance values extracted from an image. A histogram 430 shown in FIG. 9 is a histogram in which luminance values extracted from the whole screen within one captured image included in the image groups 401 to 404 are normalized in 16 steps. In this example, an example of calculating the values of (1) to (6) shown below for each captured image using the color histogram extracted in such a manner will be described. The calculated values of (1) to (6) are accumulated on an image-group-by-image-group basis. On the basis of the accumulation result for each image group, an evaluation value parameter regarding the luminance-value-distribution information is calculated. On the basis of the evaluation value parameter, luminance-value-distribution-information scene-degree-score calculation information is generated.

(1) median of luminance values in the whole histogram;
(2) peak value in the histogram;
(3) bottom width of the histogram;
(4) proportion of an underexposed region in the histogram;
(5) proportion of the left half of the whole histogram; and
(6) binarization threshold using a discriminant analysis method.

Here, (1) median of luminance values of the whole histogram is a median of the frequencies in the whole histogram. That is, the median of luminance values in the whole histogram is a level corresponding to a split region when the area obtained from the frequencies in the whole histogram is split into two regions, a left region and a right region. For example, in the histogram 430, the level "8" is obtained as a median of luminance values in the whole histogram.

(2) The peak value in the histogram is the level at which the frequency is highest within the whole histogram. For example, in the histogram 430, the level "10" is obtained as the peak value in the histogram.

(3) The bottom width of the histogram is, on the basis of the level at which the frequency is lowest within the whole histogram, the level(s) existing within a predetermined range from the level with the lowest frequency. Therefore, a plurality of values may exist as the bottom widths of the histogram. For example, in the histogram 430, the level "7" is obtained as the level at which the frequency is lowest. On the basis of the frequency of the level "7", the levels "5", "6", and "8" existing within a threshold H1 in an upward direction and a threshold H2 in a downward direction from the level "7" are extracted as the bottom widths of the histogram. The range of these bottom widths of the histogram is indicated as D1. The level at which the frequency is lowest within the whole histogram is not included as the bottom width of the histogram.

(4) The proportion of an underexposed region in the histogram is a value indicating the proportion of a frequency corresponding to the level "0" at the left end of the histogram with respect to the whole histogram. A level corresponding to the proportion of the underexposed region of the histogram is indicated as D2.

(5) The proportion of the left half of the whole histogram is a value indicating the proportion of frequencies corresponding to the levels "0 to 7" on the left side of the histogram with respect to the whole histogram. Levels corresponding to the proportion of the left half of the whole histogram are indicated as D3.

(6) A binarization threshold using a discriminant analysis method will be described with reference to FIGS. 9 to 11. A discriminant analysis method is an analysis method of extracting a predetermined region from an image by splitting gradation values of the image into two classes. The value k at the position at which the maximum separation between the two classes occurs (that is, the position at which the interclass variance of the two classes becomes maximum) is calculated as a threshold. For example, in the histogram 430 shown in FIG. 9, pixels constituting a captured image can be classified on the basis of the threshold k into two classes, a class C1 and a class C2. Regarding this classification, for example, the class C1 may serve as a target region, and the class C2 may serve as a background. Alternatively, for example, the class C2 may serve as a target region, and the class C1 may serve as a background.

A calculation of the threshold k will now be described. The statistic of each class depending on the threshold k can be represented as follows:

$$\eta(k) = \sigma_B^2(k)/\sigma_T^2 \quad (1)$$

$$\sigma_B^2(k) = \sum_{j=1,2} \omega_j(k)(\overline{g}_j(k) - \overline{g}_T)^2 \quad (2)$$

$$\sigma_T^2 = \sum_{g=1}^{L} (g - \overline{g}_T)^2 p(g) = \sigma_W^2(k) + \sigma_B^2(k) \quad (3)$$

$$\omega_1(k) = \sum_{g=1}^{k} p(g) \quad (4)$$

$$\omega_2(k) = \sum_{g=k+1}^{L} p(g) \quad (5)$$

$$\overline{g}_1(k) = \sum_{g=1}^{k} gp(g)/\omega_1(k) \quad (6)$$

$$\overline{g}_2(k) = \sum_{g=k+1}^{L} gp(g)/\omega_2(k) \quad (7)$$

$$\sigma_1^2(k) = \sum_{g=1}^{k} (g - \overline{g}_1(k))^2 p(g)/\omega_1(k) \quad (8)$$

$$\sigma_2^2(k) = \sum_{g=k+1}^{L} (g - \overline{g}_2(k))^2 p(g)/\omega_2(k) \quad (9)$$

$$\sigma_W^2(k) = \sum_{j=1,2} \omega_j(k)\sigma_j^2(k) \quad (10)$$

$$\overline{g}_T = \sum_{g=1}^{L} gp(g) = \sum_{j=1,2} \omega_j(k)\overline{g}_j(k) \quad (11)$$

where h(g) (g=1, . . . , L) represents the frequency in the histogram, and p(g) represents a normalized histogram in which p(g)=h(g)/N (N: the number of whole pixels). Equation (1) is an equation for calculating the separation, and the value within 0 and 1 is calculated. Equation (2) is an equation for calculating the interclass variance of two classes. Equation (3) is an equation for calculating the variance of the whole histogram. Equation (10) is an equation for calculating the intraclass variance. Equation (11) is an equation for calculating the mean value in the whole histogram.

Figure 10A:
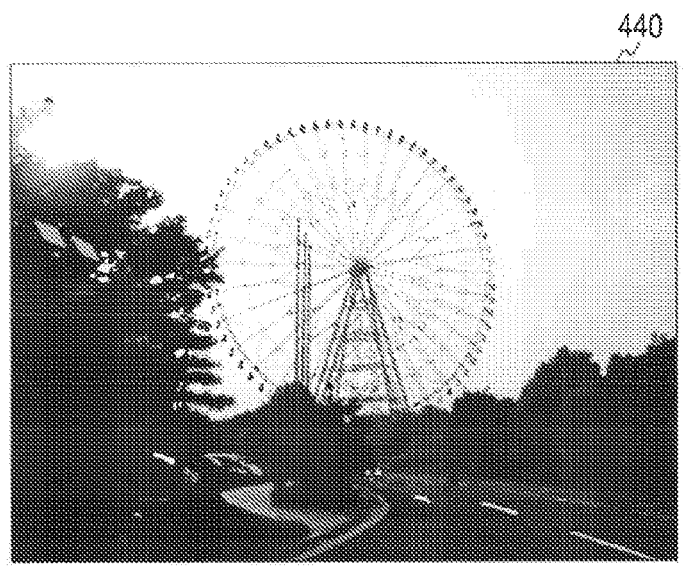
FIG. 10A is a diagram showing a captured image.
Figure 10B:
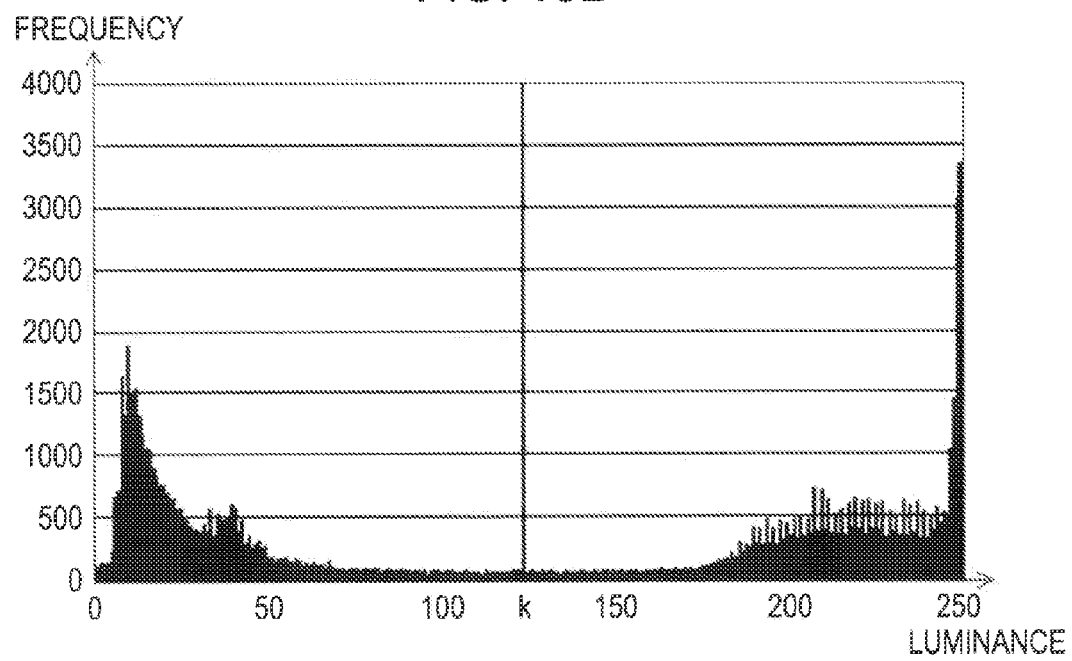
FIG. 10B is a diagram showing a histogram extracted from the captured image shown in FIG. 10A.

FIG. 10A is a diagram showing a captured image, and FIG. 10B is a diagram showing a histogram extracted from the captured image. FIG. 10A shows a captured image 440 which is an image of an amusement park in the evening serving as an object. FIG. 10B shows a histogram extracted from the captured image 440. In the histogram shown in FIG. 10B, which is a histogram normalized in 256 steps, the position of the threshold k calculated using the above-described discriminant analysis method is indicated as a vertical line.

Figure 11:
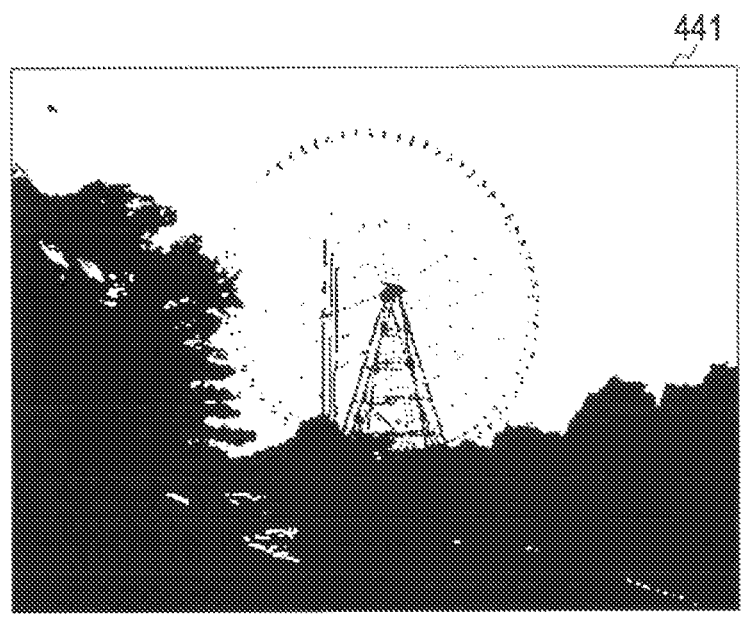
FIG. 11 is a diagram showing a binarized image obtained by using a threshold calculated by performing a discriminant analysis method on a captured image.

FIG. 11 is a diagram showing a binarized image 441 obtained by using the threshold k calculated using the discriminant analysis method performed on the captured image 440. In the histogram shown in FIG. 10B, for example, when pixels corresponding to the left region with respect to the threshold k are black, and pixels corresponding to the right region with respect to the threshold k are white, the binarized image 441 shown in FIG. 11 is generated from the captured image 440 shown in FIG. 10A.

As has been described above, the values of (1) to (6) are calculated for a plurality of images classified on a scene-by-scene basis, and, these values of (1) to (6) are statistically learned, whereby scene-degree-score calculation information is generated.

FIG. 12 is a diagram schematically showing a histogram of medians of luminance values extracted from individual images. Specifically, FIG. 12 shows a luminance-value-distribution-information histogram 450 obtained by classifying medians of luminance values extracted from individual images included in the nighttime image group 401 into 19 levels and accumulating the classified medians of the luminance values. The luminance-value-distribution-information histogram 450 is similar to the histogram shown in FIG. 7 except that the abscissa shows the medians of the luminance values classified into 19 levels. As has been described with reference to FIG. 7, a histogram of each scene often has a characteristic distribution according to each scene. For example, since the images included in the nighttime image group 401 are images of nighttime scenes, many of the images are relatively dark images and have relatively low medians of the luminance values. Therefore, the frequencies of levels having low medians of the luminance values are higher in the luminance-value-distribution-information histogram 450. In this manner, luminance-value-distribution-information evaluation value parameters are generated using a characteristic distribution according to each scene.

In FIG. 12, as in FIG. 7, the regions are classified into four groups of regions using thresholds W1 and W2 (W2<W1). On the basis of the groups of the classified regions, as shown in FIG. 13A to FIG. 15B, an example of calculating luminance-value-distribution-information scene-degree-score calculation information will be described. In the embodiment of the present invention, the example described below uses the same values for the thresholds W1 and W2 (W2<W1) used in calculating EV-information scene-degree-score calculation information and for the thresholds W1 and W2 (W2<W1) used in calculating luminance-value-distribution-information scene-degree-score calculation information. Alternatively, different values may be used. In the embodiment of the present invention, the example described below uses the two thresholds W1 and W2 (W2<W1). Alternatively, one threshold or three or more thresholds may be used to classify the regions of the histogram and, on the basis of the classified regions, scene-degree-score calculation information may be calculated.

FIGS. 13A to 15B are diagrams showing examples of scene-degree-score calculation information storing luminance-value-distribution-information evaluation value parameters generated for each scene. Here, the scene-degree-score calculation information includes, for example, the scene-degree-score calculation information (median of luminance) 321, the scene-degree-score calculation information (peak value of luminance) 322, the scene-degree-score calculation information (bottom width of luminance) 323, the scene-degree-score calculation information (binarization threshold of luminance) 324, the scene-degree-score calculation information (proportion of an underexposed region of luminance) 325, and the scene-degree-score calculation information (proportion of a left region of luminance) 326. As in FIG. 8, regions whose frequencies in individual histograms are greater than or equal to the threshold W1 are indicated as "high"; regions whose frequencies are greater than or equal to the threshold W2 and less than the threshold W1 are indicated as "intermediate"; regions whose frequencies are less than the threshold W2 are indicated as "low"; and regions whose frequencies are "0" are indicated by slanted lines. Additionally, the frame of a region whose frequency in a corresponding histogram is greater than or equal to the threshold W1 ("high" region) is shown in bold. As shown in "high" regions in each item of scene-degree-score calculation information, a characteristic tendency appears in accordance with each scene.

As has been described, according to the embodiment of the present invention, a histogram according to each scene is generated by performing statistical learning of captured images classified on a scene-by-scene basis, and each item of scene-degree-score calculation information is generated on the basis of the histogram. The generated scene-degree-score calculation information is stored in the scene-degree-score-calculation-information storage unit 300.

Next, a scene determining method of determining the scene of an object included in a captured image using scene-degree-score calculation information stored in the scene-degree-score-calculation-information storage unit 300 will be described.

In order to determine the scene of an object included in a captured image, a scene degree score SD is calculated on a scene-by-scene basis using the scene-degree-score calculation information (EV value) 311 shown in FIG. 8, the scene-degree-score calculation information (median of luminance) 321 shown in FIG. 13A, the scene-degree-score calculation information (peak value of luminance) 322 shown in FIG. 13B, the scene-degree-score calculation information (bottom width of luminance) 323 shown in FIG. 14A, the scene-degree-score calculation information (binarization threshold of luminance) 324 shown in FIG. 14B, the scene-degree-score calculation information (proportion of an underexposed region of luminance) 325 shown in FIG. 15A, and the scene-degree-score calculation information (proportion of a left region of luminance) 326 shown in FIG. 15B. On the basis of the calculated scene degree score SD, the scene of the object included in the captured image is determined.

Specifically, for example, it is assumed that an evaluation value corresponding to "high" stored in each item of scene-degree-score calculation information is "1"; an evaluation value corresponding to "intermediate" is "½"; an evaluation value corresponding to "low" is "¼"; and an evaluation value corresponding to a slanted portion is "0".

The EV-value extracting unit 240 extracts an EV value (e.g., "0" to "18") from a captured image corresponding to an image signal output from the digital-signal processing unit 123. The scene-degree-score calculating unit 252 obtains an evaluation value on a scene-by-scene basis from the scene-degree-score calculation information (EV value) 311 corresponding to the extracted EV value. For example, when the extracted EV value is "7", "0" is obtained as an evaluation value of a nighttime scene, "0" is obtained as an evaluation value of a backlit scene, "¼" is obtained as an evaluation value of an outdoor scene, and "1" is obtained as an evaluation value of an indoor scene from the scene-degree-score calculation information (EV value) 311.

The luminance-value-distribution-information extracting unit 251 extracts a histogram from the captured image corresponding to the image signal output from the digital-signal processing unit 123. On the basis of the extracted histogram, the scene-degree-score calculating unit 252 calculates values corresponding to individual items of scene-degree-score calculation information shown in FIGS. 13A to 15B (the median of luminance, the peak value of luminance, the bottom width of luminance, a binarization threshold of luminance, the proportion of an underexposed region of luminance, and the proportion of the left region of luminance). Thereafter, the scene-degree-score calculating unit 252 obtains an evaluation value corresponding to each of the calculated values on a scene-by-scene basis from each item of scene-degree-score calculation information. For example, when the calculated median of luminance is "8", "¼" is obtained as an evaluation value of a nighttime scene, "1" is obtained as an evaluation value of a backlit scene, "1" is obtained as an evaluation value of an outdoor scene, and "1" is obtained as an evaluation value of an indoor scene from the scene-degree-score calculation information (median of luminance) 321. Also, for example, when the calculated peak value of luminance is "9", "0" is obtained as an evaluation value of a nighttime scene, "¼" is obtained as an evaluation value of a backlit scene, "¼" is obtained as an evaluation value of an outdoor scene, and "½" is obtained as an evaluation value of an indoor scene from the scene-degree-score calculation information (peak value of luminance) 322. For the bottom width of luminance, the binarization threshold of luminance, the proportion of an underexposed region of luminance, and the proportion of the left region of luminance, evaluation values are similarly obtained on a scene-by-scene basis.

Thereafter, using the evaluation values obtained from the scene-degree-score calculation information on a scene-by-scene basis, the scene-degree-score calculating unit 252 calculates the scene degree score SD on a scene-by-scene basis using the following equation:

$$SD = (E1 \times wt1) + \{(H1 + H2 + \ldots + Hn-1)/(n-1)\} \times wt2 \quad (12)$$

where n is a natural number, which is "7" in this example; E1 is an evaluation value obtained from the scene-degree-score calculation information (EV value) 311; H1 is an evaluation value obtained from the scene-degree-score calculation information (median of luminance) 321; H2 is an evaluation value obtained from the scene-degree-score calculation information (peak value of luminance) 322; H3 is an evaluation value obtained from the scene-degree-score calculation information (bottom width of luminance) 323; H4 is an evaluation value obtained from the scene-degree-score calculation information (binarization threshold of luminance) 324; H5 is an evaluation value obtained from the scene-degree-score calculation information (proportion of an underexposed region of luminance) 325; and H6 is an evaluation value obtained from the scene-degree-score calculation information (proportion of a left region of luminance) 326.

Further, wt1 and wt2 are values for weighting EV-information scene-degree-score calculation information and luminance-value-distribution-information scene-degree-score calculation information when calculating the scene degree score SD. For example, wt1 can be set as 0.5, and wt2 can be set as 0.5. In this case, weighting of EV-information scene-degree-score calculation information becomes equivalent to weighting of luminance-value-distribution-information scene-degree-score calculation information. Alternatively, for example, wt1 can be set as 0.3, and wt2 can be set as 0.7, or wt1 can be set as 0.1, and wt2 can be set as 0.9. In this way, luminance-value-distribution information can be emphasized. The value within 0 and 1 is calculated as the value of the scene degree score SD.

Regarding the scene degree scores SD calculated in this manner on a scene-by-scene basis, for example, a scene degree score of a nighttime scene is indicated as SD1; a scene degree score of a backlit scene is indicated as SD2; a scene degree score of an outdoor scene is indicated as SD3; and a scene degree score of an indoor scene is indicated as SD4. In this case, the scene determining unit 256 distinguishes each scene by comparing the scene degree scores SD1 to SD4. Specifically, a scene corresponding to the scene degree score SD having the highest value is determined to be a scene corresponding to the captured image corresponding to the image signal output from the digital-signal processing unit 123. That is, the closer the value of the calculated scene degree score SD gets to 1, the more reliable the scene is.

Next, a method of generating scene-index calculation information used in calculating a scene index will be described in detail with reference to the drawing.

Figure 16:
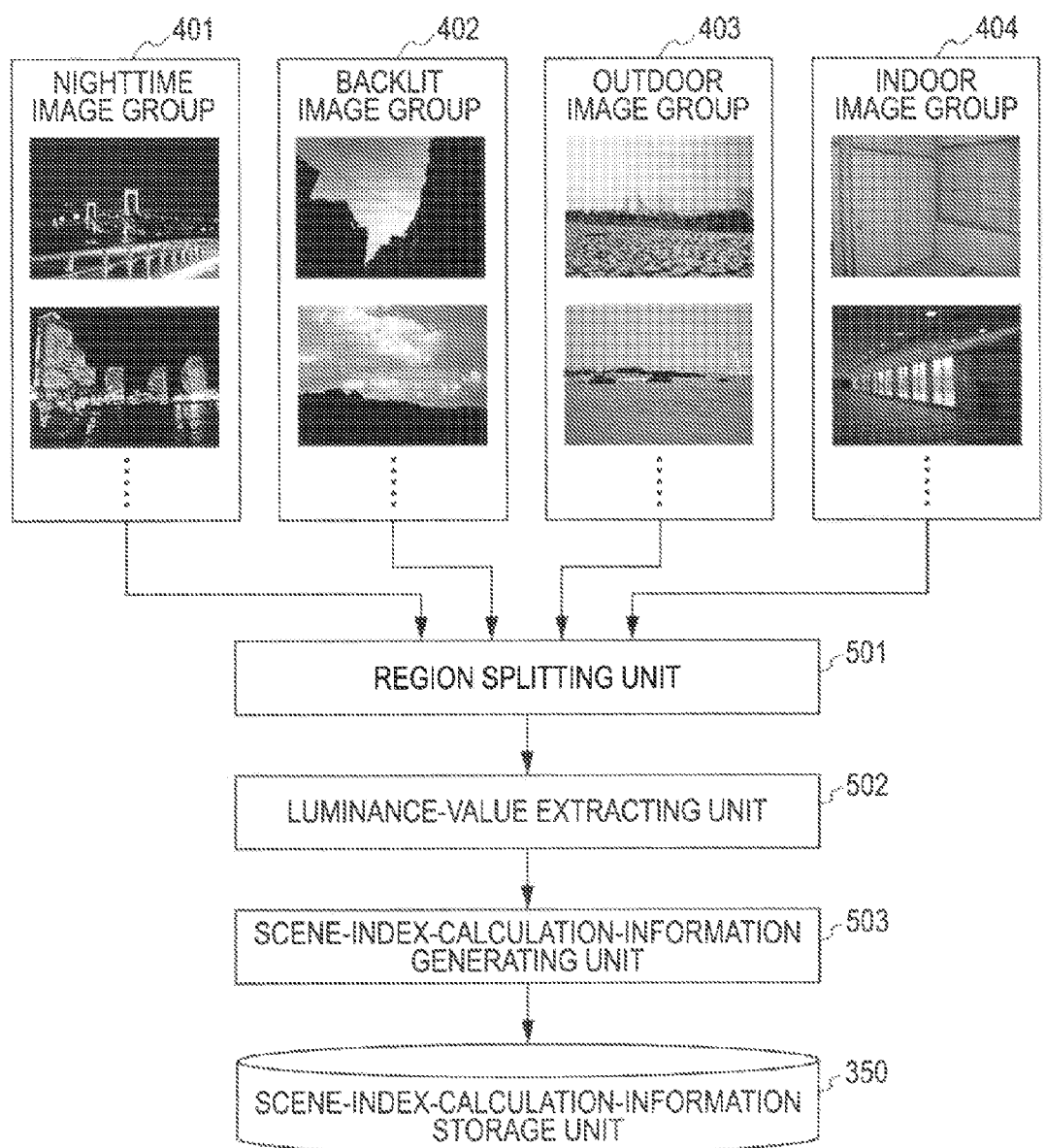
FIG. 16 is a diagram showing the outline of a method of generating scene-index calculation information used in calculating a scene index.

FIG. 16 is a diagram showing the outline of a method of generating scene-index calculation information used in calculating a scene index. In FIG. 16, an example in which scene-index calculation information regarding nighttime scenes, indoor scenes, outdoor scenes, and backlit scenes is generated will be described. As shown in FIG. 16, scene-index calculation information regarding each scene is generated on the basis of the captured images included in the image groups 401 to 404 using a region splitting unit 501, a luminance-value extracting unit 502, and a scene-index-calculation-information generating unit 503. The generated scene-index calculation information is stored in the scene-index-calculation-information storage unit 350. Since the image groups 401 to 404 are the same as the image groups 401 to 404 shown in FIG. 6, a detailed description thereof is not repeated to avoid redundancy.

Generation of such items of scene-index calculation information may be performed by the image capturing apparatus 100 using captured images recorded in the recording unit 150, or by an image processing apparatus such as a personal computer using captured images recorded using the image capturing apparatus 100 or another image capturing apparatus. When scene-index calculation information is generated by an image processing apparatus different from the image capturing apparatus 100, the generated scene-index calculation information is input to the image capturing apparatus 100 and stored in the scene-index-calculation-information storage unit 350.

The region splitting unit 501 is a unit that splits each image included in the nighttime image group 401, the backlit image group 402, the outdoor image group 403, and the indoor image group 404 into a plurality of regions. The region splitting unit 501 outputs the image which has been split and information regarding each of the regions obtained by splitting the image to the luminance-value extracting unit 502. Splitting of an image will be described in detail with reference to FIG. 17.

The luminance-value extracting unit 502 extracts luminance values in each region split from the image using the region splitting unit 501 and outputs the extracted luminance values to the scene-index-calculation-information generating unit 503 on a region-by-region basis.

The scene-index-calculation-information generating unit 503 accumulates, on an image-group-by-image-group basis, the mean value of luminance values output on a region-by-region basis from the luminance-value extracting unit 502 and, on the basis of the accumulation result for each image group, generates scene-index calculation information on an image-group-by-image-group basis. The scene-index calculation information generated on an image-group-by-image-group basis is stored in the scene-index-calculation-information storage unit 350. The scene-index calculation information will be described in detail with reference to FIG. 21 and the like.

As has been described above, items of scene-index calculation information can be obtained by performing statistical learning using a plurality of captured images that have already been recorded. As with the case of scene-degree-score calculation information, by generating scene-index calculation information using a large-capacity storage device, multiple scenes can be distinguished with high accuracy. When the user of the image capturing apparatus 100 classifies scenes, scene-index calculation information for performing scene determination in accordance with the user's preferences can be generated.

FIG. 17 includes diagrams showing the outline of a method of splitting an image into predetermined regions. An image 510 shown in part (a) of FIG. 17 is the same image as the captured image included in the outdoor image group 403, which is shown in FIG. 16. Part (b) of FIG. 17 shows the case where the captured image 510 is split into 49 regions (7×7 regions). Numbers (0 to 48) displayed in the individual regions are identification numbers of the individual regions. The same applies to numbers in the individual regions shown in FIGS. 18 to 20. In this example, the case in which the image is split into 49 regions will be described. However, the case in which the image is split into regions other than 49 regions can be similarly processed.

In this manner, an effective image frame corresponding to an image signal is split into regions each having a predetermined area. The luminance values of pixels included in each split region are extracted. The mean value of the extracted luminance values is calculated on a region-by-region basis. Using the mean value of luminance calculated for each region of each image, a histogram is generated for each group of captured images. On the basis of the histogram, a scene frequency pattern is generated for each group of captured images. The scene frequency pattern indicates the distribution of characteristic regions that occur according to each scene. Hereinafter, the histogram and the scene frequency pattern generated for each group of captured images will be described in detail with reference to the drawings.

Figure 18:
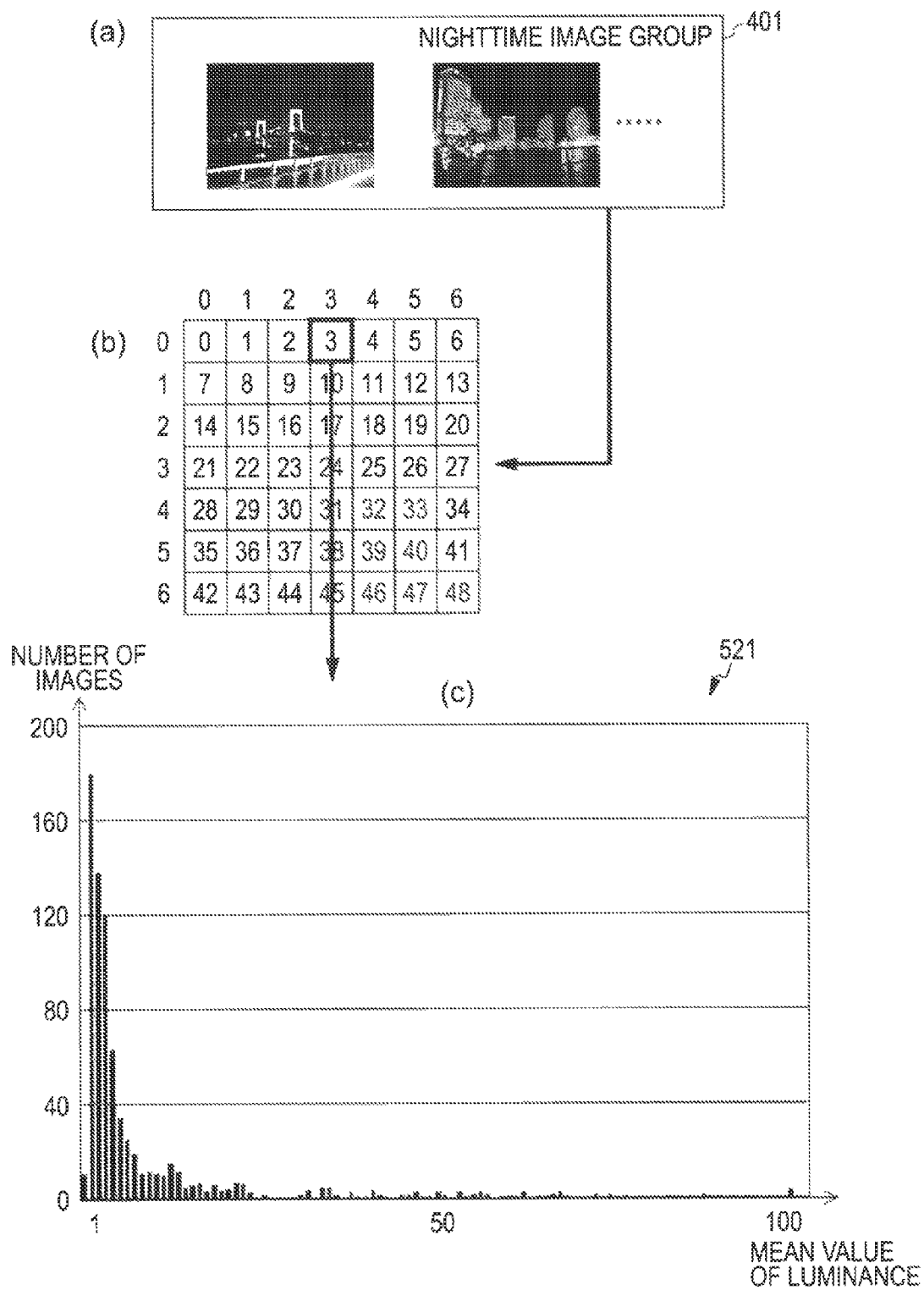
FIG. 18 includes diagrams showing the outline of a case in which a histogram is generated on the basis of a mean value of luminance values in each region, which is calculated from a plurality of captured images.
Figure 19:
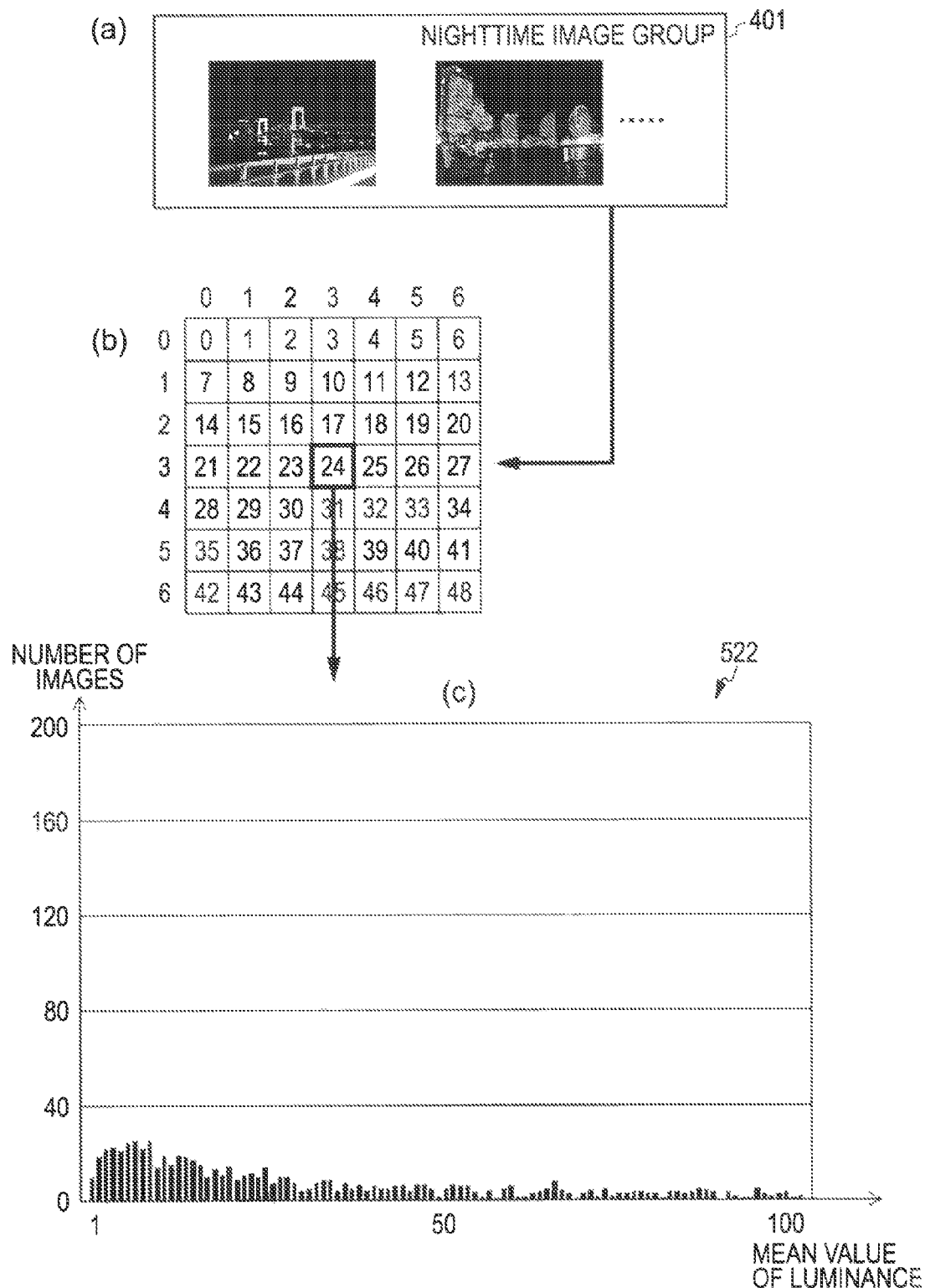
FIG. 19 includes diagrams showing the outline of a case in which a histogram is generated on the basis of a mean value of luminance values in each region, which is calculated from a plurality of captured images.

FIGS. 18 and 19 include diagrams showing the outline of a case in which a histogram is generated on the basis of mean values of luminance values in individual regions, which are calculated from a plurality of captured images. FIG. 18 shows a case in which a histogram is generated for a region having the identification number 3 in each of the images included in the nighttime image group 401. FIG. 19 shows a case in which a histogram is generated for a region having the identification number 24 in each of the images included in the nighttime image group 401. The nighttime image group 401 shown in part (a) of FIG. 18 and part (a) of FIG. 19 is the same as the nighttime image group 401 shown in FIG. 16. As shown in part (b) of FIG. 18 and part (b) of FIG. 19, each of the images included in the nighttime image group 401 is split into 49 regions, and the mean value of luminance values in each region is calculated on an image-by-image basis.

Part (c) of FIG. 18 shows a histogram 521 generated on the basis of the mean values of luminance values, which are calculated on regions having the identification number 3 shown in part (b) of FIG. 18. Part (c) of FIG. 19 shows a histogram 522 generated on the basis of the mean values of luminance values, which are calculated on regions having the identification number 24 shown in part (b) of FIG. 19. In the histograms 521 and 522, the mean value of luminance values is plotted in abscissa, and the frequency (the number of images) is plotted in ordinate. As shown in part (c) of FIG. 18, in an upper central portion of a nighttime image, the frequency of a level having a low mean value of luminance values is higher since there are many dark portions such as the sky in the nighttime. In contrast, as shown in part (c) of FIG. 19, a central portion of a nighttime image often includes portions including a target serving as the center of an object, although the entire image represents a nighttime scene. Thus, the central portion often includes relatively bright portions. Therefore, the mean values of luminance values are distributed over a relatively wide range of levels. Similarly, other regions often have characteristic distributions.

In this manner, a distribution of the mean values of luminance values in individual regions of captured images often is a characteristic distribution on a scene-by-scene basis. In the embodiment of the present invention, regions are classified into a predetermined number of groups of regions having similar distributions in accordance with each scene, and an evaluation value according to each group of classified regions is set, whereby scene-index calculation information is generated. Hereinafter, scene-index calculation information regarding nighttime images and scene-index calculation information regarding backlit images will be described.

FIG. 20 is a diagram showing an example of a scene frequency pattern regarding nighttime images. A nighttime-scene frequency pattern 530 shown in FIG. 20 is obtained by organizing 49 regions of each captured image into groups on the basis of mean values of luminance values calculated from the individual regions. In FIG. 20, groups 531 to 535 are indicated in bold. In nighttime images, upper and lower portions have many dark portions, such as the sky and the ground in the nighttime, and a relatively central portion often includes a relatively bright target serving as the center of an object. Therefore, in the nighttime-scene frequency pattern 530, as the region progresses from the upper and lower portions to the central portion (progresses from the group 531 to the group 535), the region progresses from a group of regions in which the frequency of a level having a low mean value of luminance values is higher to a group of regions in which mean values of luminance values are distributed over a relatively wide range of levels. That is, the nighttime-scene frequency pattern 530 is a frequency pattern in which the groups 531 to 535 are low luminance regions.

FIG. 21A is a diagram showing the case in which, for the nighttime-scene frequency pattern 530 shown in FIG. 20, the same number is given to regions belonging to the same group. That is, the number "1" is given to individual regions included in the group 531; the number "2" is given to individual regions included in the group 532; the number "3" is given to individual regions included in the group 533; the number "4" is given to individual regions included in the group 534; and the number "5" is given to individual regions included in the group 535. A nighttime-scene frequency pattern 540 shown in FIG. 21A is the same as the nighttime-scene frequency pattern 530 shown in FIG. 20 except that the same number is given to regions belonging to the same group.

FIG. 21B is a diagram showing an example of an evaluation-value converting table for determining an evaluation value for each region at the time of calculating a scene index. An evaluation-value converting table 550 shown in FIG. 21B is used to obtain an evaluation value for each of 49 split regions on the basis of the relationship between the groups 531 to 535 in the nighttime-scene frequency pattern 540 shown in FIG. 21A with regions in which mean values of luminance values are extracted. Here, Y1, Y2, Y3, Y4, and Y5 shown in FIG. 21B are values for classifying mean values of luminance values extracted from individual regions, and Y1<Y2<Y3<Y4<Y5. Also, t11 to t16, . . . , t51 to t56 are evaluation values determined in accordance with the mean values of luminance values and groups to which regions in which these mean values are calculated belong. These evaluation values are determined on the basis of statistical learning. For example, an evaluation value becomes larger as the numeric value of t increases. In this manner, scene-index calculation information includes a scene frequency pattern and an evaluation-value converting table.

FIG. 22A is a diagram showing an example of a scene frequency pattern regarding backlit images, and FIG. 22B is a diagram showing an example of an evaluation-value converting table regarding backlit images. A backlit-scene frequency pattern 560 shown in FIG. 22A is obtained by, as with the nighttime-scene frequency pattern 540, organizing 49 regions of each captured image into groups on the basis of mean values of luminance values calculated from the individual regions. In FIG. 22A, groups 561 to 566 are indicated in bold. In backlit images, an upper portion has many bright portions, such as the sky at noon, and accordingly, mean values of luminance values are often distributed over relatively high levels. In contrast, although a lower central portion often includes a person serving as the center of an object, because the person is lit from behind, mean values of luminance values are often distributed over relatively low levels. Therefore, in the backlit-scene frequency pattern 560, as the region progresses from the lower central portion to the upper portion (progresses from the group 566 to the group 561), the region progresses from a group of regions in which the frequency of a level having a low mean value of luminance values is higher to a group of regions in which the frequency of a level having a high mean value of luminance values is higher. That is, the backlit-scene frequency pattern 560 is a frequency pattern in which the groups 566 and 565 are low luminance regions, the groups 564 and 563 are intermediate luminance regions, and the groups 562 and 561 are high luminance regions. The number of groups may be made different according to each scene. For example, the regions are organized into five groups in a scene frequency pattern regarding nighttime images, and the regions are organized into six groups in a scene frequency pattern regarding backlit images.

FIG. 22B shows an evaluation-value converting table 570 for determining an evaluation value for each region at the time of calculating a scene index. The evaluation-value converting table 570 is used to obtain an evaluation value for each of 49 split regions on the basis of the relationship between the groups 561 to 566 in the backlit-scene frequency pattern 560 with regions in which mean values of luminance values are extracted. Since the evaluation-value converting table 570 is similar to the evaluation-value converting table 550 shown in FIG. 21B except that the number of groups and evaluation values are different, a description thereof is not repeated to avoid redundancy.

A scene-index calculating method of calculating a scene index will now be described. In this example, the case in which a scene index regarding a nighttime scene is calculated will be described by way of example.

The region splitting unit 253 splits a captured image corresponding to an image signal output from the digital-signal processing unit 123 into 49 regions. The luminance-value extracting unit 254 extracts luminance values in the individual regions split from the captured image. The scene-index calculating unit 255 calculates the mean value of the luminance values in each region of the captured image and, on the basis of the mean value of the luminance values in each region, calculates a scene index using scene-index calculation information stored in the scene-index-calculation-information-storage unit 350.

Specifically, for example, for a region to which the group number "1" in the nighttime-scene frequency pattern 540 shown in FIG. 21A is given, it is determined to which of the following states the mean value of luminance values calculated from this region corresponds: less than Y1; greater than or equal to Y1 and less than Y2; greater than or equal to Y2 and less than Y3; greater than or equal to Y3 and less than Y4; and greater than or equal to Y4 and less than Y5. For example, when the mean value of luminance values calculated from a region to which the group number "1" is given is less than Y1, "t11" is determined as the evaluation value of the region. For example, when the mean value of luminance values calculated from a region to which the group number "1" is given is greater than or equal to Y1 and less than Y2, "t12" is determined as the evaluation value of the region. Similarly, evaluation values are determined for the 49 regions. Using the evaluation values determined in this manner, a scene index YS1 regarding the nighttime scene is calculated. The scene index YS1 can be obtained by the following equation:

$$YS1=(ER1+ER2+ER3+\ldots ERn)/n \quad (13)$$

where n is the number of split regions; and ER1 ... ERn are evaluation values determined for the individual regions, in which n=49 in this example.

On the basis of the value of the scene index YS1 calculated by using this equation, whether the captured image is a nighttime scene is determined. For example, when the calculated scene index YS1 is greater than or equal to a threshold T1, the captured image can be determined to be a nighttime scene. In this manner, for one captured image, a scene index is calculated on a scene-by-scene basis using scene-index calculation information regarding each scene. For example, when a plurality of scene indices among scene indices calculated for individual scenes are greater than or equal to a threshold, the captured image can be determined to be a scene corresponding to the scene index having the highest value among the scene indices greater than or equal to the threshold.

Figure 23A:
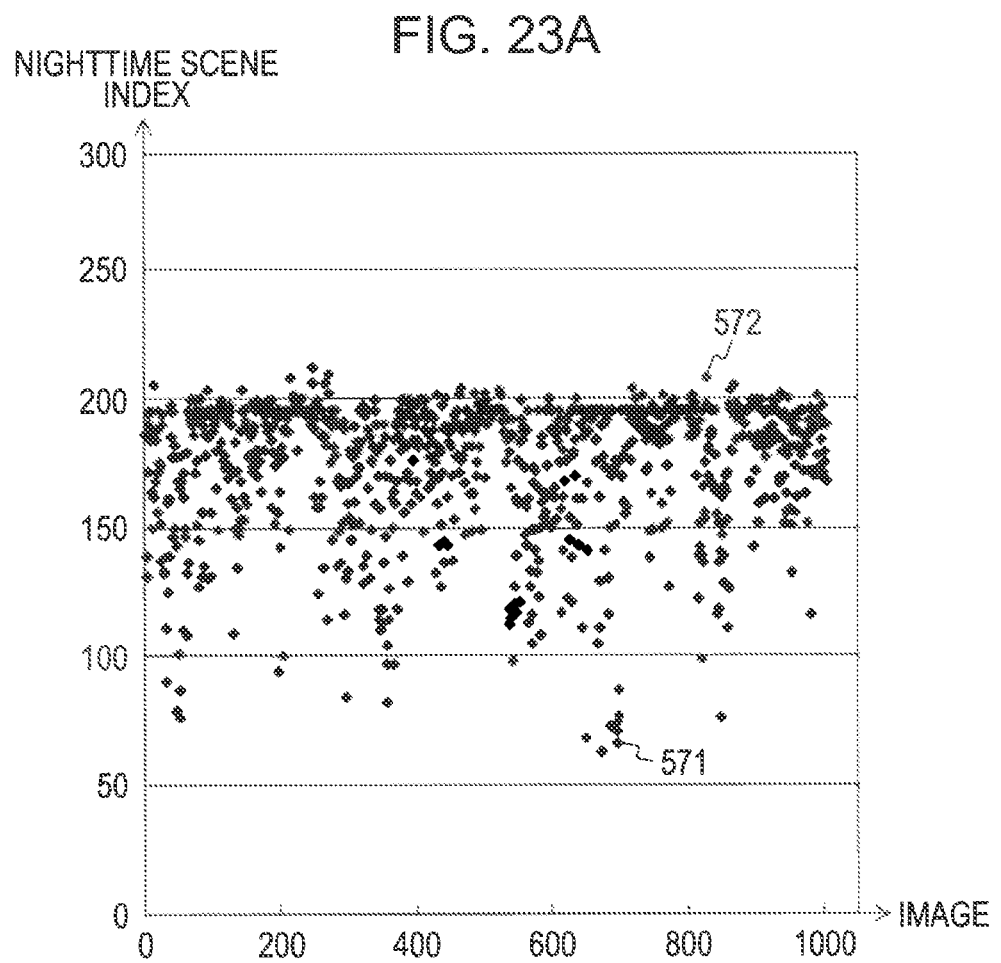
FIG. 23A is a diagram showing a graph representing the relationship between a plurality of captured images and nighttime scene indices calculated for these captured images.

FIG. 23A is a diagram showing a graph representing the relationship between a plurality of captured images and nighttime scene indices calculated for these captured images. In this graph, the identification number of a captured image is plotted in abscissa, and a nighttime scene index is plotted in ordinate. In this graph, for example, when the threshold T1 is 180, a captured image whose nighttime scene index has a value greater than or equal to the threshold T1 can be determined to be a nighttime scene.

Figure 23B:
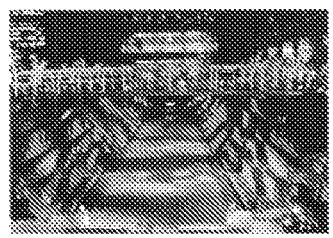
FIGS. 23B and 23C are diagrams showing images captured in relatively dark places.
Figure 23C:
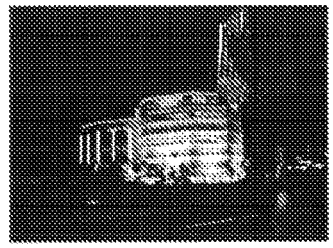

FIGS. 23B and 23C are diagrams showing images captured in relatively dark places. For example, although the captured image shown in FIG. 23B is an image that has been captured on the street in the nighttime, because the captured image is an image of a relatively bright place, a relatively small value (e.g., nighttime scene index: 76) is calculated as a nighttime scene index 571. Therefore, the captured image shown in FIG. 23B is not determined to be a nighttime scene. In contrast, the captured image shown in FIG. 23C is an image that has been captured on the street in the nighttime, and, because the captured image is an image of a relatively dark place, a relatively large value (e.g., nighttime scene index: 208) is calculated as a nighttime scene index 572. Therefore, the captured image shown in FIG. 23C is determined to be a nighttime scene. In this manner, a nighttime scene can be determined only by using a nighttime scene index. However, by correcting the nighttime scene index using a scene-index correction value described below, the accuracy of determining a nighttime scene can be further improved.

Figures 24A, 24B:
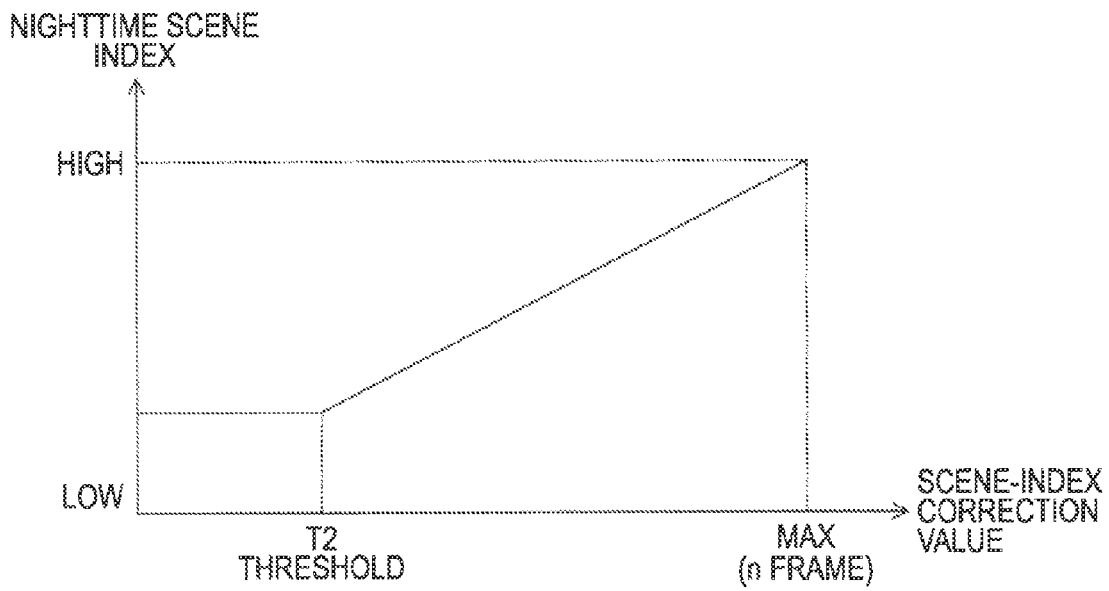
FIG. 24A is a diagram showing an evaluation-value converting table used for calculating a scene-index correction value.
FIG. 24B is a diagram showing a graph representing the relationship between a nighttime scene index and a scene-index correction value.

FIG. 24A is a diagram showing an evaluation-value converting table used for calculating a scene-index correction value. The evaluation-value converting table 550 shown in FIG. 24A is similar to the evaluation-value converting table 550 shown in FIG. 21B except that one portion within each group is indicated in bold. When calculating a scene-index correction value, a predetermined value is counted when one of "t11", "t22", "t33", "t44", and "t55" in bold is determined to be an evaluation value in a corresponding region. For example, "1" is sequentially added as a scene-index correction value.

Specifically, for a region to which the group number "1" is given, when the mean value of luminance values calculated from this region is less than Y1, "1" is added to the scene-index calculation value. For a region to which the group number "2" is given, when the mean value of luminance values calculated from this region is greater than or equal to Y1 and less than Y2, "1" is added to the scene-index calculation value. Similarly, scene-index correction values are calculated for regions to which the group numbers "3" to "5" are given. In contrast, nothing is counted for the scene-index correction value when an evaluation value other than "t11", "t22", "t33", "t44", or "t55" in bold is determined. That is, among evaluation values determined for the 49 regions, those that correspond to "t11", "t22", "t33", "t44", and "t55" are counted for a scene-index correction value.

FIG. 24B is a diagram showing a graph representing the relationship between a nighttime scene index and a scene-index correction value. In the graph shown in FIG. 24B, a scene-index correction value SK is plotted in abscissa, and the value of a nighttime scene index is plotted in ordinate. In this example, as shown in FIGS. 23A to 23C, the value of the calculated nighttime scene index is increased using the scene-index correction value SK. For example, when the scene-index correction value SK is greater than or equal to a threshold T2, as shown in FIG. 24B, the nighttime scene index is increased. In contrast, for example, when the scene-index correction value SK is less than the threshold T2, the nighttime scene index is not increased or decreased. In this manner, attention is paid to the region having the highest frequency among the regions, and the number of regions corresponding to this region is counted, whereby the scene-index correction value SK is calculated. When the scene-index correction value SK is greater than or equal to the threshold T2, a process of increasing the nighttime scene index is performed, thereby further separating a nighttime scene from other scenes. Accordingly, more appropriate scene determination can be performed.

FIG. 25A is a diagram showing a graph representing the relationship between a plurality of captured images and nighttime scene indices calculated for these captured images. This graph is obtained by converting the nighttime scene indices shown in the graph shown in FIG. 23A using the scene-index correction values. For example, when the graph shown in FIG. 25A is compared with the graph shown in FIG. 23A, there are negligible changes in portions where the value of the nighttime scene index is low. However, as the value of the nighttime scene index increases, the nighttime scene index is converted to a higher value. That is, a nighttime scene can be further separated from other scenes, and the accuracy of determining a nighttime scene can be improved. Captured images shown in FIGS. 25B and 25C are the same as those shown in FIGS. 23B and 23C, respectively. For example, for the captured image shown in FIG. 25B, a relatively small value (e.g., nighttime scene index: 76) is calculated as the nighttime scene index 571, and accordingly, the scene-index correction value is not greater than or equal to the threshold T2. Therefore, there is no change in the nighttime scene index. In contrast, for the captured image shown in FIG. 25C, a relatively large value (e.g., nighttime scene index: 284) is calculated as a nighttime scene index 573, and accordingly, the scene-index correction value is greater than or equal to the threshold T2. Therefore, the nighttime scene index is increased.

Figures 26A, 26B:
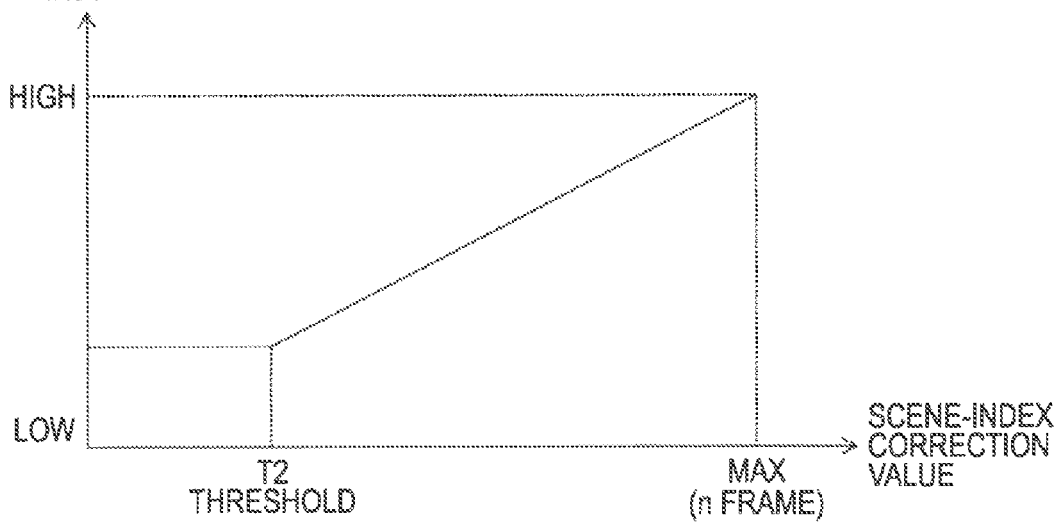
FIG. 26A is a diagram showing an evaluation-value converting table regarding backlit scenes.
FIG. 26B is a diagram showing a graph representing the relationship between a backlit-scene index and a scene-index correction value.

FIG. 26A is a diagram showing an evaluation-value converting table regarding backlit scenes, and FIG. 26B is a diagram showing a graph representing the relationship between a backlit-scene index and a scene-index correction value. The evaluation-value converting table 570 shown in FIG. 26A is similar to the evaluation-value converting table 570 shown in FIG. 22B except that one portion within each group is indicated in bold. When calculating a scene-index correction value regarding a backlit scene, as in FIG. 24A, a predetermined value is counted when one of "s61", "s52", "s43", "s34", "s25", and "s16" in bold is determined to be an evaluation value in a corresponding region. In the graph shown in FIG. 26B, a scene-index correction value SK is plotted in abscissa, and the value of a backlit scene index is plotted in ordinate. Conversion of the backlit scene index is similar to the case of the nighttime scene index shown in FIG. 24B. In this example, the case in which the common threshold T2 is used for nighttime scenes and backlit scenes will be described. Alternatively, a different threshold may be used on a scene-by-scene basis.

As above, the example in which the scene of a captured image is determined using a scene degree score and the example in which the scene of a captured image is determined using a scene index have been described. The scene determination accuracy can be improved by determining a scene using one of a scene degree score and a scene index. However, the scene determination accuracy can be further improved by determining a scene using both a scene degree score and a scene index. Hereinafter, an example in which a scene is determined using a scene degree score and a scene index will be described. For example, the scene with the highest scene degree score is selected. When a scene index calculated for the selected scene is greater than or equal to a threshold, the selected scene can be determined. By determining a scene using a scene degree score and a scene index, the scene determination accuracy can be improved.

Next, the relationship between a determined scene and an image capturing mode will be described.

FIG. 27 is a diagram showing the relationship between image capturing conditions and conditions for setting the image capturing conditions. This example shows the case in which a nighttime scene 601, a backlit scene 602, face detection 603, main-object detection 604 by performing a preliminary light emitting operation, and a still/moving state 605 indicating the still or moving state of the image capturing apparatus 100 are used as conditions for setting image capturing conditions. Also, this example shows the case in which a slow synchronization mode 611, a strobe light emitting mode 612, a high sensitivity mode 613, a nighttime mode 614, a daytime synchronization mode 615, and intensity correction 616 are set as image capturing conditions. These settings will be described in detail with reference to FIGS. 34 to 36.

For example, when capturing a still image of a nighttime scene or an indoor scene, the shutter speed is reduced, resulting in more chances for motion blur to occur. When the shutter speed is increased, although motion blur becomes less likely to occur, a beautiful image of the background may not be captured in a dark scene such as a nighttime scene. In recent years, a method of capturing an image of the background by increasing the amplification gain in AGC processing and capturing an image with high sensitivity has been widely performed. However, since the amount of noise increases by increasing the gain, not all dark scenes including a nighttime scene can be handled. Therefore, according to the embodiment of the present invention, a beautiful image of a dark scene such as a nighttime scene can be captured by determining the still state of the image capturing apparatus 100.

FIGS. 28A and 28B are diagrams showing the outline of low illuminance correction according to the embodiment of the present invention. In this example, low illuminance correction performed when the scene is determined to be a nighttime scene will be described. For example, when the scene is determined to be a nighttime scene, a low illuminance correction process of changing brightness is performed.

In the embodiment of the present invention, scene determination is performed in, for example, a standard mode called an auto mode. The auto mode is an image capturing mode that covers a wide range from a low illuminance scene such as a nighttime scene to a high illuminance scene such as an outdoor scene. Therefore, an exposure condition in the auto mode is different from a predetermined threshold (brightness target value) in the nighttime mode. A process of bringing the brightness level in the auto mode closer to the predetermined threshold in the nighttime mode is performed by performing low illuminance correction in accordance with brightness.

In the graph shown in FIG. 28A, an EV value extracted from a captured image is plotted in abscissa, and a brightness target value is plotted in ordinate. The current EV value extracted from the captured image is indicated as L1. As shown in the graph in FIG. 28A, low illuminance correction is performed on the basis of the EV value extracted from the captured image, thereby bringing the EV value closer to a predetermined threshold in the nighttime mode. In the graph shown in FIG. 28B, a nighttime scene degree score calculated for a captured image is plotted in abscissa, and a brightness target value is plotted in ordinate. The current scene degree score calculated from the captured image is indicated as L2.

In the embodiment of the present invention, besides low illuminance correction shown in FIG. 28A, a process of changing the amount of correction is performed using information of the determined scene. For example, when the scene degree score calculated in a scene determination process is high, correction is performed to further darken the image. Alternatively, for example, when the scene degree score is low, correction is performed to further brighten the image. Specifically, for example, a difference d between a low illuminance correction value corresponding to L1 shown in FIG. 28A and a low illuminance correction value corresponding to L2 shown in FIG. 28B is calculated, and the calculated difference d serves as the amount of correction so as to be reflected in the brightness. In this manner, more appropriate low illuminance correction can be performed by using information of the determined scene.

Alternatively, correction may be performed by using a nighttime scene index, instead of using a nighttime scene degree score. Alternatively, correction may be performed by using both a nighttime scene degree score and a nighttime scene index. Scenes other than a nighttime scene can be similarly processed.

Figure 29A:
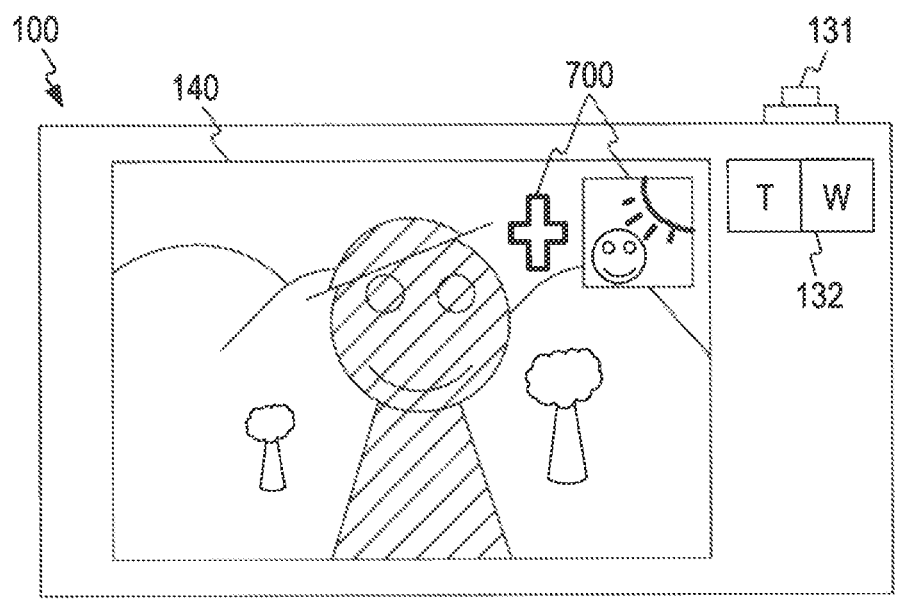
FIGS. 29A and 29B are diagrams showing display examples of a scene recognition icon displayed on a display unit according to the embodiment of the present invention.
Figure 29B:
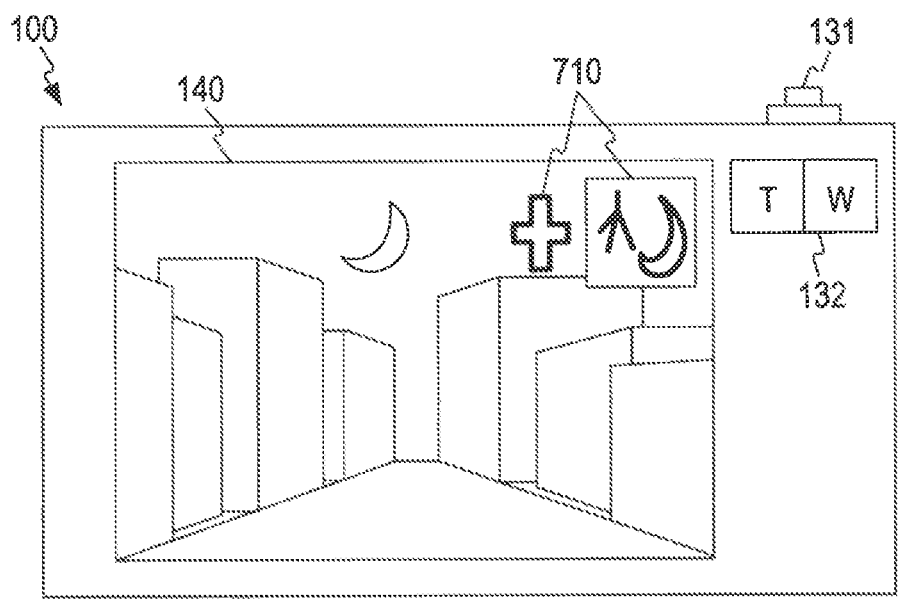
Figure 30A:
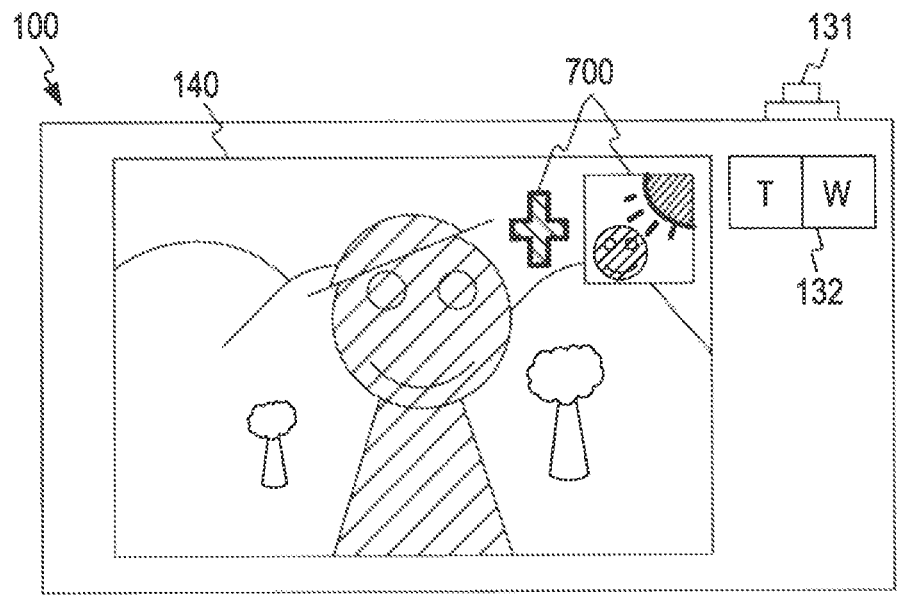
FIGS. 30A and 30B are diagrams showing display examples of the scene recognition icon displayed on the display unit according to the embodiment of the present invention.
Figure 30B:
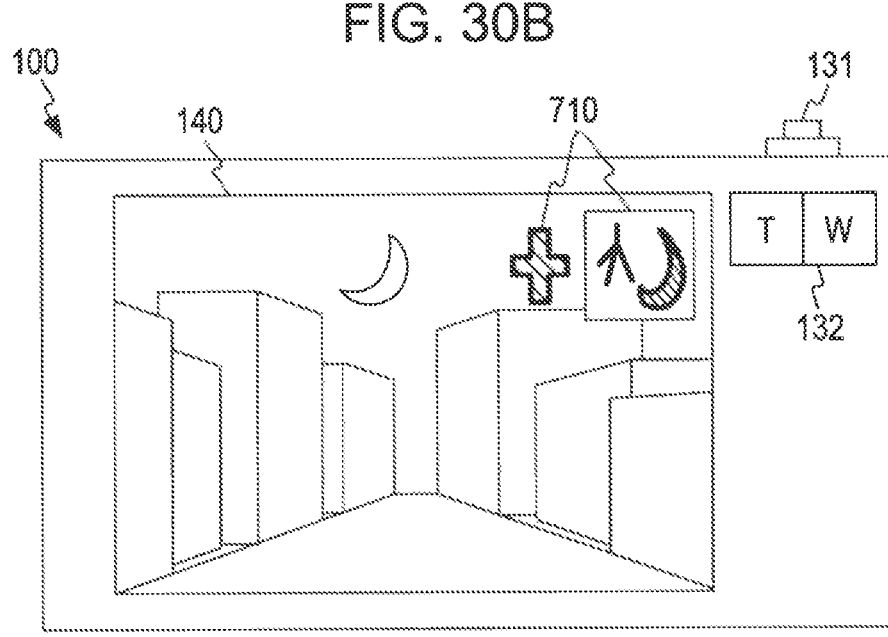

FIGS. 29A to 30B are diagrams showing display examples of the scene recognition icon displayed on the display unit 140 according to the embodiment of the present invention. FIG. 29A shows a backlit-scene recognition icon 700 which is an exemplary scene recognition icon corresponding to a backlit scene. FIG. 29B shows a nighttime-scene recognition icon 710 which is an exemplary scene recognition icon corresponding to a nighttime scene. FIG. 30A shows the backlit-scene recognition icon 700 whose colors have been changed. FIG. 30B shows the nighttime-scene recognition icon 710 whose colors have been changed.

When the same scene has been continuously determined by the scene deciding unit 250 for a predetermined period of time in the case where monitoring is being performed to display a captured image on the display unit 140, a scene recognition icon corresponding to that scene is displayed. For example, as shown in FIG. 29A, when a captured image corresponding to a backlit scene is being displayed on the display unit 140, if a backlit scene has been continuously determined by the scene deciding unit 250 for a predetermined period of time, the backlit-scene recognition icon 700 is displayed, together with the captured image, on the display unit 140.

When the scene recognition icon is being displayed on the display unit 140, if the shutter release button 131 is pressed halfway, for example, as shown in FIGS. 30A and 30B, the colors of the scene recognition icon displayed on the display unit 140 are changed. For example, as shown in FIG. 30A, when the backlit-scene recognition icon 700 is being displayed, together with the captured image, on the display unit 140, if the shutter release button 131 is pressed halfway, the colors of the backlit-scene recognition icon 700 are changed.

For example, when the image capturing apparatus 100 is greatly moved or is at a place where luminance is unstable, displaying of the scene recognition icon hunts so that the scene recognition icon may be displayed and erased in a repeated manner. In contrast, in the embodiment of the present invention, hunting of displaying of the scene recognition icon and repeated displaying/erasing of the scene recognition icon are prevented, and the scene recognition icon can be displayed in a stable manner. Accordingly, the scene recognition icon can be displayed so that the photographer can easily view the displayed scene recognition icon. In the embodiment of the present invention, an example in which the scene recognition icon is displayed as a mark representing each scene on the display unit 140 is described. Alternatively, another mark such as text or an image can be displayed as a mark representing each scene.

Next, the operation of the image capturing apparatus 100 according to the embodiment of the present invention will be described with reference to the drawings.

Figure 31:
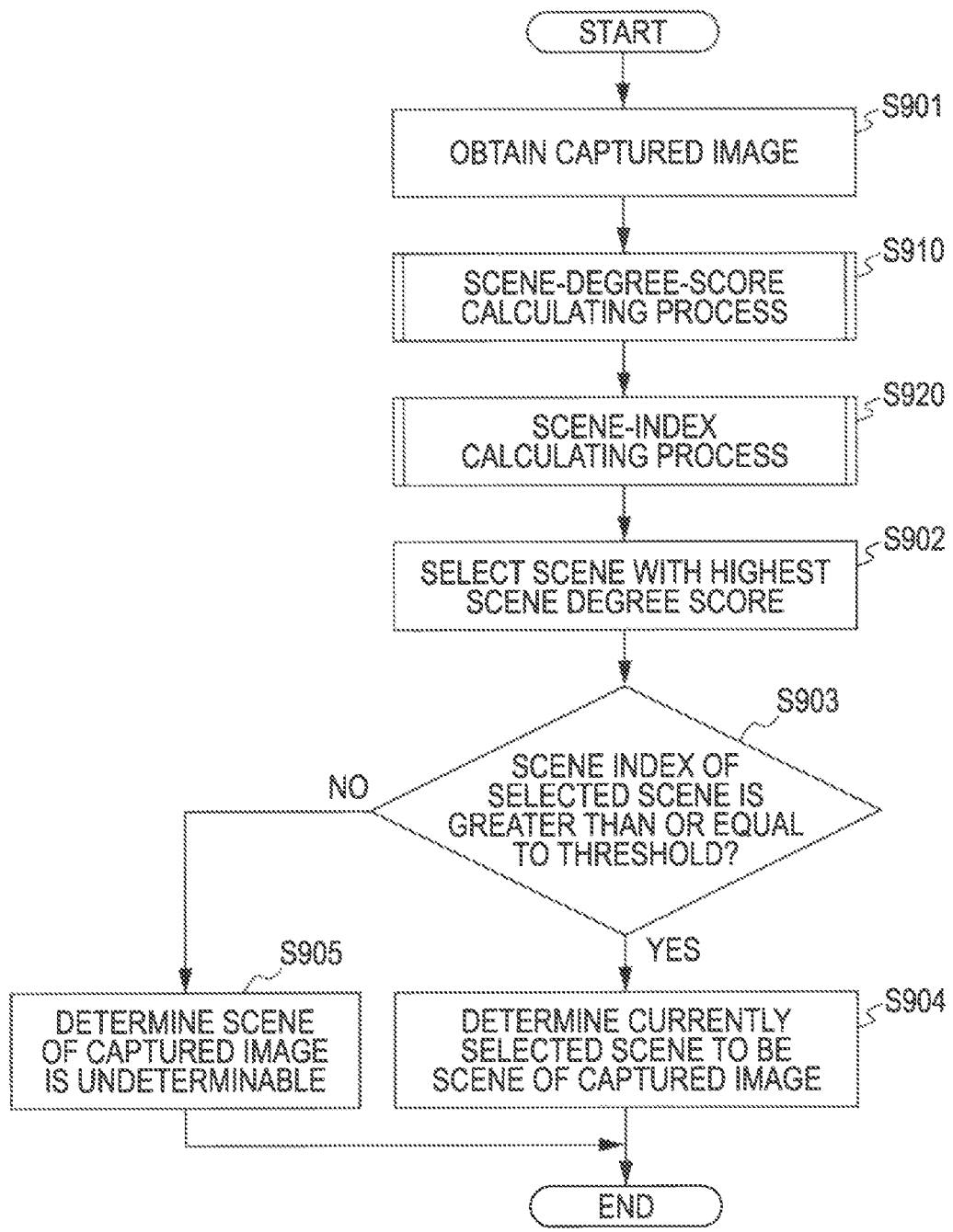
FIG. 31 is a flowchart showing a processing procedure of a scene determining process performed by the image capturing apparatus according to the embodiment of the present invention.

FIG. 31 is a flowchart showing a processing procedure of a scene determining process performed by the image capturing apparatus 100 according to the embodiment of the present invention. In this example, an example in which a scene is determined using a scene degree score and a scene index will be described. The scene determination is performed during, for example, monitoring of a captured image.

At first, a captured image is obtained (step S901). Then, a scene-degree-score calculating process is performed (step S910). The scene-degree-score calculating process will be described in detail with reference to FIG. 32. Then, a scene-index calculating process is performed (step S920). The scene-index calculating process will be described in detail with reference to FIG. 33.

Then, the scene determining unit 256 selects the scene with the highest scene degree score among scene degree scores calculated by the scene-degree-score calculating unit 252 (step S902). Then, the scene determining unit 256 determines whether the scene index calculated by the scene-index calculating unit 255 for the selected scene is greater than or equal to a threshold (step S903). When the scene index calculated for the selected scene is greater than or equal to the threshold (yes in step S903), the scene determining unit 256 determines that the selected scene is the scene of the current captured image (step S904). In contrast, when the scene index calculated for the selected scene is less than the threshold (no in step S903), the scene determining unit 256 determines that the scene of the current captured image is undeterminable (step S905).

When the scene with the highest scene degree score has both the highest scene degree score regarding EV information and the highest scene degree score regarding luminance-value-distribution information among the other scenes, the scene may be determined without performing a determination using the scene index in step S903.

Figure 32:
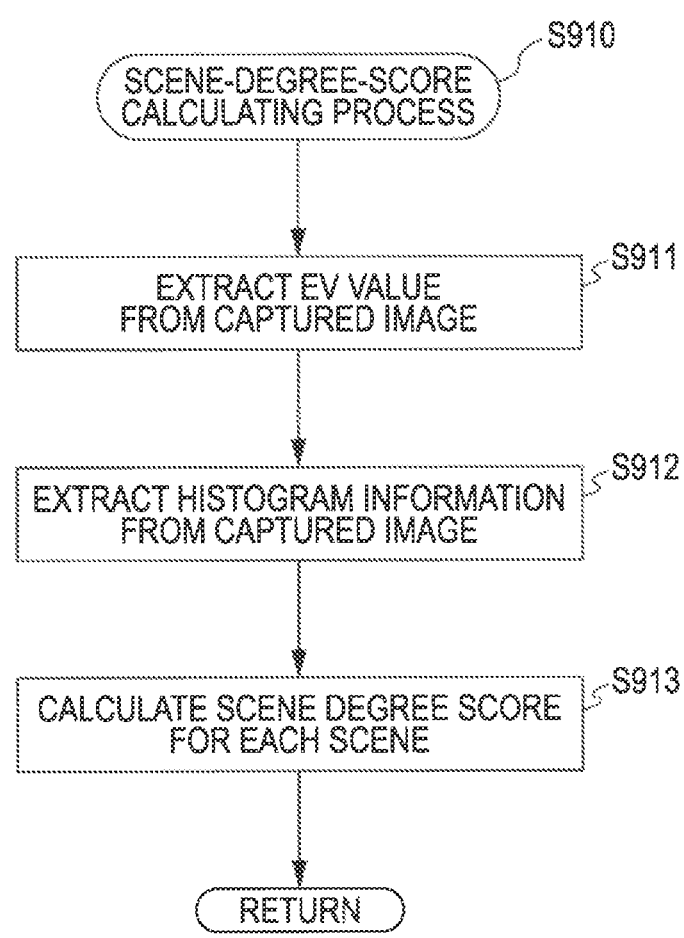
FIG. 32 is a flowchart showing a procedure of a scene-degree-score calculating process within the processing procedure of the scene determining process performed by the image capturing apparatus according to the embodiment of the present invention.

FIG. 32 is a flowchart showing a procedure of the scene-degree-score calculating process (processing procedure in step S910 shown in FIG. 31) within the processing procedure of the scene determining process performed by the image capturing apparatus 100 according to the embodiment of the present invention.

At first, the EV-value extracting unit 240 extracts an EV value from the captured image (step S911). Then, the luminance-value-distribution-information extracting unit 251 extracts a histogram from the captured image (step S912). Then, the scene-degree-score calculating unit 252 calculates a scene degree score on a scene-by-scene basis using scene-degree-score calculation information stored in the scene-degree-score-calculation-information storage unit 300 on the basis of the EV value extracted by the EV-value extracting unit 240 and the histogram extracted by the luminance-value-distribution-information extracting unit 251 (step S913).

Figure 33:
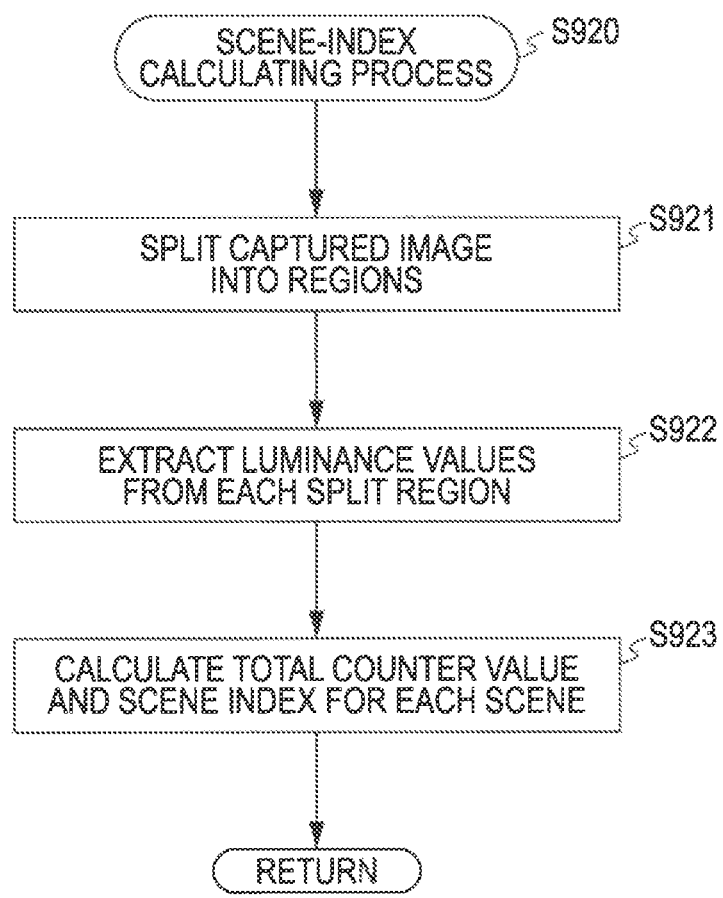
FIG. 33 is a flowchart showing a procedure of a scene-index calculating process within the processing procedure of the scene determining process performed by the image capturing apparatus according to the embodiment of the present invention.

FIG. 33 is a flowchart showing a procedure of the scene-index calculating process (processing procedure in step S920 shown in FIG. 31) within the processing procedure of the scene determining process performed by the image capturing apparatus 100 according to the embodiment of the present invention.

At first, the region splitting unit 253 splits the captured image into predetermined regions (step S921). Then, the luminance-value extracting unit 254 extracts luminance values from each of the split regions (step S922). Then, the scene-index calculating unit 255 calculates the mean value of the extracted luminance values in each region, and, on the basis of the mean value of the luminance values, calculates a scene-index correction value and a scene index on a scene-by-scene basis by using scene-index calculation information stored in the scene-index-calculation-information storage unit 350 (step S923).

Figure 34:
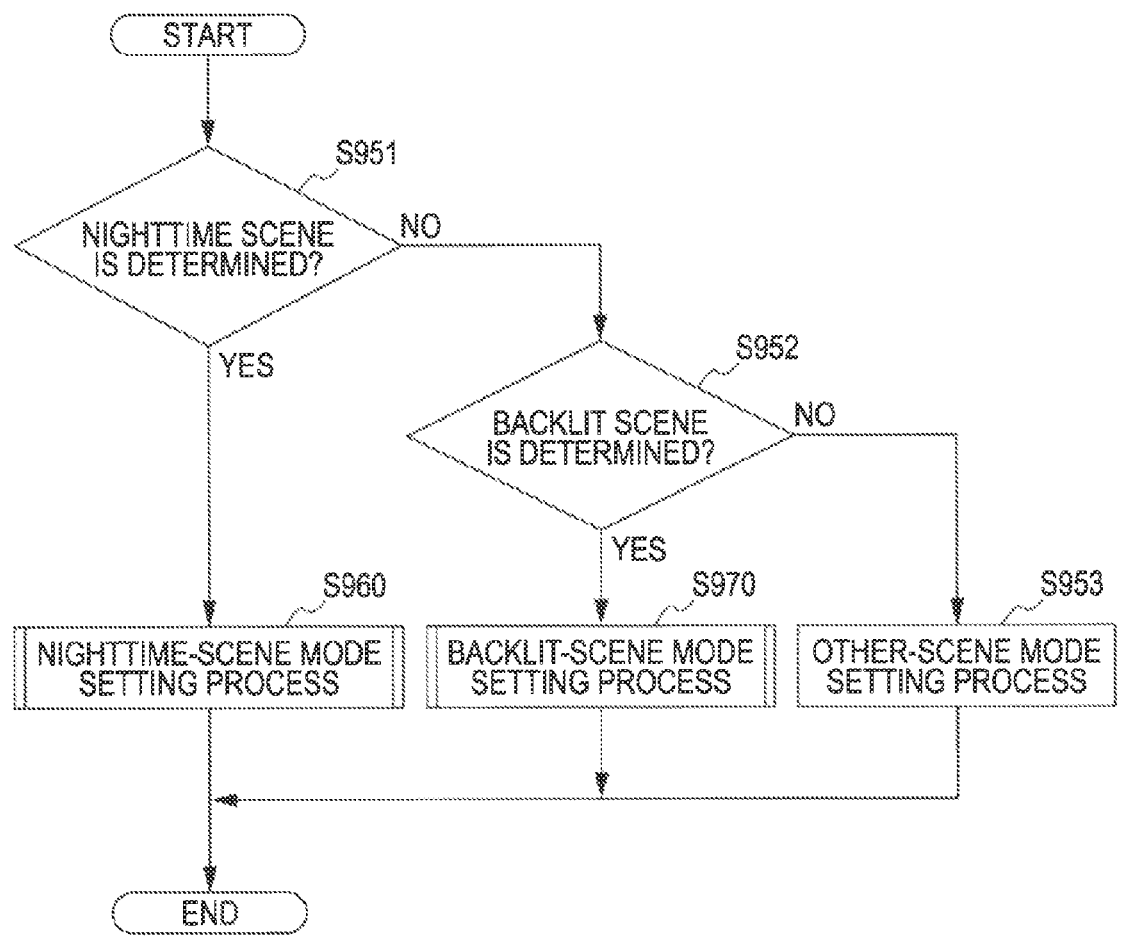
FIG. 34 is a flowchart showing a processing procedure of an image-capturing-mode setting process performed by the image capturing apparatus according to the embodiment of the present invention.

FIG. 34 is a flowchart showing a processing procedure of an image-capturing-mode setting process performed by the image capturing apparatus 100 according to the embodiment of the present invention.

At first, it is determined whether a nighttime scene has been determined (step S951). When a nighttime scene has been determined (yes in step S951), a nighttime-scene mode setting process is performed (step S960). The nighttime-scene mode setting process will be described in detail with reference to FIG. 35.

When a nighttime scene has not been determined (no in step S951), it is determined whether a backlit scene has been determined (step S952). When a backlit scene has been determined (yes in step S952), a backlit-scene mode setting process is performed (step S970). The backlit-scene mode setting process will be described in detail with reference to FIG. 36. When a backlist scene has not been determined (no in step S952), a mode setting process of another scene different from a nighttime scene or a backlit scene is performed (step S953).

Figure 35:
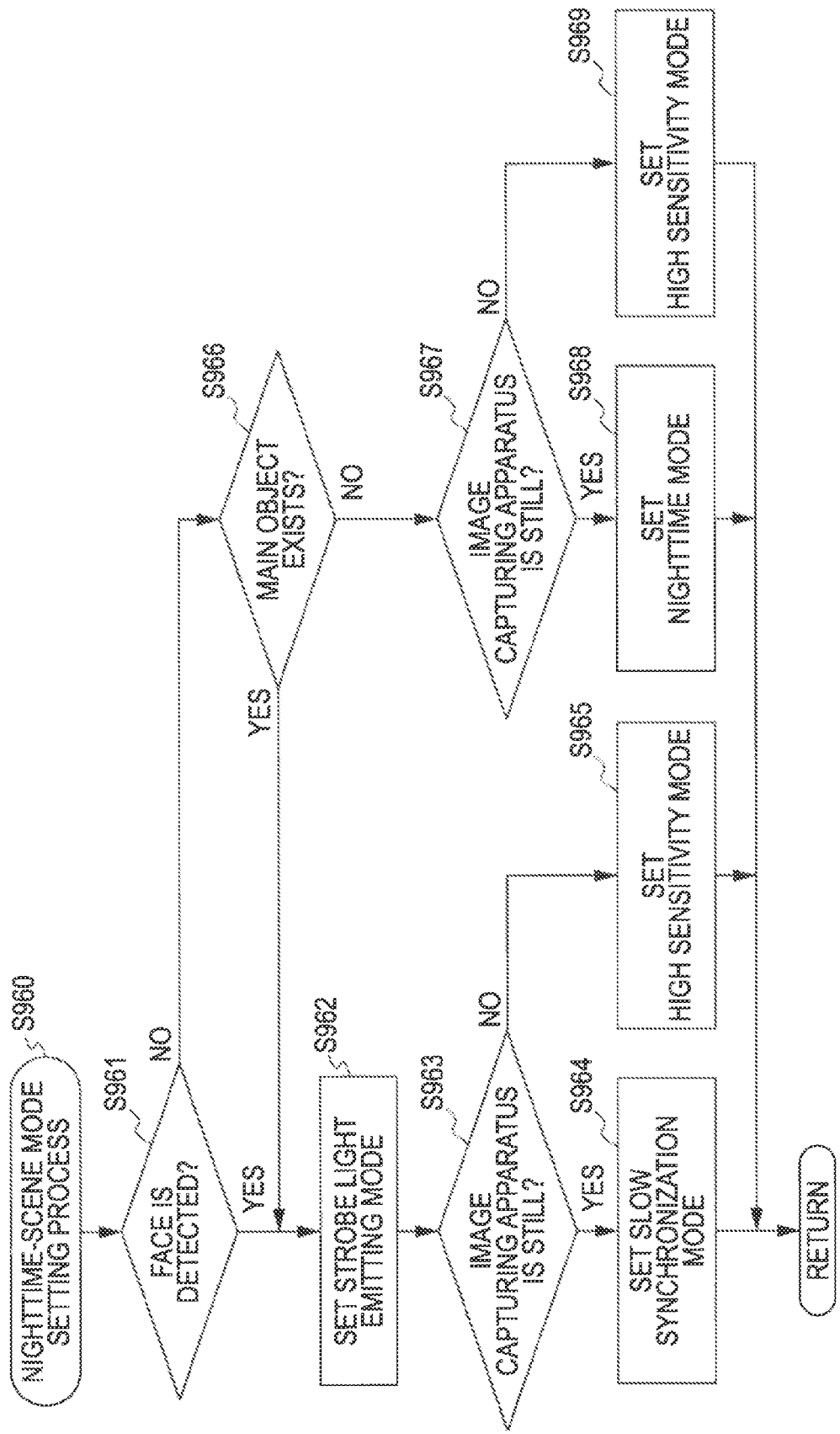
FIG. 35 is a flowchart showing a procedure of a nighttime-scene mode setting process within the processing procedure of the image-capturing-mode setting process performed by the image capturing apparatus according to the embodiment of the present invention.

FIG. 35 is a flowchart showing a procedure of the nighttime-scene mode setting process (processing procedure in step S960 shown in FIG. 34) within the processing procedure of the image-capturing-mode setting process performed by the image capturing apparatus 100 according to the embodiment of the present invention.

It is determined whether a face is detected in the captured image (step S961). When a face is detected in the captured image (yes in step S961), a strobe light emitting mode in which strobe light is emitted is set (step S962). Then, it is determined whether the image capturing apparatus 100 is still (step S963).

When it is determined that the image capturing apparatus 100 is still (yes in step S963), it is conceivable that the image capturing apparatus 100 is fixed with a tripod or placed at a fixed place. Therefore, a slow synchronization mode is set (step S964). The slow synchronization mode is a mode where, in a dark scene, a clear image of an object (person) can be captured with strobe light emission and a beautiful image of the background in the dark scene can be captured with a slow shutter speed. Since the image capturing apparatus 100 is determined to be still, no AGC processing of raising the image signal is performed, and the shutter speed can thus be reduced. Accordingly, the photographer can record a beautiful and noiseless captured image.

In contrast, when it is determined that the image capturing apparatus 100 is not still (no in step S963), for example, it is conceivable that the photographer is capturing an image while holding the image capturing apparatus 100 with hands or the image capturing apparatus 100 is placed at an unstable place. Therefore, an exposure mode (high sensitivity mode) is set in which AGC processing of raising the image signal is performed and the shutter speed is increased, thereby preventing motion blur (step S965). By capturing an image with strobe light emission, a clear image of an object (person) can be captured. By performing AGC processing of raising the image signal, a beautiful image of the background in the dark scene can be captured. By increasing the shutter speed to a level at which motion blur can be prevented, the photographer can record a captured image reliably obtained even when the photographer is holding the image capturing apparatus 100 with hands. Roughly speaking, an image capturing error due to camera movement is generally less likely to occur when the shutter speed is increased to a speed (seconds) equivalent to 1/focal length of the image capturing lens. Thus, for example, the shutter speed is adjusted to a speed faster than the speed (seconds) equivalent to 1/focal length of the image capturing lens.

When no face is detected in the captured image (no in step S961), it is determined whether a main object exists by performing a preliminary light emitting operation (step S966). In a dark scene, it is highly likely that it is difficult to accurately perform face detection. Thus, determination of a main object by performing a preliminary light emitting operation is very effective. When it is determined by performing a preliminary light emitting operation that a main object exits (yes in step S966), the flow proceeds to step S962. In contrast, when it is determined by performing a preliminary light emitting operation that no main object exists (no in step S966), it is then determined whether the image capturing apparatus 100 is still (step S967).

When it is determined that the image capturing apparatus 100 is still (yes in step S967), a nighttime mode specialized in capturing an image of a nighttime scene is set (step S968). When this nighttime mode is set, since there is no person in the captured image, strobe light emission is prohibited, and an image is captured using a slow shutter speed. Accordingly, the photographer can record a beautiful and noiseless captured image.

In contrast, when it is determined that the image capturing apparatus 100 is not still (no in step S967), the high sensitivity mode is set (step S969). In this case, since there is no person in the captured image, strobe light emission is prohibited, and AGC processing of raising the image signal is performed. Accordingly, an image of the background in a dark scene can be captured. By increasing the shutter speed up to a level at which motion blur can be prevented, the photographer can record a captured image reliably obtained even when the photographer is holding the image capturing apparatus 100 with hands.

Here, the setting of each image capturing mode means setting a program diagram corresponding to the image capturing mode. Individual image capturing modes including, besides the above-described image capturing modes, a landscape mode, a portrait mode, and the like can similarly be set.

When determining whether the image capturing apparatus 100 is still in steps S963 and S967, the process may have a determination criterion different from a determination criterion for eliminating or reducing motion blur using a blur correction apparatus. This is because optimization can be performed by making a determination criterion for determining a dark scene and changing an exposure condition, such as that described above, different from a stillness determination criterion for eliminating or reducing motion blur.

When the image capturing apparatus 100 has a self-timer function, it is highly likely that the self-time function is turned on when the image capturing apparatus 100 is fixed with a tripod or placed at a fixed place. Therefore, for example, the above-described process may be performed only when the self-timer function is turned on. Also, strobe light emission may not be prohibited regardless of whether a face is detected. It may be also possible to set the face detecting unit 210, the stillness determining unit 220, the main-object detecting unit 230, and the scene deciding unit 250 to be turned off by performing a manual operation with the operation accepting unit 130. Also, it may be possible to set the above-described process to be turned off by performing a manual operation with the operation accepting unit 130.

Figure 36:
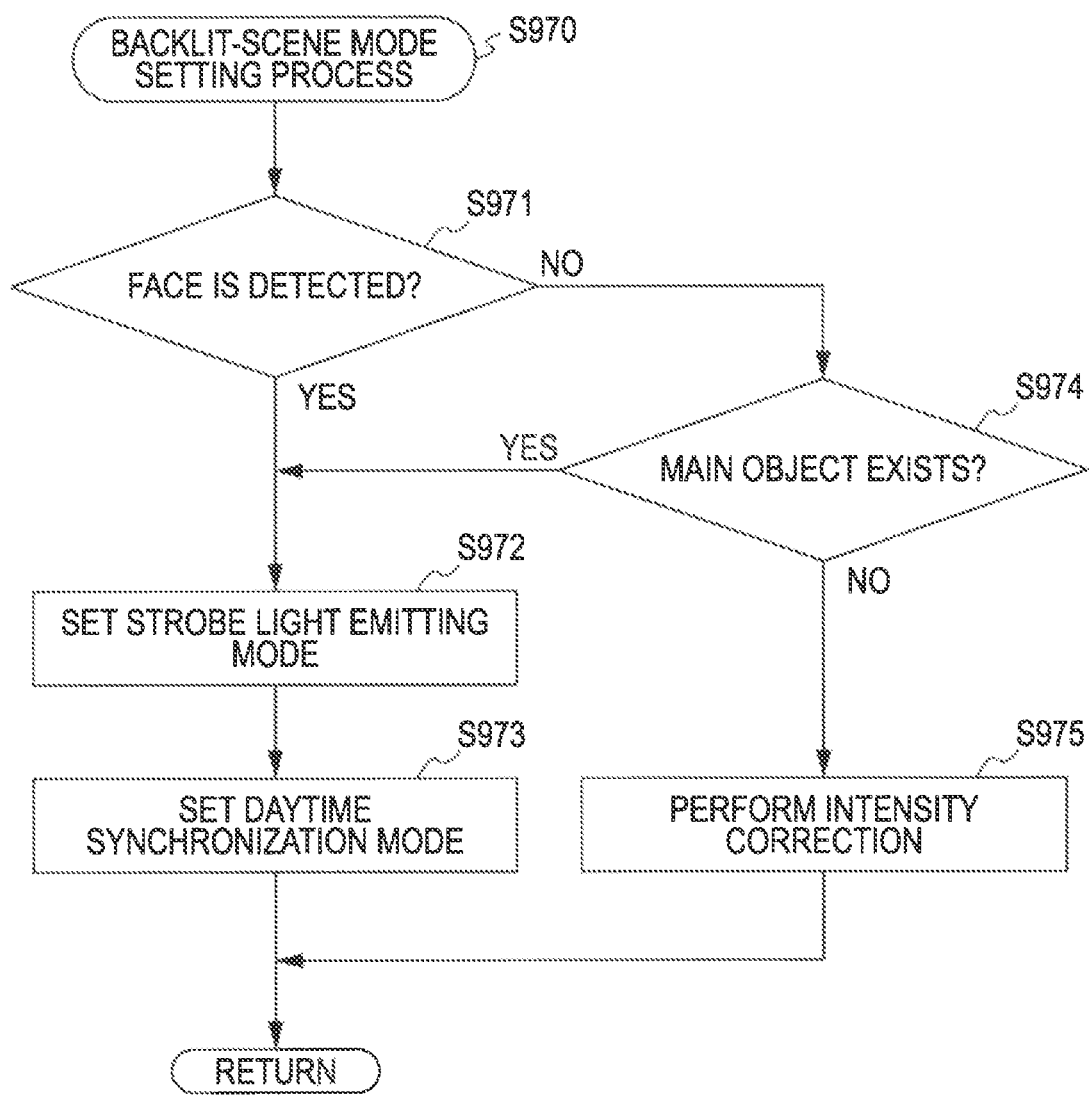
FIG. 36 is a flowchart showing a procedure of a backlit-scene mode setting process within the processing procedure of the image-capturing-mode setting process performed by the image capturing apparatus according to the embodiment of the present invention.

FIG. 36 is a flowchart showing a procedure of the backlit-scene mode setting process (processing procedure in step S970 shown in FIG. 34) within the processing procedure of the image-capturing-mode setting process performed by the image capturing apparatus 100 according to the embodiment of the present invention.

It is determined whether a face is detected in the captured image (step S971). When a face is detected in the captured image (yes in step S971), the strobe light emitting mode in which strobe light is emitted is set (step 972), and a daytime synchronization mode is set (step S973). The daytime synchronization mode is an image capturing mode in which a good image of both a main object and a background can be captured with strobe light emission in the case of a backlit scene, for example, where the main object is likely to be dark and sunken. When a person is lit from behind, the face becomes dark and sunken, and the face may not be detected in the captured image. Therefore, when no face is detected in the captured image (no in step S971), it is determined whether a main object exists by performing a preliminary light emitting operation (step S974).

When it is determined by performing a preliminary light emitting operation that a main object exits (yes in step S974), the flow proceeds to step S972. In contrast, when it is determined by performing a preliminary light emitting operation that no main object exists (no in step S974), an intensity correction process is performed (step S975). The intensity correction process is a process of performing intensity correction to increase the intensity level of luminance at a low luminance side of an image signal. As a result, a backlit scene can be captured and recorded as a natural image.

When the photographer has prohibited the strobe light emission, the daytime synchronization mode is not settable. Therefore, when the photographer has prohibited the strobe light emission, intensity correction is performed. The details of intensity correction control may be different depending on whether a face is detected. For example, when a face is detected, correction may be performed to adjust the intensity of luminance of the face to an appropriate level.

Figure 37:
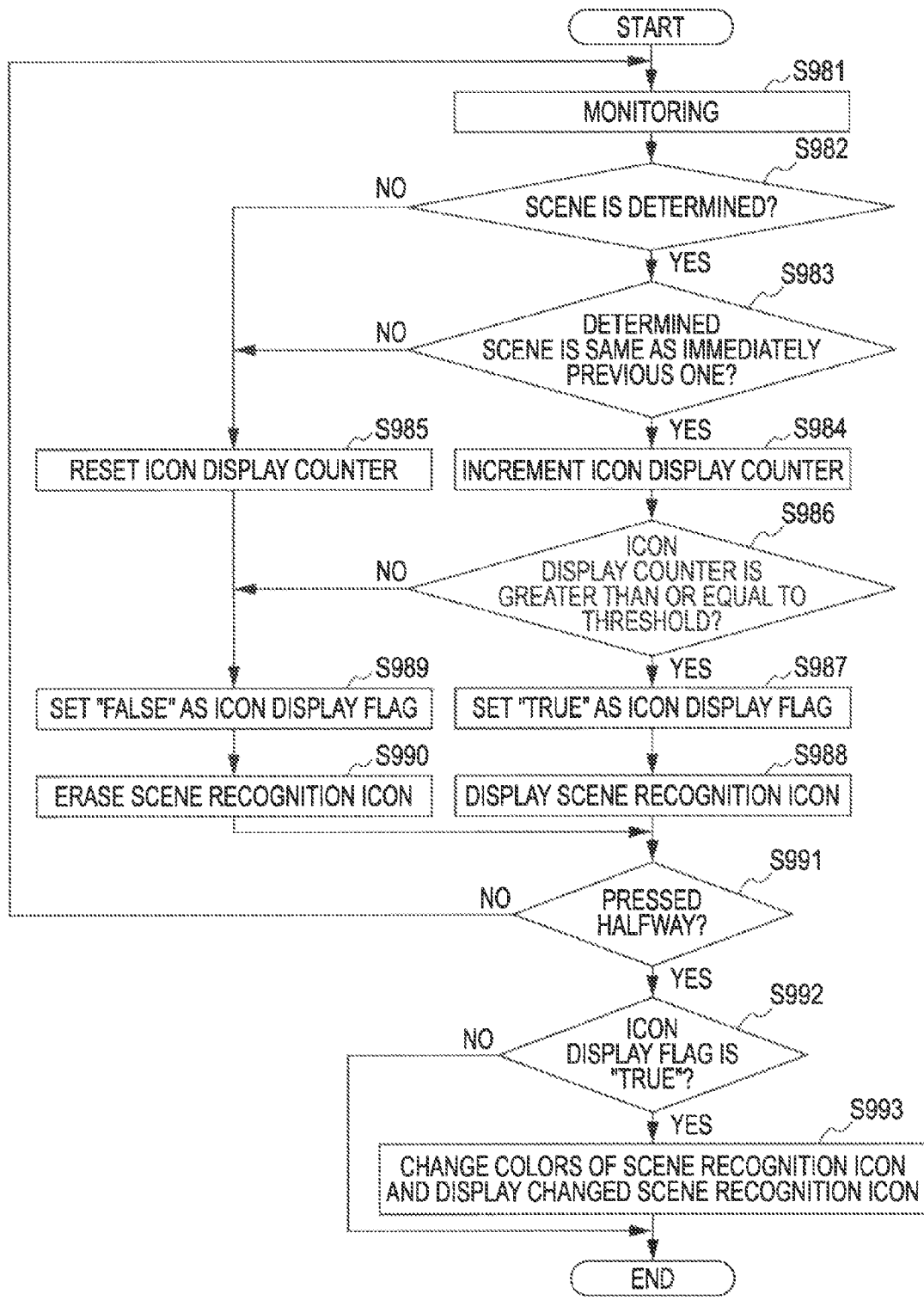
FIG. 37 is a flowchart showing a processing procedure of a scene-recognition-icon displaying process performed by the image capturing apparatus according to the embodiment of the present invention.

FIG. 37 is a flowchart showing a processing procedure of a scene-recognition-icon displaying process performed by the image capturing apparatus 100 according to the embodiment of the present invention. Specifically, this processing procedure is performed by the display control unit 290.

At first, monitoring is performed to display a captured image on the display unit 140 (step S981). Then, it is determined whether a scene has been determined (step S982). When a scene has been determined (yes in step S982), it is then determined whether the determined scene is the same as the scene that has been immediately previously determined (step S983). When the determined scene is the same as the scene that has been immediately previously determined (yes in step S983), an icon display counter is incremented (step S984). Then, it is determined whether the icon display counter is greater than or equal to a threshold (step S986).

When the icon display counter is greater than or equal to the threshold (yes in step S986), "TRUE" is set as an icon display flag (step S987). Then, a scene recognition icon corresponding to this determined scene is displayed on the display unit 140 (step S988). When the icon display counter is not greater than or equal to the threshold (no in step S986), the flow proceeds to step S989.

When no scene has been determined (no in step S982), or when the determined scene is not the same as the scene that has been immediately previously determined (no in step S983), the icon display counter is reset (step S985). Then, "FALSE" is set as the icon display flag (step S989). Then, the scene recognition icon displayed on the display unit 140 is erased (step S990). When no scene recognition icon is displayed on the display unit 140, this process of erasing the scene recognition icon is not performed.

Then, it is determined whether the shutter release button 131 has been pressed halfway (step S991). When the shutter release button 131 has not been pressed halfway (no in step S991), the flow returns to step S981. In contrast, when the shutter release button 131 has been pressed halfway (yes in step S991), it is determined whether "TRUE" has been set as the icon display flag (step S992). When "TRUE" has been set as the icon display flag (yes in step S992), the colors of the scene recognition icon displayed on the display unit 140 are changed (step S993). In contrast, when "TRUE" has not been set as the icon display flag (no in step S992), the scene-recognition-icon displaying process is terminated.

As has been described above, in a dark place such as in the nighttime or inside the room, the user of the image capturing apparatus 100 can easily obtain a good image by determining the still state of the image capturing apparatus 100, without using various settings and image capturing methods. For example, when the user has fixed the image capturing apparatus 100 with a tripod instead of holding the image capturing apparatus 100 using hands, a beautiful and noiseless image can be obtained. When the user is holding the image capturing apparatus 100 with hands, an image without motion blur can be obtained. Therefore, any dark scene patterns can be handled.

Using the face detecting unit 210, the stillness determining unit 220, the main-object detecting unit 230, and the scene deciding unit 250, a natural image can be obtained since light emission is performed only when necessary. Also, the power consumption can be reduced, and accordingly, the user can use the image capturing apparatus 100 longer. By setting the face detecting unit 210, the stillness determining unit 220, the main-object detecting unit 230, and the scene deciding unit 250 to be activated when the self-timer function is turned on, the power consumption can be reduced, and the user can use the image capturing apparatus 100 longer.

By performing scene determination using scene-degree-score calculation information and scene-index calculation information, individual scenes including a nighttime scene, an indoor scene, an outdoor scene, and a backlit scene can be accurately distinguished. Even a scene such as a backlit scene in which the user may fail to capture an image can be determined. With face detection and main-object detection by performing a preliminary light emitting operation, appropriate processing can be performed even in a backlit scene. Accordingly, a good image can be easily obtained without making the user perform a difficult operation. Further, even a scene such as a nighttime scene in which the user may fail to capture an image can be determined. Because brightness is controlled to be appropriate brightness on the basis of a scene degree score or the like, a good image can be easily obtained without making the user perform a difficult operation.

Since the scene recognition icon for making the user recognize the scene is displayed in a stable manner, the user can more easily recognize the scene.

Although the luminance-value-distribution information is indicated in 16 steps or the like in the embodiment of the present invention, similar processing can be performed even when the luminance-value-distribution information is indicated in another number of steps. Although luminance-value-distribution-information scene-degree-score calculation information generated on the basis of six items of luminance-value-distribution information, such as the median of luminance of the whole histogram, has been described by way of example in the embodiment of the present invention, a scene degree score may be calculated by using luminance-value-distribution-information scene-degree-score calculation information generated on the basis of other luminance-value-distribution information. As luminance-value-distribution information, for example, the peak width of the histogram, the height of the peak value in the histogram, the bottom width of the histogram, separation of the histogram, and/or the proportion of an overexposed region in the histogram can be used.

Although the image capturing apparatus such as a digital still camera has been described by way of example in the embodiment of the present invention, the embodiment of the present invention is applicable to various image capturing apparatuses such as a camcorder with a still-image capturing function and a mobile phone with an image capturing unit. Also, the embodiment of the present invention is applicable to an image capturing apparatus with a different structure, such as a lens replaceable camera or a film camera.

Although the example in which an EV value is used as brightness information has been described in the embodiment of the present invention, the embodiment of the present invention is applicable to the case where brightness information such as a light value (LV) is used.

Although the example in which an image captured without rotating the image capturing apparatus around the optical-axis direction is used has been described in the embodiment of the present invention, the embodiment of the present invention is applicable to, for example, an image captured by rotating the image capturing apparatus by 90 degrees around the optical-axis direction. In this case, for example, scene-index calculation information for an image captured by rotating the image capturing apparatus by 90 degrees is generated in advance. Using this scene-index calculation information, a scene index is calculated. Alternatively, a normal scene index is calculated on the basis of the mean value of luminance values extracted from each of regions split from a captured image. Additionally, a scene index is calculated using a 90-degree-rotated scene frequency pattern. By using these scene indices, scene determination can be performed. Alternatively, by detecting the rotation angle of the image capturing apparatus using an angle sensor, the rotation angle of a captured image is determined using the rotation angle of the image capturing apparatus, and a scene index is calculated in accordance with the rotation angle of the captured image.

The embodiment of the present invention is illustrated by way of example to realize the present invention. Although there is a correspondence between the embodiment and the features of the claims, which will be described below, the present invention is not limited thereto, and various modifications can be made without departing from the spirit and scope of the present invention.

That is, according to an embodiment of the present invention, brightness-information extracting means corresponds to, for example, the EV-value extracting unit 240. Luminance-value-distribution-information extracting means corresponds to, for example, the luminance-value-distribution-information extracting unit 251. Scene determining means corresponds to, for example, the scene determining unit 256.

According to another embodiment of the present invention, brightness-information evaluation-value-parameter storage means corresponds to, for example, the scene-degree-score-calculation-information storage unit 300. Luminance-value-distribution-information evaluation-value-parameter storage means corresponds to, for example, the scene-degree-score-calculation-information storage unit 300. Determination-evaluation-value calculating means corresponds to, for example, the scene-degree-score calculating unit 252.

According to another embodiment of the present invention, luminance-value-region-information extracting means corresponds to, for example, the region splitting unit 253 and the luminance-value extracting unit 254.

According to another embodiment of the present invention, brightness-information evaluation-value-parameter storage means corresponds to, for example, the scene-degree-score-calculation-information storage unit 300. Luminance-value-distribution-information evaluation-value-parameter storage means corresponds to, for example, the scene-degree-score-calculation-information storage unit 300. Split-value-distribution-information region-evaluation-value-converting-information storage means corresponds to, for example, the scene-index-calculation-value-distribution-information information storage unit 350. Determination-evaluation-value calculating means corresponds to, for example, the scene-degree-score calculating unit 252. Split-region-evaluation-value calculating means corresponds to, for example, the scene-index calculating unit 255.

According to another embodiment of the present invention, illuminance correction processing means corresponds to, for example, the image-capturing-condition setting unit 280.

According to another embodiment of the present invention, image-capturing-condition setting means corresponds to, for example, the image-capturing-condition setting unit 280.

According to another embodiment of the present invention, display control means corresponds to, for example, the display control unit 290.

According to another embodiment of the present invention, split-region-evaluation-value-converting-information storage means corresponds to, for example, the scene-index-calculation-information storage unit 350. Luminance-value-region-information extracting means corresponds to, for example, the region splitting unit 253 and the luminance-value extracting unit 254. Split-region-evaluation-value calculating means corresponds to, for example, the scene-index calculating unit 255. Scene determining means corresponds to, for example, the scene determining unit 256.

According to other embodiments of the present invention, the step of extracting brightness information corresponds to, for example, step S911. The step of extracting luminance-value-distribution information corresponds to, for example, step S912. The step of determining a scene corresponds to, for example, step S904.

The processing procedures described in the embodiment of the present invention may be considered as a method having this series of procedures or may be considered as a program for causing a computer to execute the series of procedures or as a recording medium having the program recorded thereon.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   one or more processors operable to:
   receive an image to be processed;
   extract, from the image, brightness information indicating brightness of the image;
   extract, from the image, luminance-value-distribution information indicating a distribution of luminance values in the image, wherein the luminance-value-distribution information is determined from a histogram extracted from the image, and on the basis of the extracted histogram, median of luminance values is calculated; and
   determine a scene of an object included in the image by obtaining predetermined evaluation values, for each of various types of scenes, that correspond to the extracted brightness information and the calculated median of luminance values, and by determining the scene of the object to be one of the various types of scenes based on the obtained predetermined evaluation values, wherein the various types of scenes comprises a nighttime scene, a backlit scene, an outdoor scene, and an indoor scene.

2. The image processing apparatus according to claim 1, wherein the one or more processors are operable to:
   store, on the scene-by-scene basis, a brightness-information evaluation value parameter indicating a distribution of the extracted brightness information according to the various types of scenes;
   store, on the scene-by-scene basis, a luminance-value-distribution-information evaluation value parameter indicating a feature amount corresponding to the extracted luminance-value distribution information according to the various types of scenes;
   calculate, on the scene-by-scene basis, a brightness-information evaluation value using the stored brightness-information evaluation value parameter corresponding to the extracted brightness information, calculate, on the scene-by-scene basis, a luminance-value-distribution-information evaluation value using the stored luminance-value-distribution-information evaluation value parameter corresponding to the extracted luminance-value-distribution information, and calculate, on the scene-by-scene basis, a determination evaluation value on the basis of the brightness-information evaluation value and the luminance-value-distribution-information evaluation value calculated on the scene-by-scene basis, and determine the scene of the object included in the image on the basis of the determination evaluation value calculated on the scene-by-scene basis.

3. The image processing apparatus according to claim 1, wherein luminance values, corresponding to a binarization threshold of luminance, are calculated on the basis of the extracted histogram and wherein the binarization threshold of luminance is obtained by performing a discriminant analysis method on the histogram.

4. The image processing apparatus according to claim 1, wherein the one or more processors are operable to:

split the image into a plurality of regions, extract luminance-value region information of each of the plurality of regions, and determine the scene of the object included in the image on the basis of the extracted brightness information, the extracted luminance-value-distribution information, and the extracted luminance-value region information.

5. The image processing apparatus according to claim 4, wherein the one or more processors are operable to:

store, on the scene-by-scene basis, a brightness-information evaluation value parameter indicating a distribution of the extracted brightness information according to the various types of scenes;

store, on the scene-by-scene basis, a luminance-value-distribution-information evaluation value parameter indicating a feature amount corresponding to the extracted luminance-value distribution information according to the various types of scenes;

store region group information indicating a group of regions of the image, which are classified on the basis of a size of the extracted luminance-value region information according to the various types of scenes, and an evaluation-value converting table for converting the extracted luminance-value region information into a split-region evaluation value on the basis of the stored region group information;

calculate, on the scene-by-scene basis, a brightness-information evaluation value using the stored brightness-information evaluation value parameter corresponding to the extracted brightness information, calculate, on the scene-by-scene basis, a luminance-value-distribution-information evaluation value using the stored luminance-value-distribution-information evaluation value parameter corresponding to the extracted luminance-value-distribution information, and calculate, on the scene-by-scene basis, a determination evaluation value on the basis of the brightness-information evaluation value and the luminance-value-distribution-information evaluation value calculated on the scene-by-scene basis;

calculate, on the scene-by-scene basis, for the extracted luminance-value region information, the split-region evaluation value using the stored region group information and the stored evaluation-value converting table, and determine the scene of the object included in the image on the basis of the determination evaluation value and the split-region evaluation value calculated on the scene-by-scene basis.

6. The image processing apparatus according to claim 5, wherein the one or more processors are operable to perform correction to increase the calculated split-region evaluation value in a case where luminance-value region information extracted from a predetermined region of the image exists within a predetermined range.

7. The image processing apparatus according to claim 1, wherein the one or more processors are operable to perform, in a case where the scene of the object included in the image is determined to be a predetermined scene, an illuminance correction process in accordance with the predetermined scene.

8. The image processing apparatus according to claim 1, wherein the one or more processors are operable to set an image capturing condition in accordance with presence of a face included in the image and presence of light emission in a case where the scene of the object included in the image is determined to be a backlit scene.

9. The image processing apparatus according to claim 1, wherein the one or more processors are operable to display, in a case where the scene of the object included in the image has been continuously determined to be the same scene for a predetermined period of time, a mark representing the scene which has been continuously determined for the predetermined period of time.

10. The image processing apparatus according to claim 1, wherein the one or more processors are operable to display an icon representing the determined scene of the object, wherein the color of the displayed icon changes when a shutter release button of the image processing apparatus is pressed halfway.

11. An image processing apparatus comprising:
one or more processor operable to:
store region group information indicating a group of regions of a captured image, which are classified on the basis of a size of luminance-value region information in a predetermined region of the captured image according to a predetermined plurality of various types of scenes, wherein each of the predetermined plurality of various types of scenes corresponds to a different distribution of the group of regions over an area of the captured image;

split the captured image into a plurality of regions and extract the luminance-value region information of each of the plurality of regions, wherein the luminance-value region information comprises a mean value of the luminance;

calculate, on the scene-by-scene basis for each of the predetermined plurality of various types of scenes, a split-region evaluation value using the stored region group information and the extracted luminance-value region information;

modify the calculated split-region evaluation value based on scene correction information; and determine a scene of an object included in the captured image on the basis of the modified split-region evaluation value.

12. An image processing method comprising:
extracting, from an image, brightness information indicating brightness of the image;
extracting, from the image, luminance-value-distribution information indicating a distribution of luminance values in the image, wherein the luminance-value-distribution information is determined from a histogram extracted from the image, and on the basis of the extracted histogram, median of luminance values is calculated; and determining a scene of an object included in the image by obtaining predetermined evaluation values, for each of various types of scenes, that correspond to the extracted brightness information and the calculated median of luminance values, and by determining the scene of the object to be one of the various types of scenes based on the obtained predetermined evaluation values, wherein the various types of scenes comprises a nighttime scene, a backlit scene, an outdoor scene, and an indoor scene.

13. A non-transitory computer readable storage medium that stores a program for causing a computer to execute a process comprising:

extracting, from an image, brightness information indicating brightness of the image;

extracting, from the image, luminance-value-distribution information indicating a distribution of luminance values in the image, wherein the luminance-value-distribution information is determined from a histogram extracted from the image, and on the basis of the extracted histogram, median of luminance values is calculated; and determining a scene of an object included in the image by obtaining predetermined evaluation values, for each of various types of scenes, that correspond to the extracted brightness information and the calculated median of luminance value; and by determining the scene of the object to be one of the various types of scenes based on the obtained predetermined evaluation values, wherein the various types of scenes comprises a nighttime scene, a backlit scene, an outdoor scene, and an indoor scene.

14. An image capturing apparatus comprising:
one or more processors operable to:
capture an image of an object and generate a captured image;
extract, from the captured image, brightness information indicating brightness of the captured image;
extract, from the captured image, luminance-value-distribution information indicating a distribution of luminance values in the captured image, wherein the luminance-value-distribution information is determined from a histogram extracted from the captured image, and on the basis of the extracted histogram, median of luminance values is calculated; and
determine a scene of the object included in the captured image by obtaining predetermined evaluation values, for each of various types of scenes, that correspond to the extracted brightness information and calculated median of luminance values and by determining the scene of the object to be one of the various types of scenes based on the obtained predetermined evaluation values, wherein the various types of scenes comprises a nighttime scene, a backlit scene, an outdoor scene, and an indoor scene.

15. An image processing apparatus comprising:
circuitry configured to:
receive an image to be processed;
extract, from the image, brightness information indicating brightness of the image;
extract, from the image, luminance-value-distribution information indicating a distribution of luminance values in the image, wherein the luminance-value-distribution information is determined from a histogram extracted from the image, and on the basis of the extracted histogram, median of luminance values is calculated; and determine a scene of an object included in the image by obtaining predetermined evaluation values, for each of various types of scenes, that correspond to the extracted brightness information and the calculated median of luminance values, and by determining the scene of the object to be one of the various types of scenes based on the obtained predetermined evaluation values, wherein the various types of scenes comprises a nighttime scene, a backlit scene, an outdoor scene, and an indoor scene.

16. An image processing apparatus comprising:
a split-region-evaluation-value-converting-information storage unit configured to store region group information indicating a group of regions of a captured image, which are classified on the basis of a size of luminance-value region information in a predetermined region of the captured image according to a predetermined plurality of various types of scenes, wherein each of the predetermined plurality of various types of scenes corresponds to a different distribution of the group of regions over an area of the captured image; and
circuitry configured to:
split the captured image into a plurality of regions and extract the luminance-value region information of each of the plurality of regions, wherein the luminance-value region information comprises a mean value of the luminance;
calculate, on the scene-by-scene basis for each of the predetermined plurality of various types of scenes, a split-region evaluation value using the stored region group information and the extracted luminance value region information;
modify the calculated split-region evaluation value based on scene correction information; and
determine a scene of an object included in the captured image on the basis of the modified split-region evaluation value.

17. The image processing apparatus according to claim 16, wherein the circuitry is configured to:
detect a rotation angle of the image processing apparatus; and
calculate, on the scene-by-scene basis for each of the predetermined plurality of various types of scenes, the split-region evaluation value based on the detected rotation angle.

18. An image capturing apparatus comprising:
circuitry configured to:
capture an image of an object and generate a captured image;
extract, from the captured image, brightness information indicating brightness of the captured image;
extract, from the captured image, luminance-value-distribution information indicating a distribution of luminance values in the captured image, wherein the luminance-value-distribution information is determined from a histogram extracted from the captured image, and on the basis of the extracted histogram, median of luminance values is calculated; and
determine a scene of the object included in the captured image by obtaining predetermined evaluation values, for each of various types of scenes, that correspond to the extracted brightness information and the calculated median of luminance values, and by determining the scene of the object to be one of the various types of scenes based on the obtained predetermined evaluation values, wherein the various types of scenes comprises a nighttime scene, a backlit scene, an outdoor scene, and an indoor scene.

* * * * *